(12) United States Patent
Shramkova et al.

(10) Patent No.: US 12,326,562 B2
(45) Date of Patent: Jun. 10, 2025

(54) WAVEGUIDE DISPLAY SYSTEM WITH WIDE FIELD OF VIEW

(71) Applicant: InterDigital CE Patent Holdings, SAS, Paris (FR)

(72) Inventors: Oksana Shramkova, Liffré (FR); Valter Drazic, Betton (FR); Valerie Allie, Saint-Armel (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 17/913,816

(22) PCT Filed: Mar. 22, 2021

(86) PCT No.: PCT/EP2021/057234
§ 371 (c)(1),
(2) Date: Sep. 22, 2022

(87) PCT Pub. No.: WO2021/191132
PCT Pub. Date: Sep. 30, 2021

(65) Prior Publication Data
US 2024/0210612 A1    Jun. 27, 2024

(30) Foreign Application Priority Data

Mar. 23, 2020 (EP) ................................. 20315042
Apr. 23, 2020 (EP) ................................. 20315216

(51) Int. Cl.
G02B 27/01 (2006.01)
F21V 8/00 (2006.01)

(52) U.S. Cl.
CPC ....... *G02B 27/0172* (2013.01); *G02B 6/0016* (2013.01); *G02B 6/0036* (2013.01);
(Continued)

(58) Field of Classification Search
CPC ................ G02B 27/0081; G02B 27/01; G02B 27/0101; G02B 27/017; G02B 27/0172;
(Continued)

(56) References Cited

U.S. PATENT DOCUMENTS 7,573,640 B2    8/2009   Nivon
9,791,696 B2   10/2017   Woltman
(Continued)

FOREIGN PATENT DOCUMENTS

CN    109073882 A    12/2018
CN    110582716 A    12/2019
(Continued)

OTHER PUBLICATIONS

D. J. Schroeder, "Chapter 14—Grating Aberrations; Concave Grating Spectrometers," in Astronomical Optics (Second Edition), Academic Press, 2000, pp. 352-367, ISBN:9780126298109, doi:10.1016/B978-012629810-9/50015-3. (Year: 2000).*
(Continued)

*Primary Examiner* — Daniel Petkovsek
*Assistant Examiner* — Emma R. Oxford
(74) *Attorney, Agent, or Firm* — Klintworth & Rozenblat IP LLP

(57) ABSTRACT

Embodiments include an optical system that may be included in a waveguide display. An example optical system includes a first waveguide having a first transmissive diffractive in-coupler (DG1) and a first diffractive out-coupler (DG6) and a second waveguide having a second transmissive diffractive in-coupler (DG2), a reflective diffractive in-coupler (DG3), a second diffractive out-coupler (DG4), and a third diffractive out-coupler (DG5). The second transmissive diffractive in-coupler (DG2) is arranged between the first transmissive diffractive in-coupler (DG1) and the reflective diffractive in-coupler (DG3) in an input region.

13 Claims, 61 Drawing Sheets

(52) U.S. Cl.
CPC .......... *G02B 6/0076* (2013.01); *G02B 6/0088* (2013.01); *G02B 2027/0112* (2013.01); *G02B 2027/0123* (2013.01); *G02B 2027/0174* (2013.01)

(58) Field of Classification Search
CPC ................ G02B 27/42; G02B 27/4205; G02B 27/4272; G02B 2027/0112; G02B 2027/0118; G02B 2027/0123; G02B 2027/0125; G02B 2027/0174; G02B 2027/0178; G02B 6/0016; G02B 6/0026; G02B 6/0036; G02B 6/005; G02B 6/0076; G02B 6/0088
See application file for complete search history.

(56) References Cited

U.S. PATENT DOCUMENTS

| | | | |
|---|---|---|---|
| 9,915,825 | B2 | 3/2018 | Robbins |
| 9,933,684 | B2 | 4/2018 | Brown |
| 10,393,930 | B2 | 8/2019 | Tervo |
| 10,466,561 | B2 | 11/2019 | Oh |
| 10,520,733 | B2 | 12/2019 | Takeda |
| 12,228,756 | B2 * | 2/2025 | Shramkova ........ G02B 27/0172 |
| 2007/0188837 | A1 | 8/2007 | Shimizu |
| 2017/0131551 | A1 | 5/2017 | Robbins |
| 2017/0357089 | A1 | 12/2017 | Tervo |
| 2019/0187465 | A1 | 6/2019 | Erler |
| 2019/0187474 | A1 | 6/2019 | Bhargava |
| 2019/0317270 | A1 * | 10/2019 | Tammela ............ G02B 6/0026 |
| 2020/0278498 | A1 * | 9/2020 | Schultz ................. B29D 11/00 |
| 2020/0278543 | A1 | 9/2020 | Schultz |
| 2021/0356748 | A1 * | 11/2021 | Cheng ................. G02B 6/0076 |
| 2024/0219732 | A1 * | 7/2024 | Miyairi .................... G09F 9/30 |
| 2024/0361592 | A1 * | 10/2024 | Shramkova .......... G02B 5/1814 |

FOREIGN PATENT DOCUMENTS

| | | |
|---|---|---|
| EP | 3540479 A1 | 9/2019 |
| EP | 3588150 A1 | 1/2020 |
| EP | 3671293 | 6/2020 |
| EP | 4031927 | 7/2022 |
| JP | 2009186794 | 8/2009 |
| WO | 2017120341 | 7/2017 |
| WO | 2017120341 A1 | 7/2017 |
| WO | 2017180403 | 10/2017 |
| WO | 2020128030 | 6/2020 |
| WO | 2021191150 A1 | 9/2021 |

OTHER PUBLICATIONS

T. Erdogan, "The Grating Equation," Plymouth Grating Laboratory Tech Note, uploaded Aug. 2018, 6 pages. https://www.plymouthgrating.com/wp-content/uploads/2018/08/PGL_TechNote_GratingEquation3.pdf (Year: 2018).*

International Search Report and Written Opinion for PCT/EP2021/067931 dated Oct. 8, 2021 (12 pages).

International Preliminary Report on Patentability for PCT/EP2021/067931 issued Dec. 13, 2022 (8 pages).

Shramkova, O. et al., "Full color waveguide combiner with embedded metagrating." In 2021 Fifteenth International Congress on Artificial Materials for Novel Wave Phenomena (Metamaterials), pp. 411-413. IEEE, 2021 (3 pages).

International Search Report and Written Opinion for PCT/EP2021/057234 mailed Jun. 18, 2021 (11 pages).

Kress, B. C. "Optical waveguide combiners for AR headsets: features and limitations." In Digital Optical Technologies 2019, vol. 11062, 110620J. International Society for Optics and Photonics, 2019 (26 pages).

J. R. DeVore, "Refractive Indices of Rutile and Sphalerite," J. Opt. Soc. Am. 41, pp. 416-419, 1951 (4 pages).

Harper, K. Ra., "Theory, design, and fabrication of diffractive grating coupler for slab waveguide" Thesis submitted to Brigham Young University, Dec. 2003 (218 pages).

Levola, T., "Diffractive optics for virtual reality displays." Journal of the Society for Information Display 14, No. 5, 2006 pp. 467-475 (9 pages).

Levola, T. et al., "Replicated slanted gratings with a high refractive index material for in and outcoupling of light." Optics Express 15, No. 5, 2007 pp. 2067-2074 (8 pages).

International Preliminary Report on Patentability for PCT/EP2021/057234 issued Sep. 22, 2022 (6 pages).

* cited by examiner

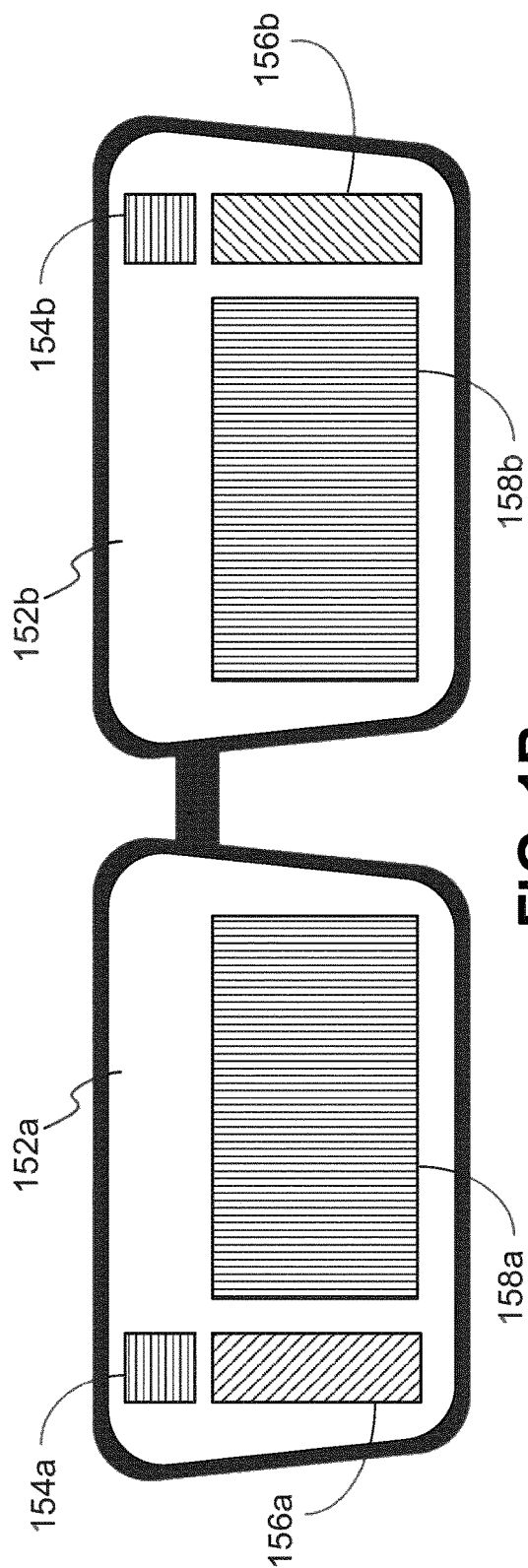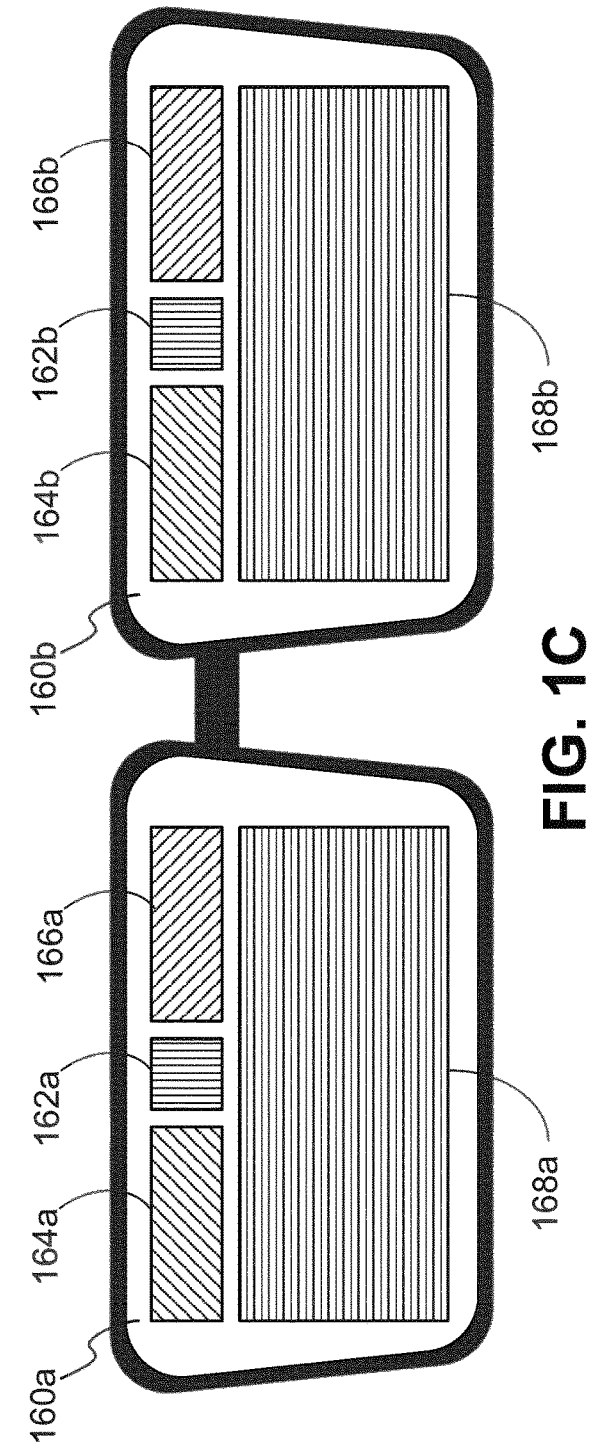

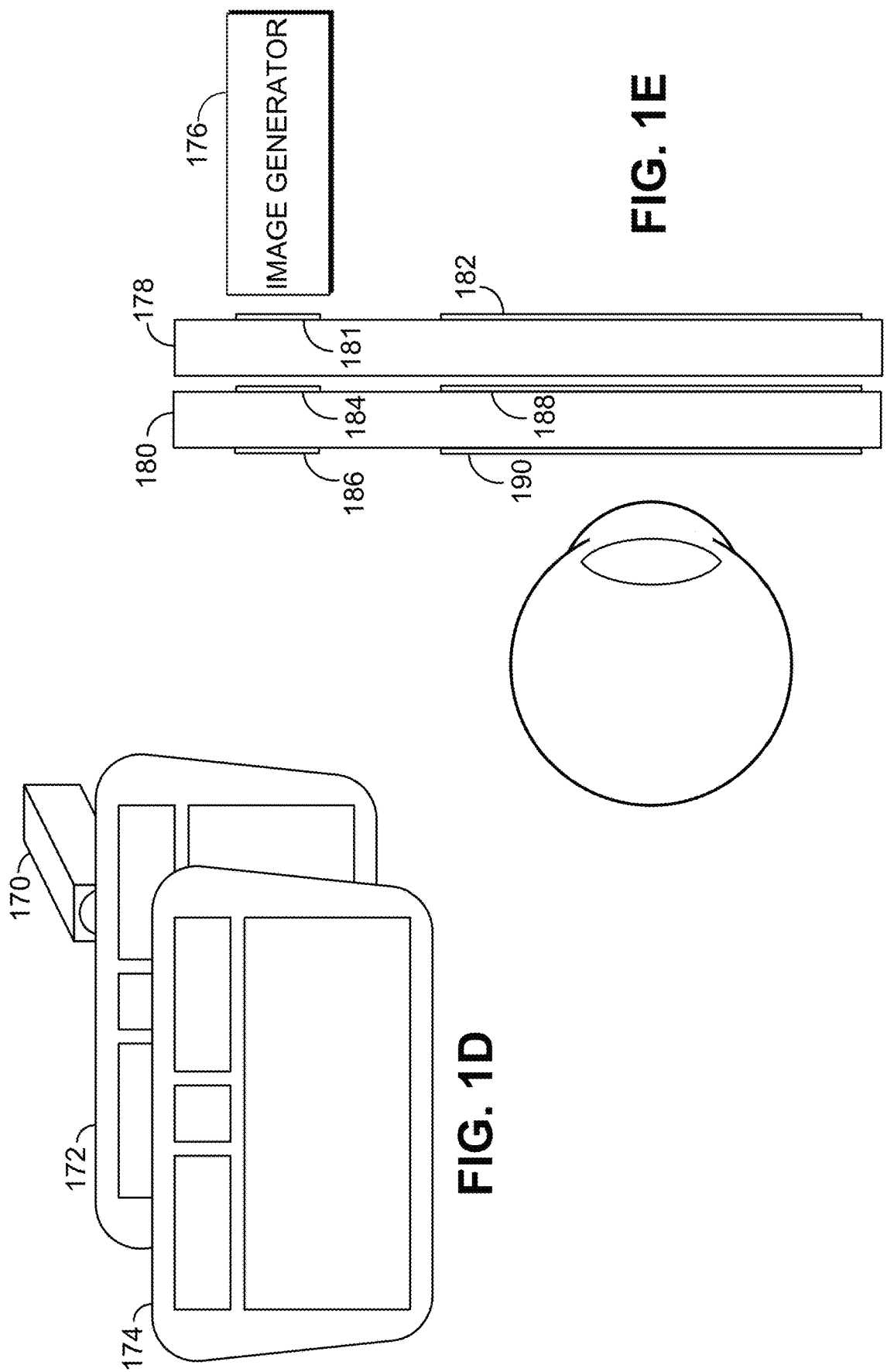

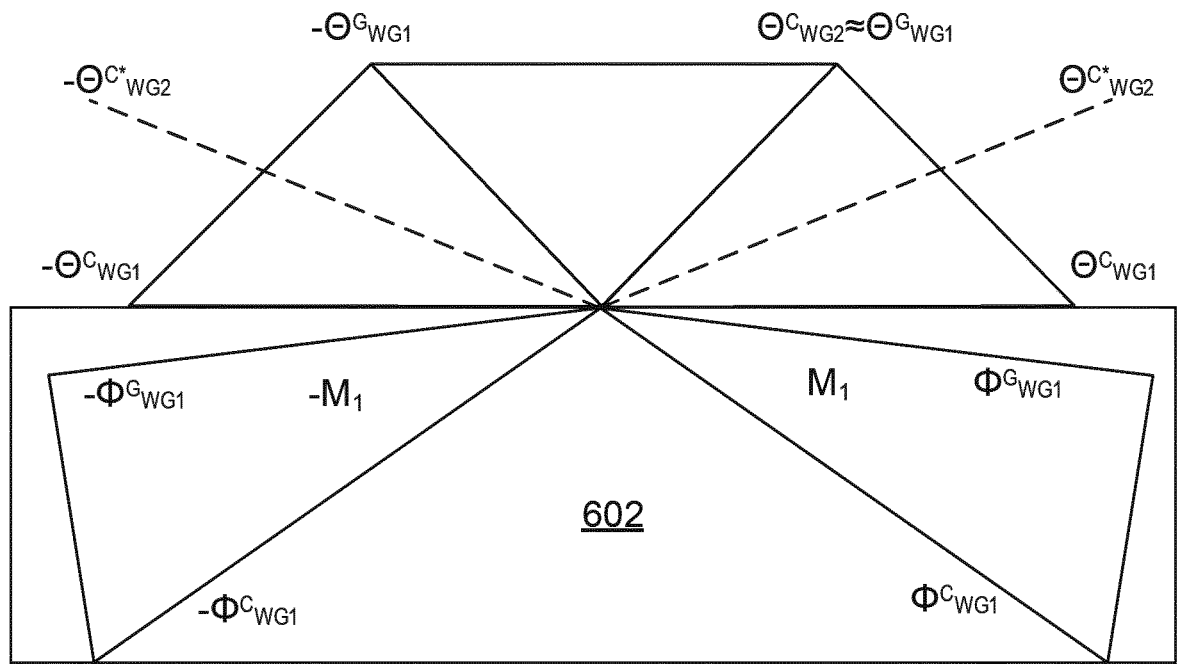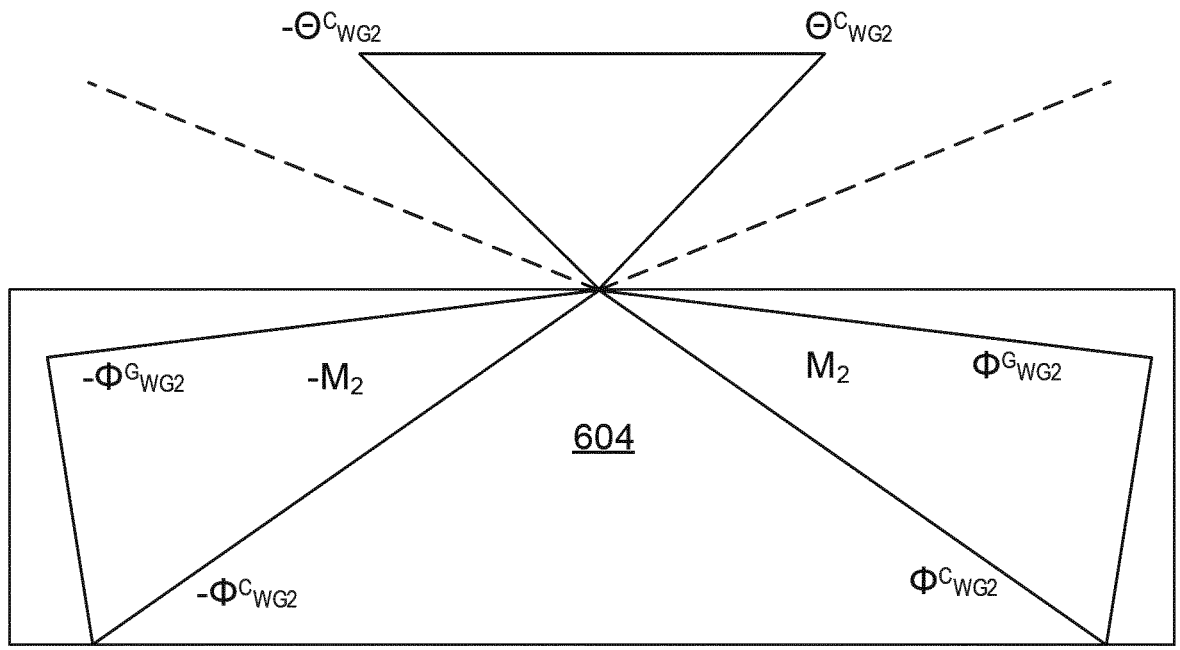
FIG. 6B

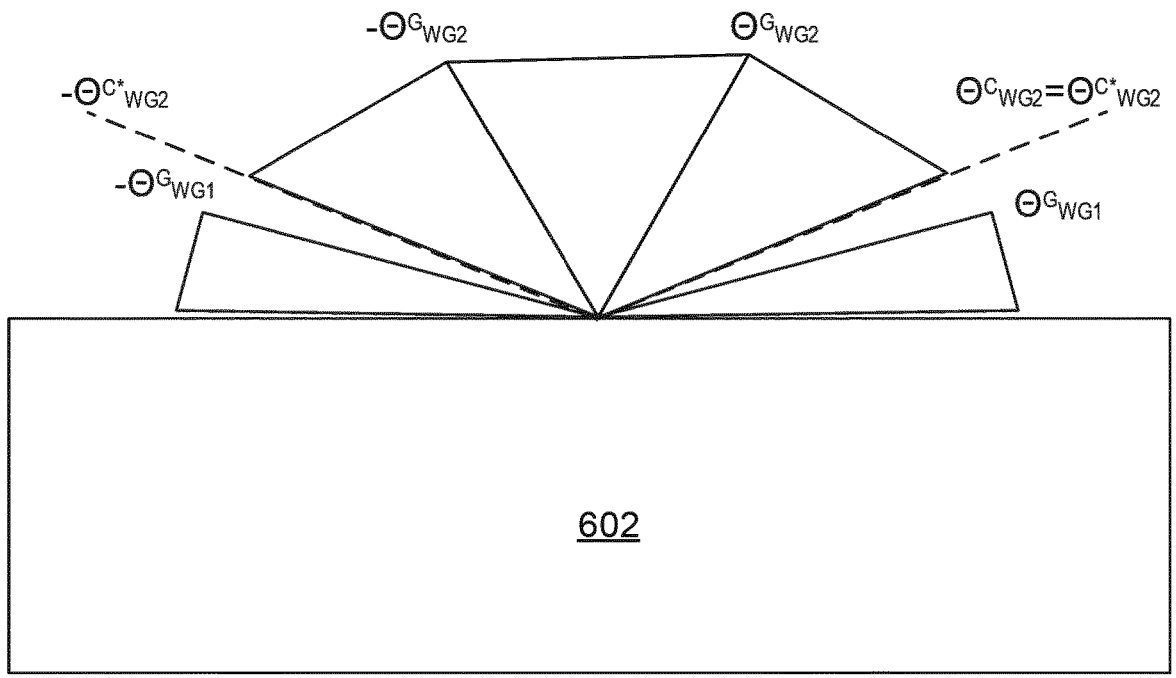
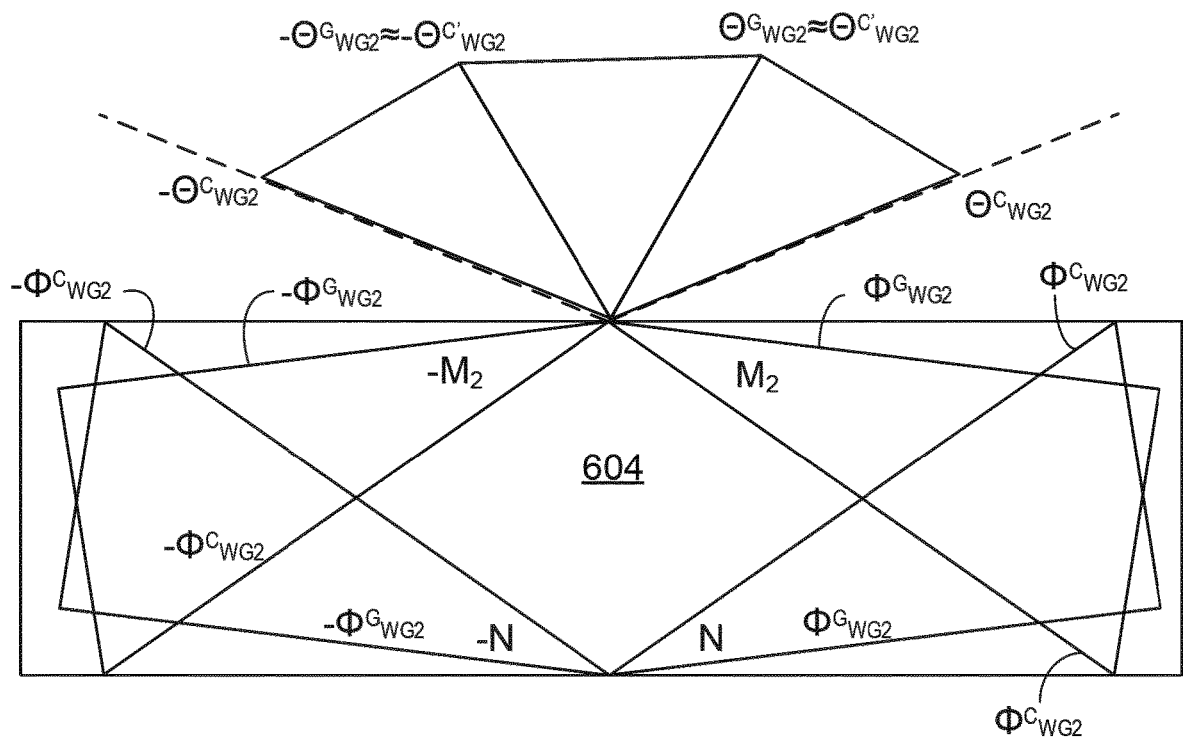
FIG. 6C

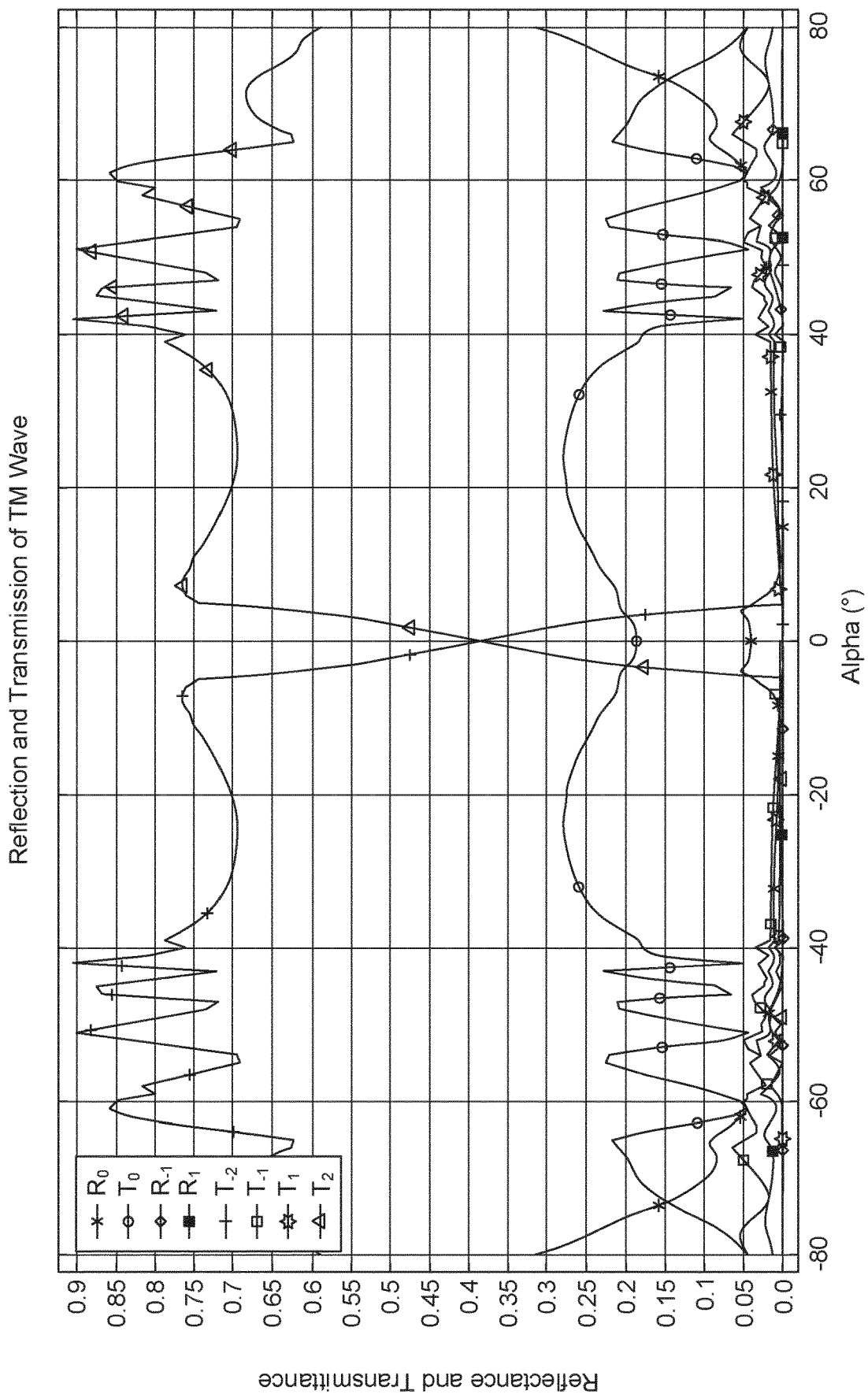

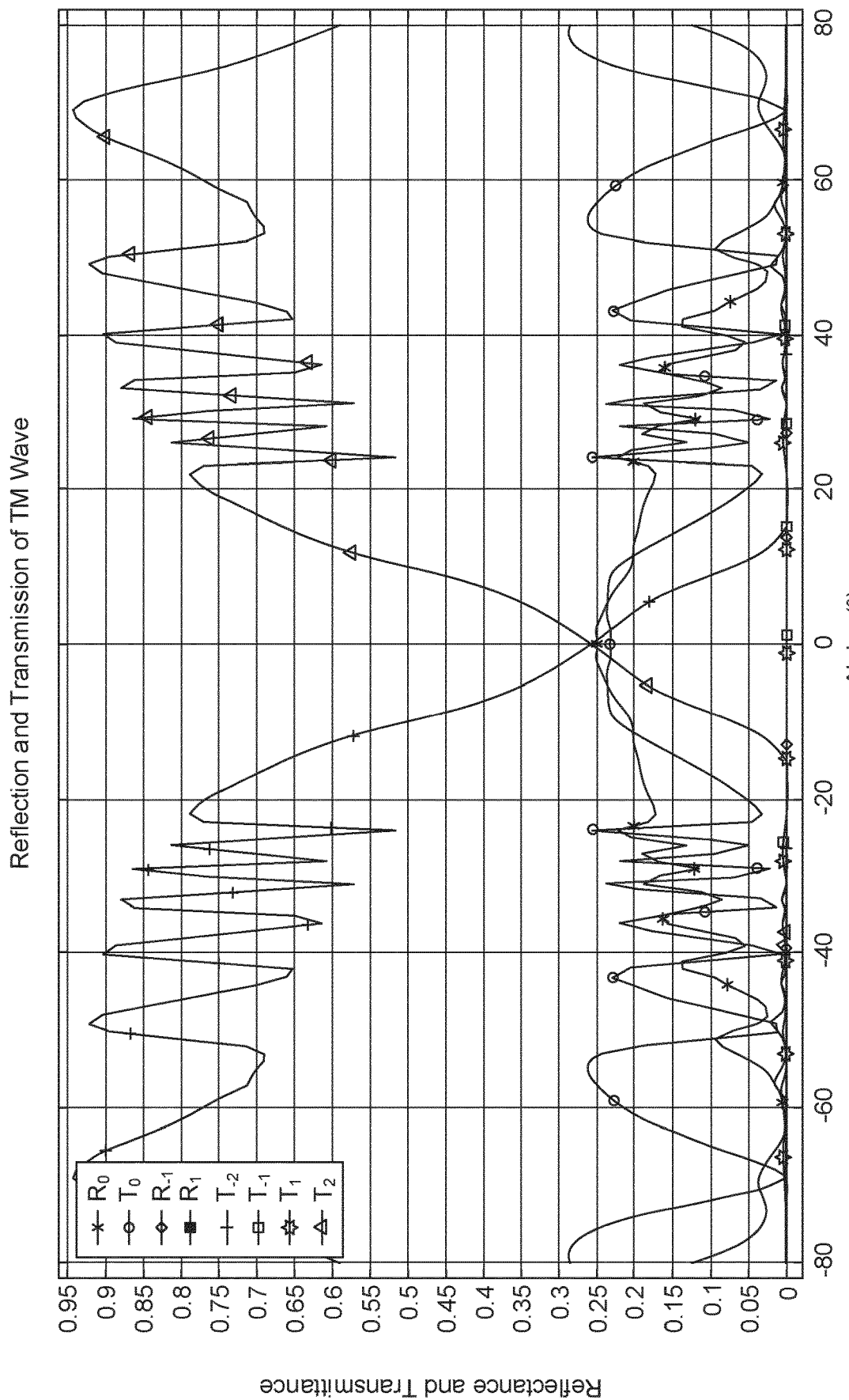

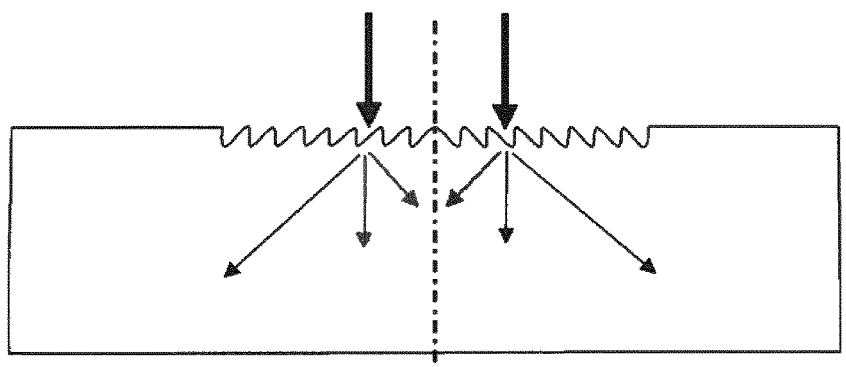
FIG. 24
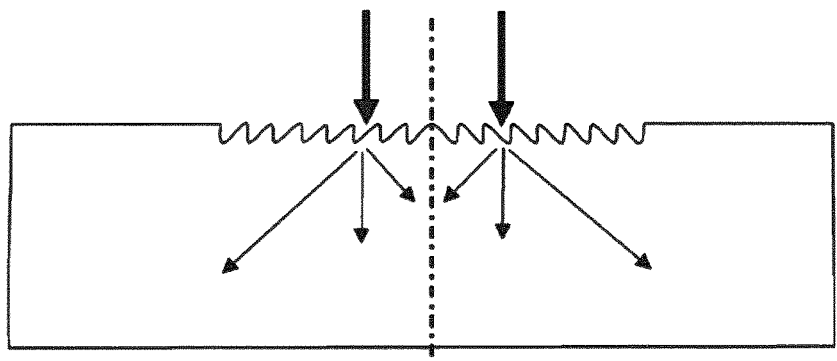
FIG. 25
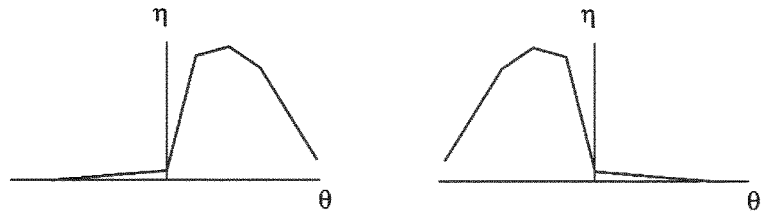
FIG. 26A
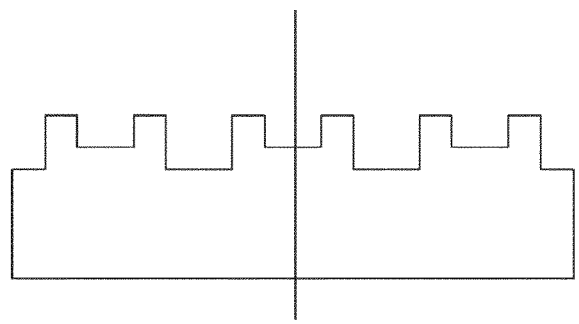
FIG. 26B
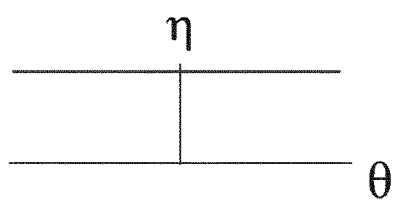

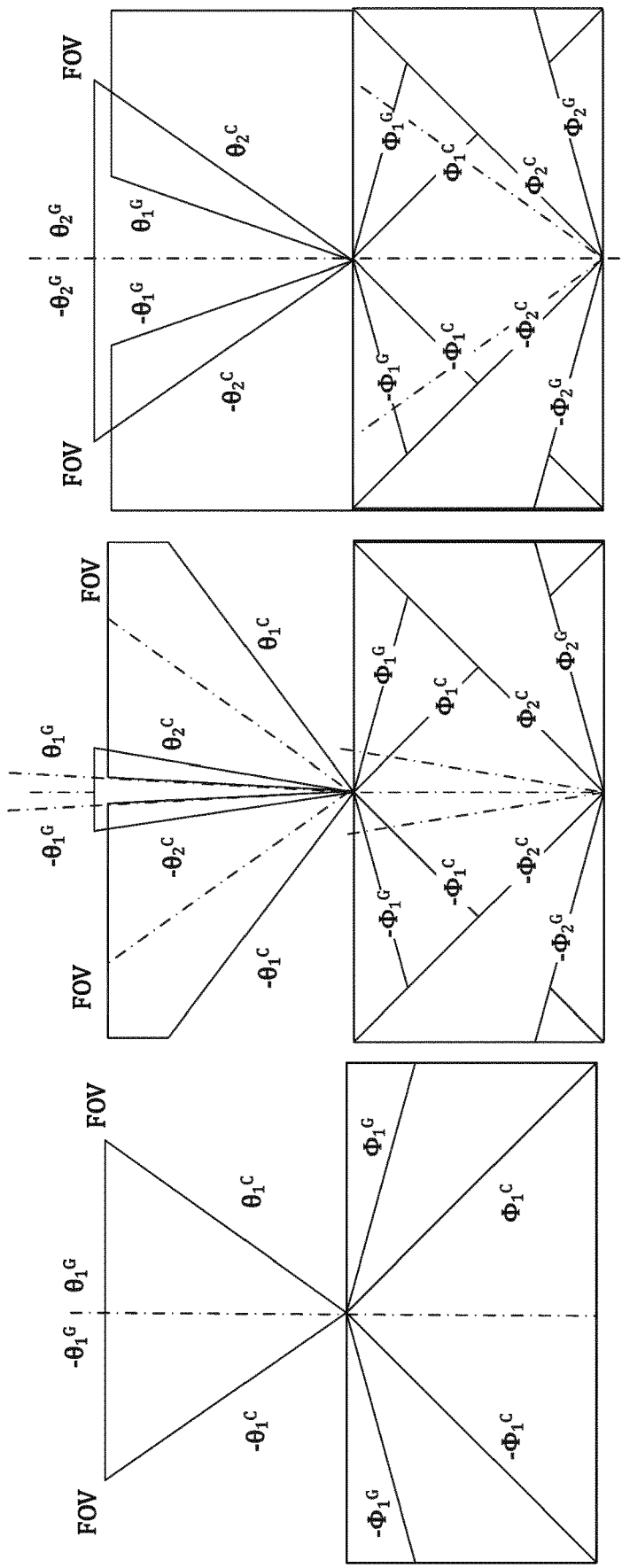

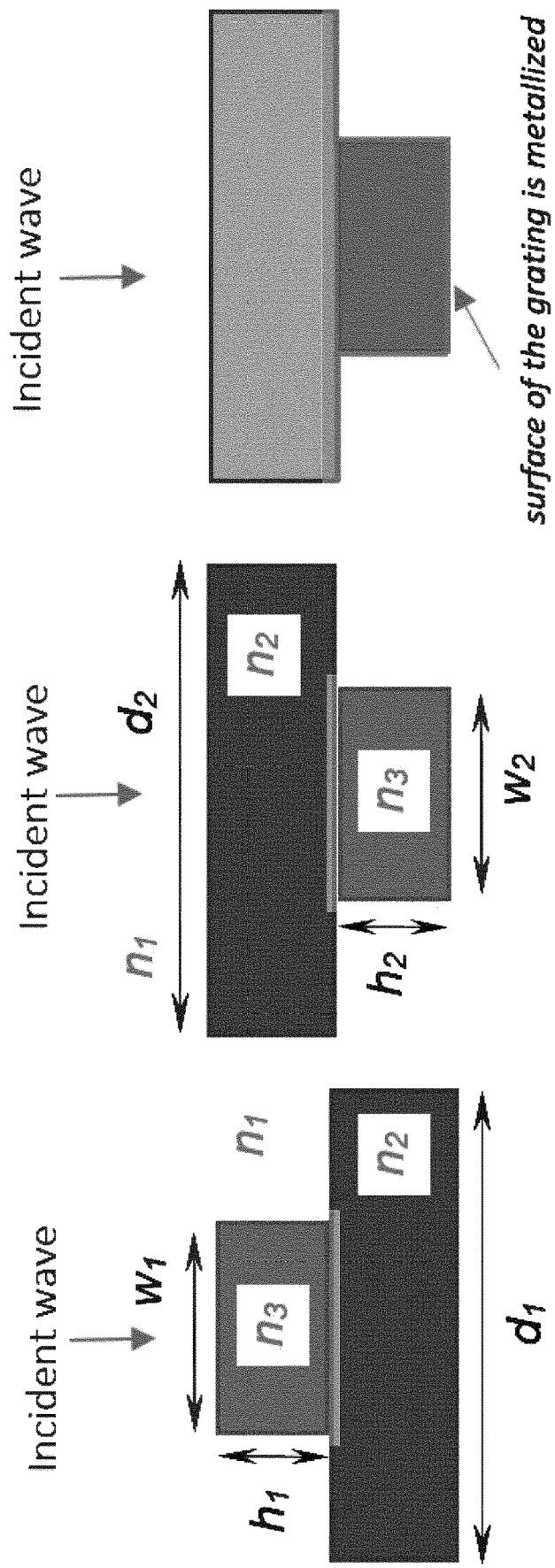

WAVEGUIDE DISPLAY SYSTEM WITH WIDE FIELD OF VIEW

CROSS-REFERENCE TO RELATED APPLICATIONS

The present application is a national stage application under 35 U.S.C. § 371 of International Application No. PCT/EP2021/057234, entitled "WAVEGUIDE DISPLAY SYSTEM WITH WIDE FIELD OF VIEW," filed on Mar. 22, 2021, which claims priority of European patent application no. 20315042.0, entitled "Waveguide Display System with Wide Field of View," filed 23 Mar. 2020, and European patent application no. 20315216.0, entitled "Full-Color Waveguide Combiner," filed 23 Apr. 2020, all of which are hereby incorporated by reference in their entirety.

BACKGROUND

The present disclosure relates to the field of optics and photonics, and more specifically to optical device comprising at least one diffraction grating. It may find applications in the field of conformable and wearable optics (e.g. AR/VR glasses (Augmented Reality/Virtual Reality)), as well as in a variety of other electronic consumer products comprising displays and/or lightweight imaging systems, including head up displays (HUD), as for example in the automotive industry.

This section is intended to introduce the reader to various aspects of art, which may be related to various aspects of the present disclosure that are described and/or claimed below. This discussion is believed to be helpful in providing the reader with background information to facilitate a better understanding of the various aspects of the systems and methods described herein. Accordingly, it should be understood that these statements are to be read in this light, and not as admissions of prior art.

AR/VR glasses are under consideration for a new generation of human-machine interface. Development of AR/VR glasses (and more generally eyewear electronic devices) is associated with a number of challenges, including reduction of size and weight of such devices as well as improvement of the image quality (in terms of contrast, field of view, color depth, etc.) that should be realistic enough to enable a truly immersive user experience.

The tradeoff between the image quality and physical size of the optical components motivates research into ultra-compact optical components that can be used as building blocks for more complex optical systems, such as AR/VR glasses. It is desirable for such optical components to be easy to fabricate and replicate.

In such AR/VR glasses, various types of refractive and diffractive lenses and beam-forming components are used to guide the light from a micro-display or a projector towards the human eye, allowing forming a virtual image that is superimposed with an image of the physical world seen with a naked eye (in case of AR glasses) or captured by a camera (in case of VR glasses).

Some of kinds of AR/VR glasses utilize an optical waveguide wherein light propagates into the optical waveguide by TIR (for Total Internal Reflection) only over a limited range of internal angles. The FoV (for Field of View) of the waveguide depends on the material of the waveguide, among other factors.

The FoV of a waveguide may be expressed as the maximum span of $\theta_1^+ - \theta_1^-$ which propagates into the waveguide by TIR. In some cases, as illustrated by FIG. 17, the biggest angular span that can be coupled into the waveguide can be expressed by two rays: the critical ray ($\theta_1^C$ in FIG. 17) having incident angle $\theta_1^C$ and the grazing ray ($\theta_1^G$ in FIG. 17) having incident angle $\theta_1^G$. The critical ray is the light ray that just diffracts into the waveguide at the critical angle $\theta_2^C$ defined by $$\sin \theta_2^C = \frac{1}{n_2(\lambda)}$$

where $n_2$ is the refractive index of the waveguide's material and $\lambda$ the wavelength of the incident light. Above the critical angle $\theta_2^C$, total internal reflection (TIR) occurs. The grazing ray is the ray having an input angle that diffracts into the waveguide at grazing incidence, which may be $\theta_2^G = 90°$. The theoretical FoV of a waveguide presented above is for a single mode system where one single diffraction mode is used to carry the image: either +1 or −1 diffraction mode.

The field of view in some systems based on optical waveguides is limited by the angular bandwidth of a glass plate. If we diffract one mode into the glass plate, the FoV is given as a function of the index of refraction of the material of the glass plate. The FoV of a waveguide of refractive index $n_2$ is given by:

$$\Delta \theta_1 = 2 \sin^{-1}\left(\frac{n_2 - 1}{2}\right).$$

FIG. 18 shows a graph for reasonable ranges of $n_2$. For $n_2=1.5$ the total field of view for a single mode system is rather limited to $\Delta\theta_1=28.96$ degrees. It can be seen that 60 degrees FoV is a practical limit for some types of wave guides because it is not generally feasible to use materials of refractive index above 2.0.

The field of view of an optical waveguide can be further extended by taking advantage of a second direction of propagation inside of the waveguide, doubling it.

For instance, in WO2017180403, a waveguide with an extended field of view is proposed wherein a dual-mode image propagation is used. In this method, the diffraction mode +1 is used to carry the right hand side image (negative angles of incidence on the in-coupler) in one direction, and the −1 mode is used to propagate the positive angles of incidence into the opposite direction into the waveguide. In WO2017180403, combining both half images is done thanks to the pupil expanders and out-couplers at the exit of the waveguide so that the user sees one single image. The goal of the system is to double the field of view since each half image can use the whole angular bandwidth of the waveguide in each direction of propagation.

In EP18215212.4 ("An optical device comprising at least one diffraction grating having a grating pitch above the wavelength", O. Shramkova, V. Drazic), an optical waveguide comprising a diffraction grating configured to diffract a light of at least one given wavelength incident on the optical waveguide is disclosed. The diffraction grating has a grating pitch above the at least one given wavelength and is configured to diffract the incident light at a diffraction order |M|>1, with M being the diffraction order.

Using diffraction orders higher than 1 has the effect of multiplying the wavelength by the diffraction order that is used in the diffraction equation. As the grating pitch is directly a function of the product Mλ, this means that the grating pitch is multiplied by M. It was shown in EP18215212.4, that the structures used for the in-coupler are much bigger and opens up new possibilities in the fabrication technology, because nano-imprinting could be used. The grating density with fewer lines per millimeter can be used, and the fabrication process can be simplified by using over-wavelength structures rather than sub-wavelength.

It was also shown in EP18215212.4 that such an optical waveguide using both ±2 diffraction orders provides a FoV of about 60° with a refractive index of 1.5. It is thus possible to get a 60° field of view using a material with refractive index 1.5, instead of 2 in single mode.

However, a 60° FoV is still limited with respect to the total human field of view where stereopsis is effective for human vision and which is about 114°.

Two waveguides full RGB combiner architectures have been investigated in which the green FoV is shared between first and second waveguides, as described in B. C. Kress, "Optical waveguide combiners for AR headsets: features and limitation," Proc. of SPIE, vol. 11062, p. 110620J, 2019.

SUMMARY

References in the specification to "one embodiment," "an embodiment," "an example embodiment," and the like indicate that the embodiment described may include a particular feature, structure, or characteristic; but not every embodiment necessarily includes that particular feature, structure, or characteristic. Moreover, such phrases are not necessarily referring to the same embodiment. Further, when a particular feature, structure, or characteristic is described in connection with an embodiment, such feature, structure, or characteristic may be used in connection with other embodiments whether or not explicitly described.

In some embodiments, an optical system comprises: a first waveguide having a first transmissive diffractive in-coupler (DG1); a second waveguide having a second transmissive diffractive in-coupler (DG2) and a reflective diffractive in-coupler (DG3); wherein the second transmissive diffractive in-coupler (DG2) is arranged between the first transmissive diffractive in-coupler (DG1) and the reflective diffractive in-coupler (DG3) in an input region.

In some such embodiments, the first waveguide further comprises a first diffractive out-coupler (DG6), and the second waveguide further comprises a second diffractive out-coupler (DG4) and a third diffractive out-coupler (DG5).

In some embodiments, the optical system is configured such that blue light is (i) at relatively higher angles of incidence, preferentially coupled into the first waveguide and (ii) at relatively lower angles of incidence, preferentially coupled into the second waveguide.

In some embodiments, the optical system is configured such that green light is (i) at relatively higher angles of incidence, preferentially coupled into the first waveguide and (ii) at relatively lower angles of incidence, preferentially coupled into the second waveguide.

In some embodiments, the optical system is configured such that red light is (i) at relatively higher angles of incidence, preferentially coupled into the second waveguide by the second transmissive diffractive in-coupler and (ii) at relatively lower angles of incidence, preferentially coupled into the second waveguide by the reflective diffractive in-coupler.

In some embodiments, the optical system is configured to substantially replicate an image spanning a field of view of at least 100°.

In some embodiments, the system is configured to replicate a full-color image.

In some embodiments, the first diffractive in-coupler has a first grating pitch, the second diffractive in-coupler has a second grating pitch greater than the first grating pitch, and the reflective diffractive in-coupler has a third grating pitch greater than the second grating pitch.

In the optical system of some embodiments, $$d_1 = \frac{M_1 \lambda}{n_2 \sin \Phi_{WG1}^2 + \sin \Theta_{WG1}^G}$$

where $d_1$ is a grating pitch of the first transmissive diffractive in-coupler (DG1), $M_1$ is a non-zero integer (e.g. 1 or 2), $n_2$ is a refractive index of the first waveguide, λ is a wavelength between 450 nm and 700 nm, $\Phi_{WG1}^G$ is an angle between 55 and 90 degrees, and $\Theta_{WG1}^G$ is substantially equal to an angle that diffracts into a critical angle of the second waveguide, where the critical angle of the second waveguide is arcsin $(1/n_3)$, where $n_3$ is a refractive index of the second waveguide.

In the optical system of some embodiments, $$d_2 = \frac{M_2 \lambda}{n_3 \sin \Phi_{WG2}^G + \sin \Theta_{WG2}^G}$$

where $d_2$ is a grating pitch of the second transmissive diffractive in-coupler (DG2), $M_2$ is a non-zero integer (e.g. 1 or 2), $n_3$ is a refractive index of the second waveguide, λ is a wavelength between 450 nm and 700 nm, $\Phi_{WG2}^G$ is an angle between 55 and 90 degrees, and $\Theta_{WG2}^G$ is an angle within ±5 degrees of normal incidence.

In the optical system of some embodiments, $$d_3 = \frac{N \lambda}{n_3 \sin \Phi_{WG2}^G - \sin \Theta_{WG2}^{G'}}$$

where $d_3$ is a grating pitch of the reflective diffractive in-coupler (DG3), N is a non-zero integer (e.g. 1 or 2), $n_3$ is a refractive index of the second waveguide, λ is a wavelength between 450 nm and 700 nm, $\Phi_{WG2}^G$ is an angle between 55 and 90 degrees, and $\Theta_{WG2}^{G'}$ is an angle within ±5 degrees of normal incidence.

In some embodiments, the optical system is a dual-mode system configured (i) to couple at least some incident light having a first incident angle to travel in a first direction in at least one of the first and second waveguide, and (ii) to couple at least some incident light having a second incident angle substantially opposite the first incident angle to travel in a second direction substantially opposite the first direction in at least one of the first and second waveguide.

In some embodiments of the optical system, a first grating pitch ($d_1$) of the first transmissive diffractive in-coupler is between 420 nm and 520 nm; a second grating pitch ($d_2$) of the second transmissive diffractive in-coupler is between 600 nm and 700 nm; and a third grating pitch ($d_3$) of the reflective diffractive in-coupler is between 720 nm and 820 nm.

In some embodiments of the optical system, a first grating pitch ($d_1$) of the first transmissive diffractive in-coupler is between 460 nm and 480 nm; a second grating pitch ($d_2$) of the second transmissive diffractive in-coupler is between 640 nm and 660 nm; and a third grating pitch ($d_3$) of the reflective diffractive in-coupler is between 760 nm and 780 nm.

In some embodiments of the optical system, the second grating pitch is between 30% and 50% greater than the first grating pitch; and the third grating pitch is between 10% and 30% greater than the second grating pitch.

In some embodiments, a method of operating an optical system comprises: directing input light representing an image onto a first transmissive diffractive in-coupler (DG1) of a first waveguide, the first waveguide having a first diffractive out-coupler (DG6); using the first transmissive diffractive in-coupler (DG1), coupling into the first waveguide a first portion of the input light; using a second transmissive diffractive in-coupler (DG2) of a second waveguide, coupling into the second waveguide a second portion of the input light; and using a reflective diffractive in-coupler (DG3) of the second waveguide, coupling into the second waveguide a third portion of the input light.

In some such embodiments, a method further includes: using a first diffractive out-coupler (DG6) on the first waveguide, coupling at least part of the first portion of light out of the first waveguide; using a second diffractive out-coupler (DG4) on the second waveguide, coupling at least part of the second portion of light out of the second waveguide; and using a third diffractive out-coupler (DG5) on the second waveguide, coupling at least part of the third portion of light out of the second waveguide.

BRIEF DESCRIPTION OF THE DRAWINGS

FIG. 1B is a schematic illustration of a binocular waveguide display with a first layout of diffractive optical components.

FIG. 1C is a schematic illustration of a binocular waveguide display with a second layout of diffractive optical components.

FIG. 1D is a schematic exploded view of a double-waveguide display according to some embodiments.

FIG. 1E is a cross-sectional schematic view of a double-waveguide display according to some embodiments.

FIGS. 6A-C are schematic diagrams illustrating coupling of blue light (FIG. 6A), green light (FIG. 6B), and red light (FIG. 6C) into the waveguides of a double-waveguide display with a wide field of view according to some embodiments.

FIG. 12C illustrates reflectance and transmittance of different diffractive orders of TM-polarized green light with a wavelength of 530 nm by a transmissive diffractive in-coupler of the second waveguide using a U-shape diffraction grating as illustrated in FIG. 9B.

FIG. 13E illustrates reflectance and transmittance of different diffractive orders of TM-polarized blue light with a wavelength of 460 nm by the transmissive diffractive in-coupler of the second waveguide using a twin-shape diffraction grating as illustrated in FIG. 9A.

FIG. 24 illustrates use of symmetric diffraction with non-symmetrical gratings that employs two different diffraction gratings.

FIG. 25 schematically illustrates typical diffraction efficiencies for the gratings of FIG. 24 as a function of the angle of incidence.

FIG. 26A is a cross-sectional view of a diffraction grating profile as used in some embodiments.

FIG. 26B is a schematic illustration of coupling of light across different angles of incidence using a grating profile as in FIG. 26A.

FIGS. 29A-29C schematically illustrate angles incident on and diffracted in a single-waveguide system for blue light (29A), green light (29B), and red light (29C).

FIGS. 30A-30C illustrate cross-sectional views of the base pattern of transmissive (30A) and reflective (30B) diffraction gratings. FIG. 30C illustrates metallization of the surface of the diffraction grating of FIG. 30B.

DETAILED DESCRIPTION

Described herein are waveguide display systems and methods. Some embodiments provide full a RGB display with a high field of view. Some embodiments provide full-color display capability using a stack of two waveguides. Such an optical device can be used as a waveguide for AR/VR glasses for instance. In example embodiments, the display does not require light with a particular polarization for its operation. For example it may operate using TE-polarized light, TM-polarized light, or light with both polarizations.

Figure 1A:
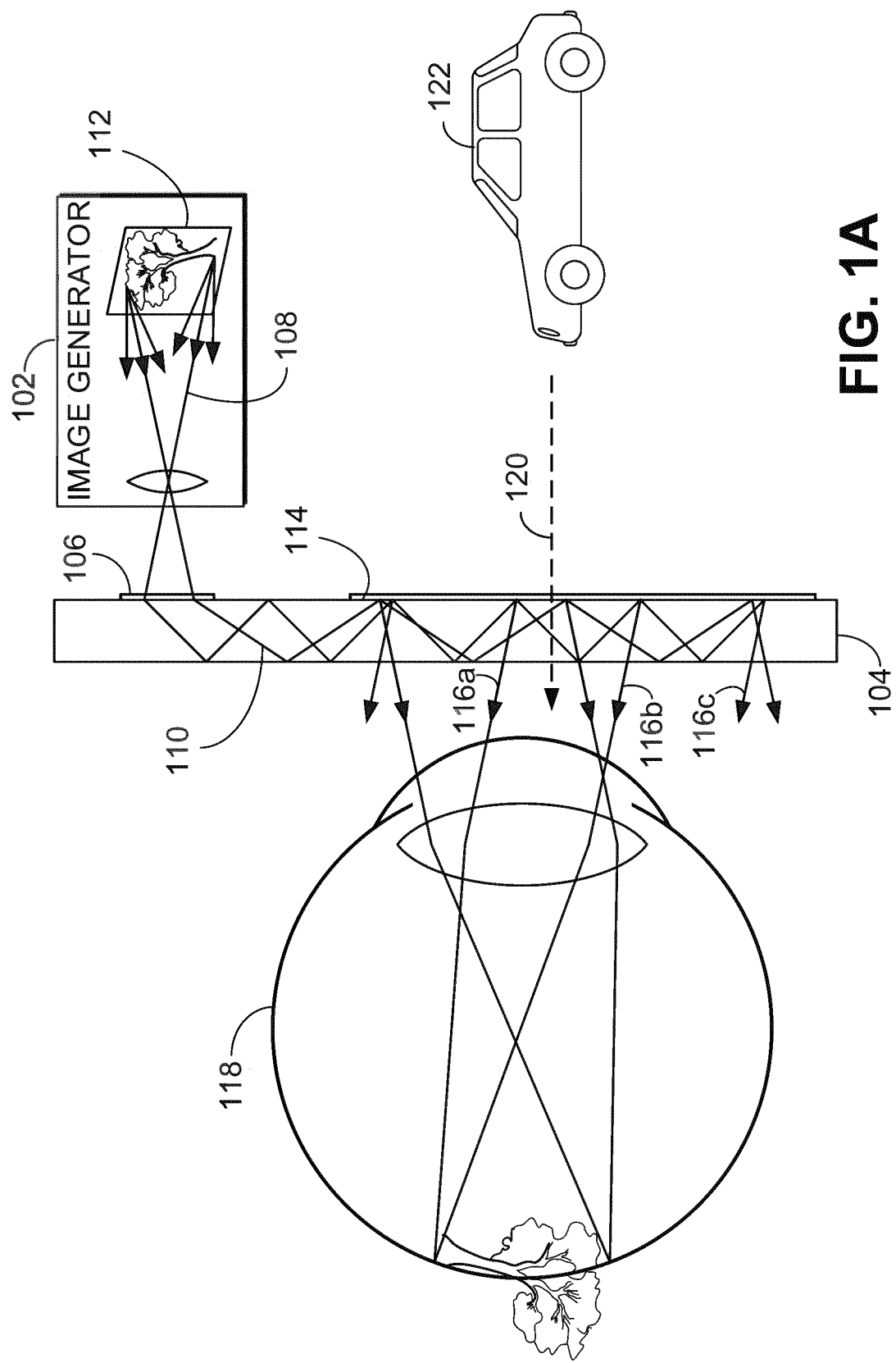
FIG. 1A is a cross-sectional schematic view of a waveguide display.

An example waveguide display device is illustrated in FIG. 1A. FIG. 1A is a schematic cross-sectional side view of a waveguide display device in operation. An image is projected by an image generator 102. The image generator 102 may use one or more of various techniques for projecting an image. For example, the image generator 102 may be a laser beam scanning (LBS) projector, a liquid crystal display (LCD), a light-emitting diode (LED) display (including an organic LED (OLED) or micro LED (µLED) display), a digital light processor (DLP), a liquid crystal on silicon (LCoS) display, or other type of image generator or light engine.

Light representing an image 112 generated by the image generator 102 is coupled into a waveguide 104 by a diffractive in-coupler 106. The in-coupler 106 diffracts the light representing the image 112 into one or more diffractive orders. For example, light ray 108, which is one of the light rays representing a portion of the bottom of the image, is diffracted by the in-coupler 106, and one of the diffracted orders 110 (e.g. the second order) is at an angle that is capable of being propagated through the waveguide 104 by total internal reflection.

At least a portion of the light 110 that has been coupled into the waveguide 104 by the diffractive in-coupler 106 is coupled out of the waveguide by a diffractive out-coupler 114. At least some of the light coupled out of the waveguide 104 replicates the incident angle of light coupled into the waveguide. For example, in the illustration, out-coupled light rays 116a, 116b, and 116c replicate the angle of the in-coupled light ray 108. Because light exiting the out-coupler replicates the directions of light that entered the in-coupler, the waveguide substantially replicates the original image 112. A user's eye 118 can focus on the replicated image.

In the example of FIG. 1A, the out-coupler 114 out-couples only a portion of the light with each reflection allowing a single input beam (such as beam 108) to generate multiple parallel output beams (such as beams 116a, 116b, and 116c). In this way, at least some of the light originating from each portion of the image is likely to reach the user's eye even if the eye is not perfectly aligned with the center of the out-coupler. For example, if the eye 118 were to move downward, beam 116c may enter the eye even if beams 116a and 116b do not, so the user can still perceive the bottom of the image 112 despite the shift in position. The out-coupler 114 thus operates in part as an exit pupil expander in the vertical direction. The waveguide may also include one or more additional exit pupil expanders (not shown in FIG. 1A) to expand the exit pupil in the horizontal direction.

In some embodiments, the waveguide 104 is at least partly transparent with respect to light originating outside the waveguide display. For example, at least some of the light 120 from real-world objects (such as object 122) traverses the waveguide 104, allowing the user to see the real-world objects while using the waveguide display. As light 120 from real-world objects also goes through the diffraction grating 114, there will be multiple diffraction orders and hence multiple images. To minimize the visibility of multiple images, it is desirable for the diffraction order zero (no deviation by 114) to have a great diffraction efficiency for light 120 and order zero, while higher diffraction orders are lower in energy. Thus, in addition to expanding and out-coupling the virtual image, the out-coupler 114 is preferably configured to let through the zero order of the real image. In such embodiments, images displayed by the waveguide display may appear to be superimposed on the real world.

In some embodiments, as described in further detail below, a waveguide display includes more than one waveguide layer. Each waveguide layer may be configured to preferentially convey light with a particular range of wavelengths and/or incident angles from the image generator to the viewer.

As illustrated in FIGS. 1B and 1C, waveguide displays having in-couplers, out-couplers, and pupil expanders may have various different configurations. An example layout of one binocular waveguide display is illustrated in FIG. 1B. In the example of FIG. 1B, the display includes waveguides 152a, 152b for the left and right eyes, respectively. The waveguides include in-couplers 154a,b, pupil expanders 156a,b, and components 158a,b, which operate as both out-couplers and horizontal pupil expanders. The pupil expanders 156a,b are arranged along an optical path between the in-coupler and the out-coupler. An image generator (not shown) may be provided for each eye and arranged to project light representing an image on the respective in-coupler.

An example layout of another binocular waveguide display is illustrated in FIG. 1C. In the example of FIG. 1C, the display includes waveguides 160a, 160b for the left and right eyes, respectively. The waveguides include in-couplers 162a, b. Light from different portions of an image may be coupled by the in-couplers 162a,b to different directions within the waveguides. In-coupled light traveling toward the left passes through pupil expanders 164a,b, while in-coupled light traveling toward the right passes through pupil expanders 166a,b. Having passed through the pupil expanders, light is coupled out of the waveguides using components 168a,b, which operate as both out-couplers and vertical pupil expanders to substantially replicate an image provided at the in-couplers 162a,b.

In different embodiments, different features of the waveguide displays may be provided on different surfaces of the waveguides. For example (as in the configuration of FIG. 1A), the in-coupler and the out-coupler may both be arranged on the anterior surface of the waveguide (away from the user's eye). In other embodiments, the in-coupler and/or the out-coupler may be on a posterior surface of the waveguide (toward the user's eye). The in-coupler and out-coupler may be on opposite surfaces of the waveguide. In some embodiments, one or more of an in-coupler, an out-coupler, and a pupil expander, may be present on both surfaces of the waveguide. The image generator may be arranged toward the anterior surface or toward the posterior surface of the waveguide. The in-coupler is not necessarily on the same side of the waveguide as the image generator. Any pupil expanders in a waveguide may be arranged on the anterior surface, on the posterior surface, or on both surfaces of the waveguide. In displays with more than one waveguide layer, different layers may have different configurations of in-coupler, out-coupler, and pupil expander.

FIG. 1D is a schematic exploded view of a double waveguide display according to some embodiments, including an image generator 170, a first waveguide (WG$_1$) 172, and a second waveguide (WG$_2$) 174. FIG. 1E is a schematic side-view of a double waveguide display according to some embodiments, including an image generator 176, a first waveguide (WG$_1$) 178, and a second waveguide (WG$_2$) 180. The first waveguide includes a first transmissive diffractive in-coupler (DG1) 181 and a first diffractive out-coupler (DG6) 182. The second waveguide has a second transmissive diffractive in-coupler (DG2) 184, a reflective diffractive in-coupler (DG3) 186, a second diffractive out-coupler (DG4) 188, and a third diffractive out-coupler (DG5) 190. Different embodiments may use different arrangements of optical components (such as different arrangements of pupil expanders) on the first and second waveguides.

While FIGS. 1A-1E illustrate the use of waveguides in a near-eye display, the same principles may be used in other display technologies, such as head up displays for automotive or other uses.

Figure 2A:
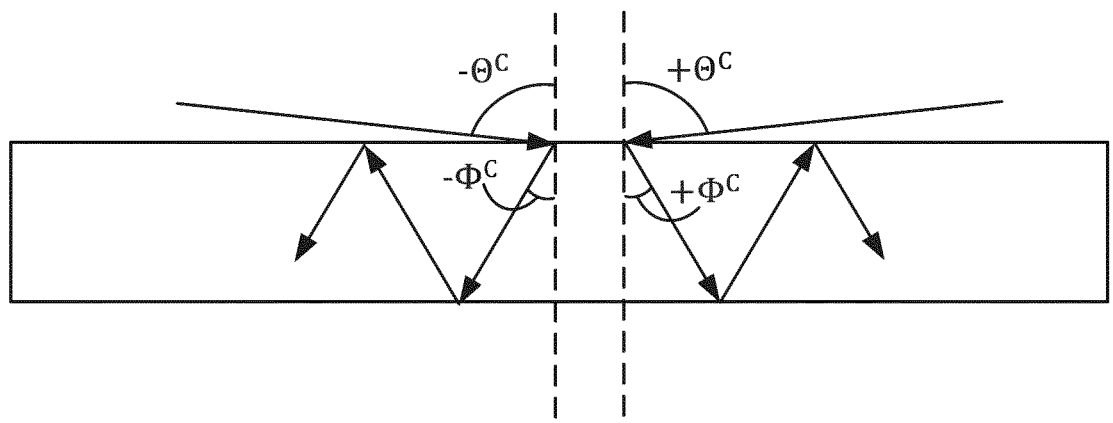
FIGS. 2A-2C illustrate a field of view of an example waveguide.
Figure 2B:
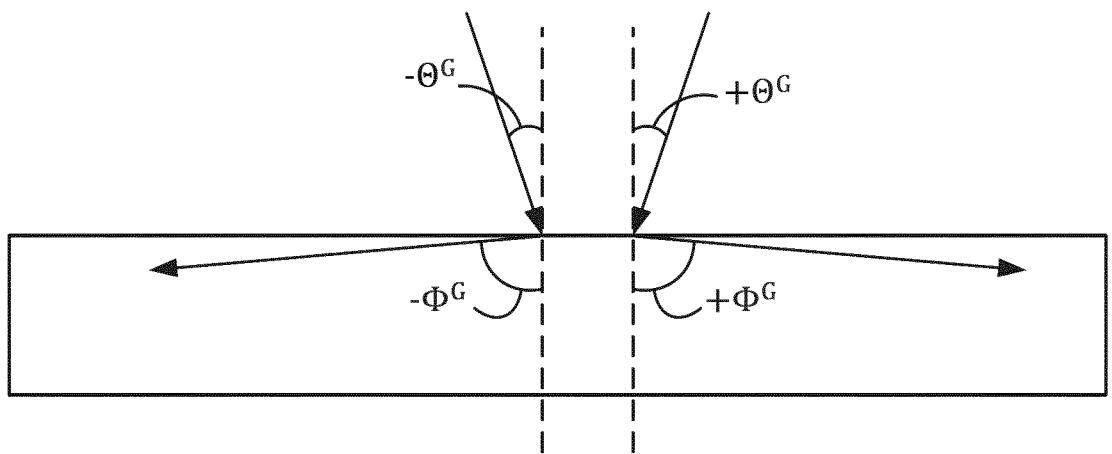
Figure 2C:
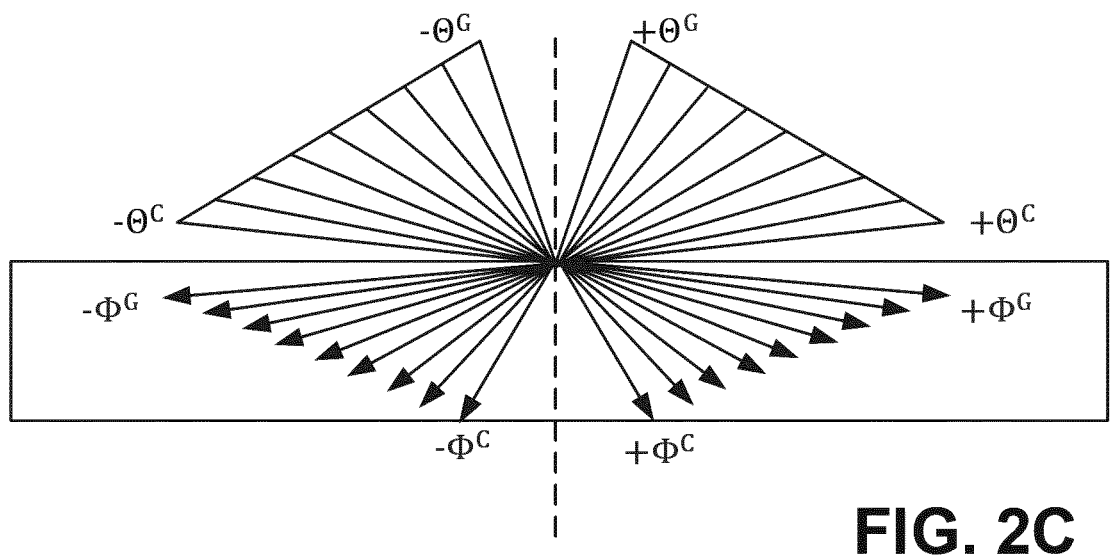

The field of view of a waveguide may be described by reference to the maximum span of $\theta_1^+ - \theta_1^-$ which propagates into the waveguide by TIR. As illustrated by FIGS. 2A-2C, the largest angular span that can be coupled into the dual-mode waveguide may be represented by two rays: the critical ray ($\theta^C$ in FIGS. 2A-2C) having incident angle $\theta^C$ and the grazing ray ($\theta^G$ in FIGS. 2A-2C) having incident angle $\theta^G$. The critical ray is the light ray that just diffracts into the waveguide at the critical angle $\Phi^C$ expressed by $$\sin \Phi^C = \frac{1}{n_2(\lambda)}$$

where $n_2$ is the refractive index of the waveguide's material at wavelength $\lambda$, where $\lambda$ the wavelength of the incident light. Above the critical angle $\Phi^C$, total internal reflection (TIR) occurs, as illustrated in FIG. 2A. The grazing ray is the ray having an input angle $\theta^G$ that diffracts into the waveguide at grazing incidence $\Phi^G$ that approaches 90°, as illustrated in FIG. 2C. In some cases, the grazing ray has an input angle $\theta^G$ at or near 0°, although $\theta^G$ is illustrated with a larger angle in FIG. 2C for the sake of legibility. In some embodiments, the range of angles of light that is coupled to the left may overlap with the range of angles of light that is coupled to the right. The theoretical FoV of a waveguide presented above is for a single mode system where one single diffraction mode is used to carry the image: either +1 or −1 diffraction mode.

The field of view in systems based on optical waveguides may be limited by the angular bandwidth of the glass plate. If one mode is diffracted into the glass plate, the FoV may be described as a function of the index of refraction of the material of the glass plate. The FoV of a waveguide of refractive index $n_2$ is given by:

$$\Delta\theta_1 = 2 \sin^{-1}\left(\frac{n_2 - 1}{2}\right)$$

For $n_2$=1.5 the total field of view for a single mode system is rather limited to $\Delta\theta_1$=28.96 degrees. It can be seen that 60 degrees FoV may be a practical limit for a single-mode flat waveguide due to the lack of general availability of materials with a refractive index above 2.0.

The field of view of an optical waveguide can be further extended by taking advantage of a second direction of propagation inside of the waveguide.

Example Two-Waveguide Solution for a Full RGB System

Figure 3:
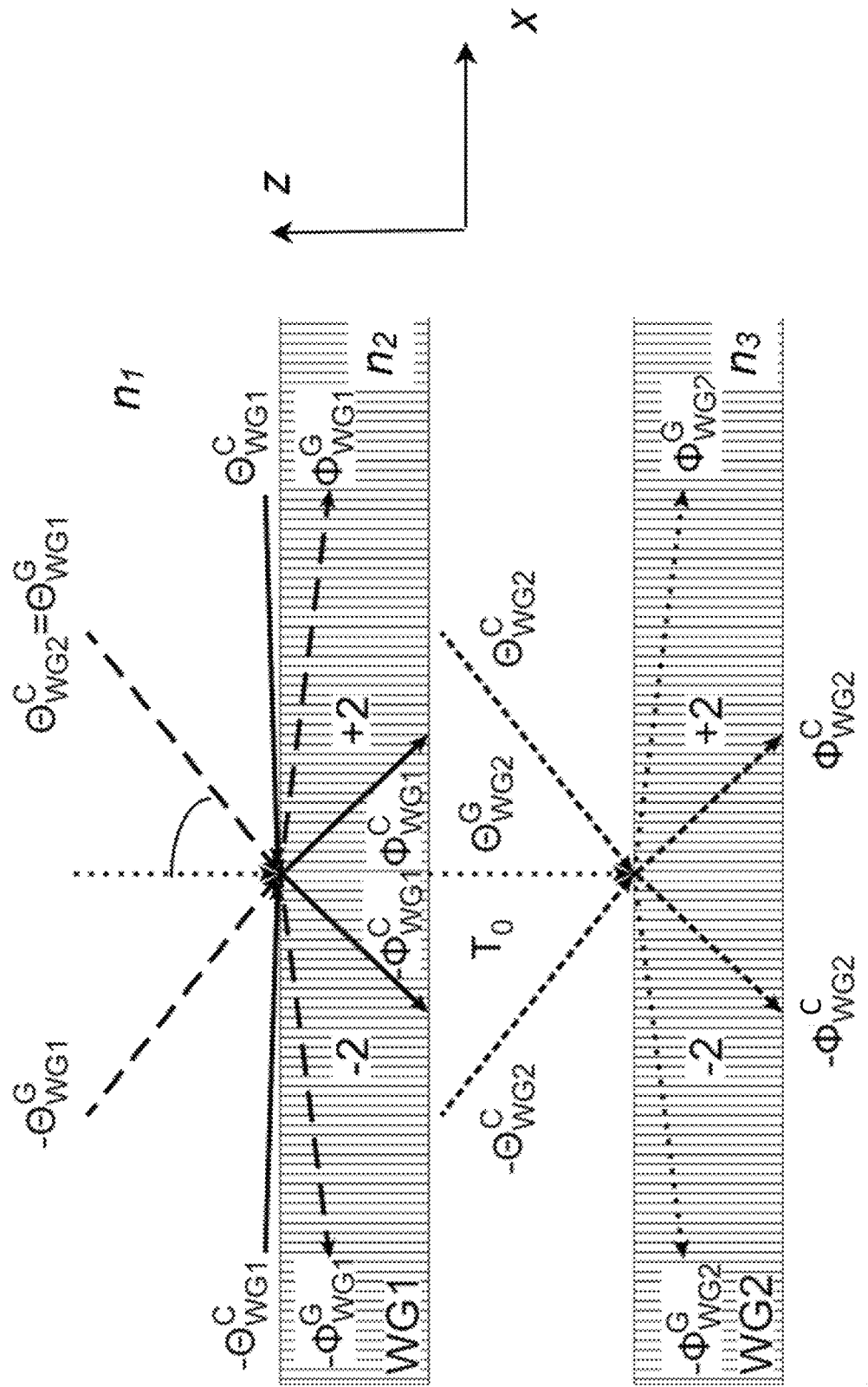
FIG. 3 is a schematic side view of a portion of a double-waveguide display illustrating angles of incident and diffracted light according to some embodiments.

FIG. 3 is a schematic illustration of a two-waveguide stack with one diffraction grating per each waveguide. The system of FIG. 3 uses higher-order modes and over-wavelength gratings to provide a wide field of view. Angles whose name begin with letter $\Theta$ are located into air. Angles whose name begin with $\phi$ are located into the waveguides and measure the angle of rays that have been diffracted. The superscript C refers to a critical ray, either in air or in the waveguide, and the superscript G refers to a grazing ray. Some embodiments operate to split the field of view and distribute it in two waveguides.

Example embodiments use over-wavelength gratings and second orders of diffraction in order to couple high angles of incidence for the ultra-high field of view into a first waveguide (WG1). In some examples, the high angles of incidence coupled into a first waveguide correspond to the angles with the absolute values that are above $\Delta\theta_1/2$. In this case the low angles of incidence are the angles with the absolute values below $\Delta\theta_1/2$. Some such embodiments provide a FoV that is wider than the FoV obtained by the above formula for $\Delta\theta_1$.

From FIG. 3, the angular ranges $[\Theta^C_{WG1}; \Theta^G_{WG1}]$ and $[-\Theta^C_{WG1}; -\Theta^G_{WG1}]$ diffract inside of the first waveguide WG1 into the angular ranges $[(\phi^C_{WG1}; \phi^G_{WG1}]$ and $[-\phi^G_{WG1}; -\phi^G_{WG1}]$.

The angular range between $[-\Theta^G_{WG1}; \Theta^G_{WG1}]$ transmits through the first diffraction grating (it corresponds to the 0 transmitted order $T_0$) with a high efficiency.

Into the first waveguide, the left hand side of the image will propagate toward the left into the waveguide while the right hand side of the image will propagate toward the right.

The transmitted beam has an angular extent from $[-\Theta^C_{WG2}; \Theta^C_{WG2}]$, the grazing rays being in the vicinity of the normal. $T_0$ will diffract on a second grating which is on the top of the second waveguide WG2 and positive angles of incidence will propagate toward the right in the waveguide while negative angles of incidence will propagate toward the left into WG2. The second grating is different from the first one in that it has a different pitch size. However, in some embodiments, the geometrical structure may be of the same shape as the one from previous waveguide. The grating shapes may be selected to emphasize nanojet-waves.

Different embodiments may employ different techniques to provide a full-color display using only two waveguides.

In some embodiments, the pitch sizes of the first (DG1 with the pitch d1) and second (DG2 with the pitch d2) diffraction gratings are configured to provide high diffraction efficiency for green-color light at ±2nd diffraction orders in the angular range covering the full FoV (see FIG. 3). In such embodiments, the first waveguide preferentially couples high angles of incidence and the second one preferentially couples low angles of incidence.

A similar angular distribution with the shift toward the lower angles will correspond to the blue color diffraction by these two gratings. (As illustrated below in FIG. 5, the first waveguide will preferentially couple high and low angles of incidence, and the second waveguide will couple the low angles.) For blue color diffraction by DG2, there is some angular overlapping of the ±2nd diffraction orders. As a result, the positive diffraction order will correspond to positive and some range of negative angles of incidence, and the negative diffraction order will correspond to negative and some positive angles of incidence. There is a range of low angles for which there is a response for both diffraction orders (angular overlapping of the characteristics). This may be helpful to be taken into account to limit the undesirable deterioration of the image quality.

In a case of the red color, the angular distribution of the angles of incidence coupled by the first and second waveguides will be shifted toward the higher angles. As illustrated in FIG. 5, first diffraction grating DG1 will preferentially diffract very high angles of incidence, and the second waveguide will couple the high and low angles of incidence. Lower remaining angles of incidence will transmit through the second diffraction grating with high efficiency. To couple this transmitted beam into the second waveguide (WG2), example embodiments use a third reflective diffraction grating (DG3 with the pitch $d_3$) which will be placed on the bottom of the second waveguide WG2 and positive angles of incidence will propagate toward the left (see FIG. 4A) while negative angles of incidence will propagate toward the right in WG2. To improve the performance of the reflective diffraction grating and protect it, the surface of DG3 may be covered by a thin metallic layer.

In a second example, the system is configured to take into account partial overlapping of the characteristics reflected by the third diffraction grating at the wavelength corresponding to the green color. In such embodiments, the first two diffraction gratings are configured to cover the full FoV for blue color and to cover high and low angles (only part of low angles) of incidence for green and red color. The third diffraction grating will diffract the remaining angular ranges corresponding to the low angles of incidence for green and red colors.

Figure 4A:
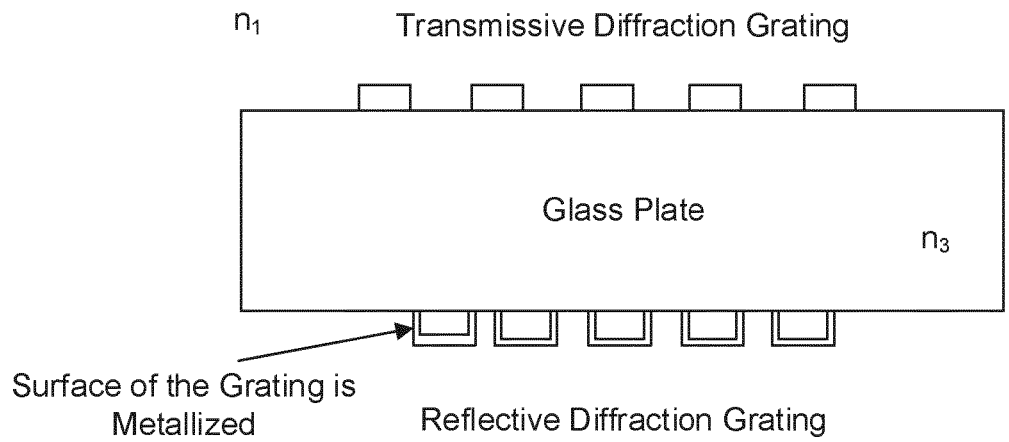
FIGS. 4A-4B are schematic side views of an input pupil region of a second waveguide in a double-waveguide display.
Figure 4B:
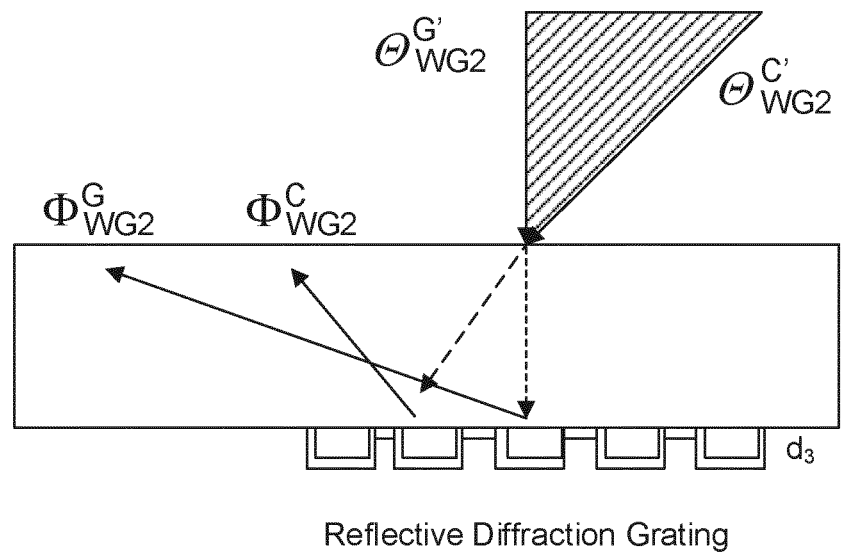
Figure 5:
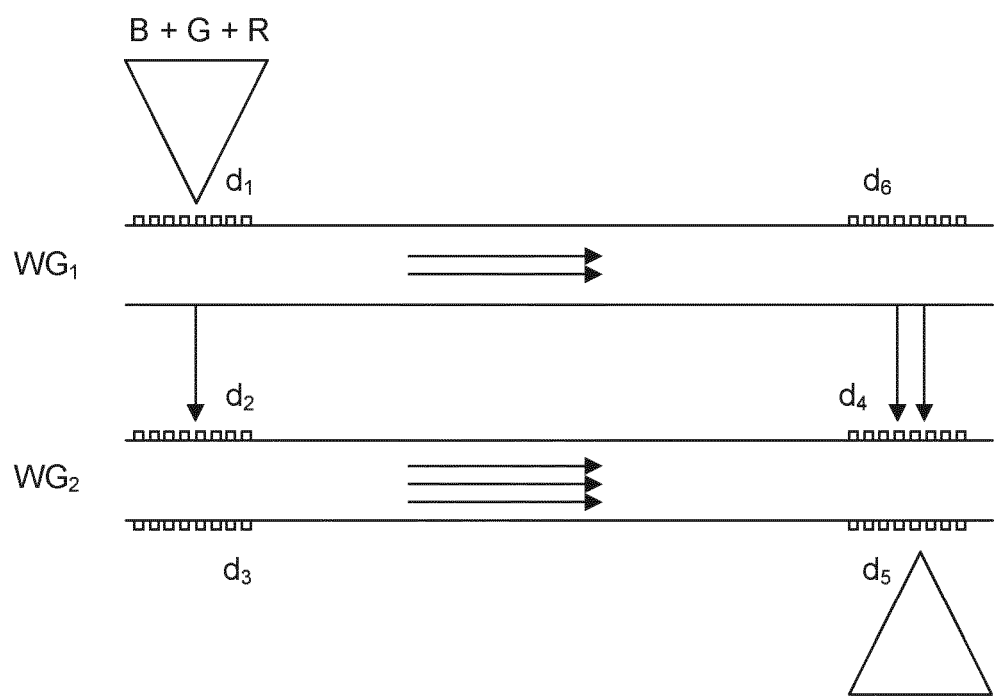
FIG. 5 is a schematic side view of a portion of a double-waveguide display according to some embodiments.

FIG. 4A is a schematic diagram of a second waveguide WG2 system with two diffraction grating in-couplers. FIG. 4B is a schematic diagram of a span of angles diffracted into the left-hand side of the waveguide by DG3. Angles whose name begin with letter $\Theta$ are located into air. Angles whose name begin with $\phi$ are located into the waveguides and measure the angle of rays that have been diffracted. The superscript C' indicates a critical incident ray for DG3, and the superscript G' indicates is a grazing ray for DG3.

In some embodiments, the following four diffraction equations are used in selecting the pitch sizes $d_1$ and $d_2$ of the transmissive diffraction gratings DG1 and DG2 of two waveguides WG1 and WG2 to provide the total field of view coupled by the optical device illustrated in FIG. 3:

$$n_2 \sin \Phi_{WG1}^C + \sin \Theta_{WG1}^C = \frac{M_1 \lambda}{d_1}$$

$$n_2 \sin \Phi_{WG1}^G + \sin \Theta_{WG1}^G = \frac{M_1 \lambda}{d_1}$$

$$n_3 \sin \Phi_{WG2}^C + \sin \Theta_{WG2}^C = \frac{M_2 \lambda}{d_2}$$

$$n_3 \sin \Phi_{WG2}^G + \sin \Theta_{WG2}^G = \frac{M_2 \lambda}{d_2}$$

Eq. 1

In these equations, the assumption is made that the refractive index of the ambient material (e.g. air) is equal to one ($n_1=1$). Some values determined by choice of materials, e.g., $$\sin \Phi_{WG1}^C = \frac{1}{n_2},$$

as well as $$\sin \Phi_{WG2}^C = \frac{1}{n_3},$$

where $n_2$ is a refractive index of the first waveguide's material, $n_3$ is a refractive index of the second waveguide's material, and $M_1$ and $M_2$ correspond respectively to the diffraction orders of the first and second diffraction gratings DG1 and DG2. According to an embodiment of the present disclosure, $\phi^G_{WG1}$ and $\phi^G_{WG2}$ are chosen to approximately equal to 75°.

Specific values are given herein as parameters used in some embodiments, but other values can be selected for other embodiments. The values chosen for $\phi^G_{WG1}$ and $\phi^G_{WG2}$ may be chosen according to the distance the image has to travel into the waveguide before being extracted, the number of TIR bounces, and the thickness of the waveguide.

According to at least one embodiment disclosed herein, $\Theta^G_{WG2}$ is chosen to be −1° for instance for $\lambda = \lambda^G = 530$ nm. Here $\lambda^G$ is the wavelength corresponding to the green color. Other values are also possible depending on the design conditions: whether it is desired to superimpose the left and right images in the middle of the final image, or if no crossing/overlapping of the left and right images is desired.

Hence, we can solve the previous set of equations for the pitch sizes. From the last one:

$$d_2 = \frac{M_2 \lambda}{n_3 \sin \Phi_{WG2}^G + \sin \Theta_{WG2}^G} \qquad \text{Eq. 2}$$

and replacing in the previous equation, we can get the critical incident angle of the second grating:

$$\sin \Theta_{WG2}^C = -1 + \frac{M_2 \lambda}{d_2} \qquad \text{Eq. 3}$$

Then, as $$\Theta_{WG2}^C \approx \Theta_{WG1}^G, \, d_1 = \frac{M_1 \lambda}{n_2 \sin \Phi_{WG1}^G + \sin \Theta_{WG1}^G}, \text{ and } \sin \Theta_{WG1}^C = -1 + \frac{M_1 \lambda}{d_1}.$$

So, we can present the equations for the pitch sizes in the such form:

$$d_1 = \frac{M_1 \lambda}{n_2 \sin \Phi_{WG1}^G + \sin \Theta_{WG1}^G}, \, d_2 = \frac{M_2 \lambda}{n_3 \sin \Phi_{WG2}^G + \sin \Theta_{WG2}^G}. \qquad \text{Eq. 4}$$

To calculate the pitch size $d_3$ of the reflective diffraction grating DG3 of the second waveguide WG2 we use such 2 diffraction grating equations:
Then, $$n_3 \sin \Phi_{WG2}^C - \sin \Theta_{WG2}^{C'} = \frac{N\lambda}{d_3} \qquad \text{Eq. 5}$$

-continued $$n_3 \sin \Phi_{WG2}^G - \sin \Theta_{WG2}^{G'} = \frac{N\lambda}{d_3}$$

Here N corresponds to the diffraction order $$d_3 = \frac{N\lambda}{n_3 \sin \Phi_{WG2}^G - \sin \Theta_{WG2}^{G'}} \text{ and } \sin \Theta_{WG2}^{G'} = 1 + \frac{N\lambda}{d_3}.$$

of third diffraction grating DG3. Let us note that for negative angles of incidence we get positive diffracted angles corresponding to positive diffraction order and correspondingly for positive angles of incidence we obtain negative diffracted angles for negative mode (see FIG. 4B for the case of positive angles of incidence and corresponding negative diffracted angles for negative diffraction order). The equation for the pitch of DG3 can be presented in the form:

$$d_3 = \frac{N\lambda}{n_3 \sin \Phi_{WG2}^G - \sin \Theta_{WG2}^{G'}} \quad \text{Eq. 6}$$

Those equations can be used to calculate the partial field of views of each waveguide and the final field of view. Table 1 shows some practical parameters and the calculated values according to the previously solved set of equations for three diffraction gratings configured for three different wavelengths and for $n_2=n_3=1.7$:

TABLE 1

|  | $\lambda = 460$ nm | $\lambda = 530$ nm | $\lambda = 625$ nm |
|---|---|---|---|
| WG1, DG1 ($M_1 = 2$) | | $d_1 = 471.27$ nm | |
| $\Theta^G_{WG1}$ | 18.07° | 37.39° | 75° |
| $\Phi^G_{WG1}$ | 75° | 75° | 75° |
| $\Theta^C_{WG1}$ | 72.21° | 90° | >90° |
| WG2, DG2 ($M_2 = 2$) | | $d_2 = 652.46$ nm | |
| $\Theta^G_{WG2}$ | −13.42° | −1° | 15.89° |
| $\Phi^G_{WG2}$ | 75° | 75° | 75° |
| $\Theta^C_{WG2}$ | 24.21° | 38.65° | 66.32° |
| WG2, DG3 (N = 2) | | $d_3 = 769.41$ nm | |
| $\Theta^G_{WG2}$ | | | 1.7° |
| $\Phi^{G'}_{WG2}$ | | | 75° |
| $\Theta^C_{WG2}$ | | | −38.65° |

To avoid the black bands for some colors, in some embodiments, the FoV of full RGB system may be equal to 2×66.32=132.64° (this value corresponds to 2×$\Theta^C_{WG2}$ for red color). For purposes of the following description, the FoV is considered to be limited by the angular range $[-\Theta^{C*}_{WG2}; \Theta^{C*}_{WG2}]$, where $\Theta^{C*}_{WG2}$=66.32°. Such an embodiment achieves a wide field of view using just two waveguides, which is more than enough to cover the total human field of view where stereopsis is effective for human vision and which is of 114 degrees. In some embodiments, the index of refraction of both waveguides may be increased, and a full 180 degrees field of view can be achieved for full RGB system with two waveguides.

FIG. 5 is a schematic cross-sectional view of an example display system using two waveguides. The schematic view of a system of waveguides corresponding to the values proposed in Table 1 is presented in FIG. 5.

Figure 6A:
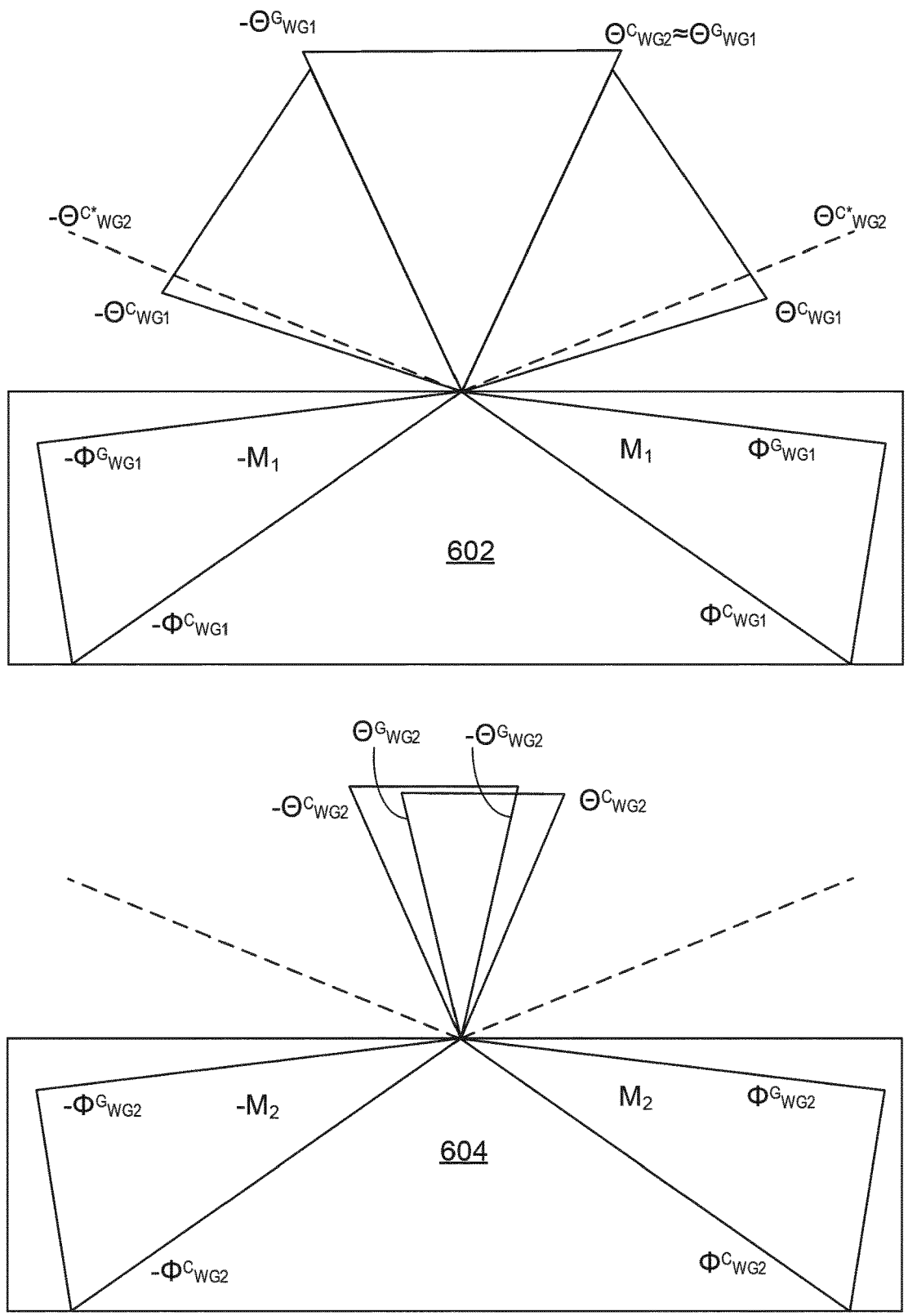

FIGS. 6A-C are schematic diagrams of a double-waveguide system with a wide field of view. The diagrams illustrate the coupling of light into the first waveguide (top) and second waveguide (bottom) at different incident angles for three different colors, corresponding to blue, green, and red, respectively. FIG. 6A illustrates coupling of blue light by the double-waveguide system. As shown in FIG. 6A, blue light at relatively higher angles of incidence is preferentially coupled into the first waveguide 602 by a first transmissive diffractive in-coupler, which may be on an anterior surface (top surface in FIGS. 6A-C) of the first waveguide. Blue light at relatively lower angles of incidence traverses the first waveguide and is preferentially coupled into the second waveguide 604 by a second transmissive diffractive in-coupler, which may be on an anterior surface of the second waveguide.

FIG. 6B illustrates coupling of green light by the double-waveguide system. FIG. 6B shows that green light at relatively higher angles of incidence is preferentially coupled into the first waveguide 602 by the first transmissive diffractive in-coupler of the first waveguide. Green light at relatively lower angles of incidence traverses the first waveguide and is preferentially coupled into the second waveguide 604 by the second transmissive diffractive in-coupler.

FIG. 6C illustrates coupling of red light by the double-waveguide system. FIG. 6C shows that little to no red light is coupled into the first waveguide. Instead, red light traverses the first waveguide and is preferentially coupled into the second waveguide. At relatively higher angles of incidence, the second transmissive diffractive in-coupler on the anterior surface (top surface, in FIG. 6C) of the second waveguide preferentially couples red light into the second waveguide. At relatively lower angles of incidence, a reflective diffractive in-coupler on the posterior surface (bottom surface, in FIG. 6C) of the second waveguide preferentially couples red light into the second waveguide.

Figure 7:
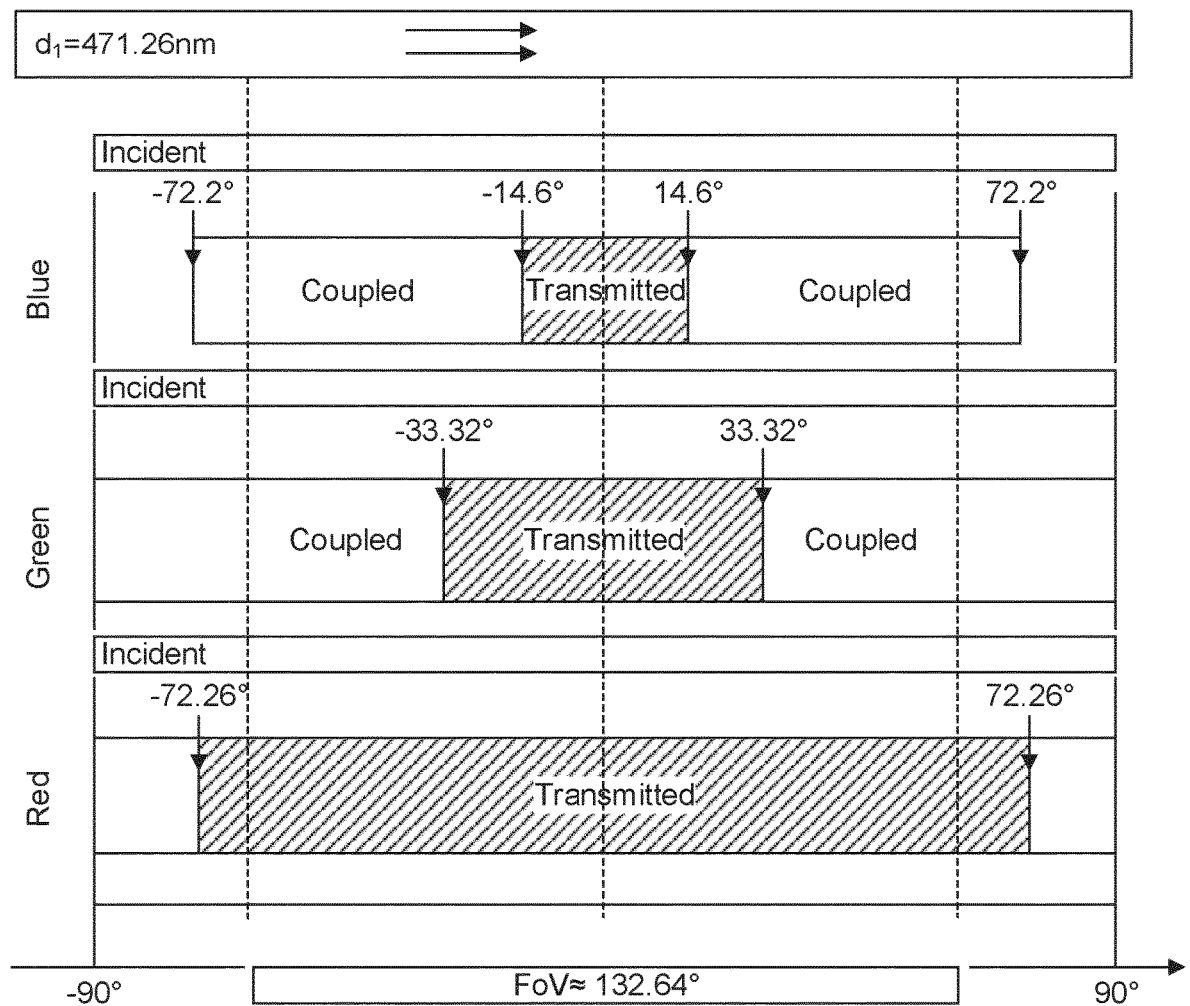
FIG. 7 is a chart illustrating ranges of angles of incident light coupled into the first waveguide of a double-waveguide display for blue, green, and red light in some embodiments.

Schematic explanations of the role of each waveguide with respect to the wavelength and angular range of RGB image with 132.64 degrees field of view are presented in FIGS. 6A-C and FIG. 7. FIGS. 6A-C schematically depict the working principal of the system for three colors. The possible values of the angles are presented in Table 1. FIG. 7 is a chart illustrating coupling and transmission of different colors of light by an embodiment with two waveguides, starting from the WG1 with diffraction grating DG1, which couples blue and green colors. An RGB image is provided as input, and the three colors may be superimposed but for clarity of illustration, they are shown separately in order emphasize the difference in behavior of each color. The schematics explain the angular space for each color (starting from blue color).

FIG. 7 illustrates information about the angular space for the incident light, coupled by the waveguide and transmitted through the waveguide. In this figure, the minimal values of the angles for the angular ranges coupled by the waveguide were determined with the assumption that the grazing angles inside the waveguides are equal to 90°. For the second waveguide, FIG. 8 illustrates the portion of light coupled by this waveguide using $\pm2^{nd}$ diffraction orders of the DG2, and portion of directly transmitted light corresponding to the zeroth diffraction order of the DG2 (see the left part of FIG. 8) which can be coupled by this waveguide only using the third reflective diffraction grating DG3 (see the right part of FIG. 8).

Figure 8:
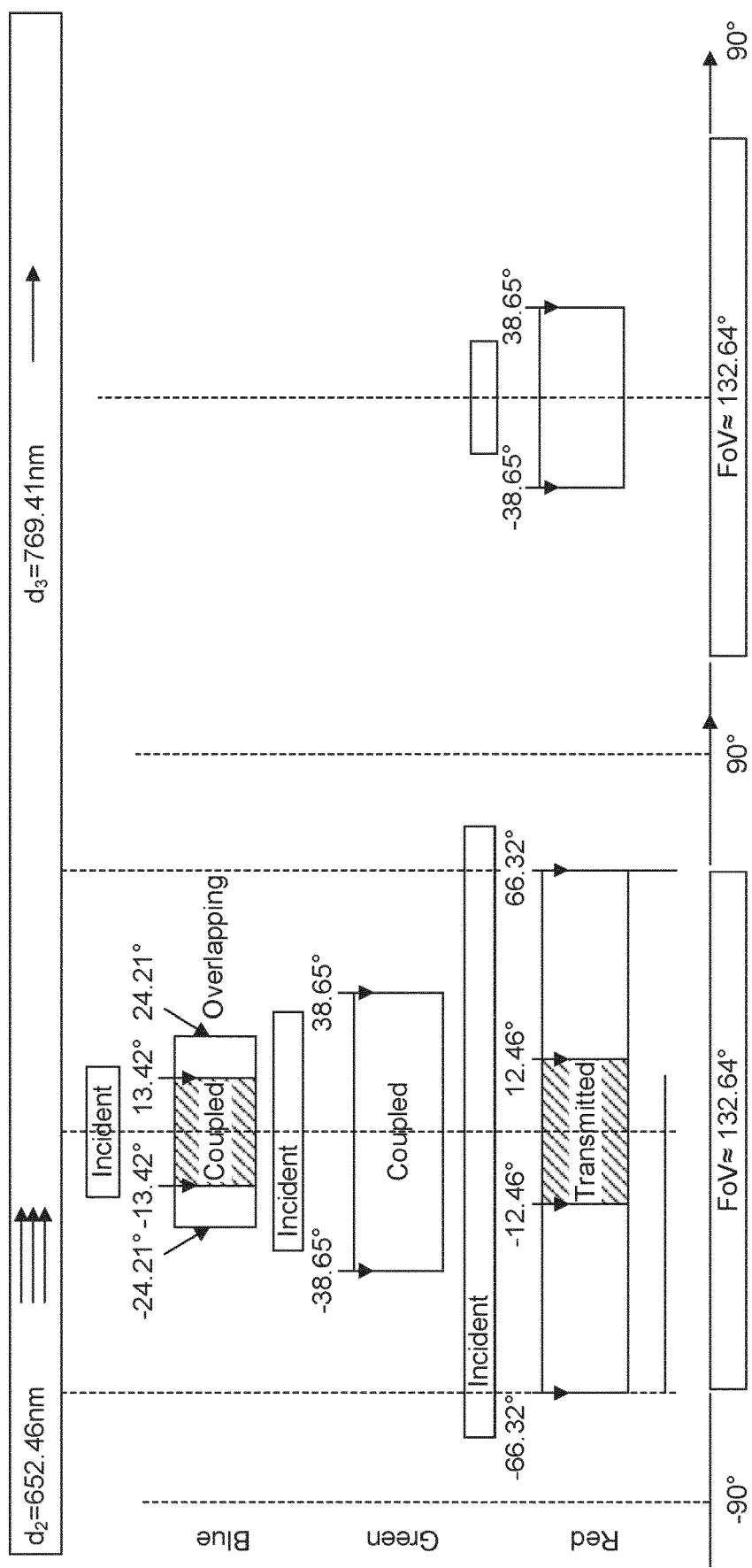
FIG. 8 is a chart illustrating ranges of angles of incident light coupled into the first waveguide of a double-waveguide display for blue, green, and red light in some embodiments.

It is apparent from FIGS. 7 and 8 and that two waveguides can couple wide field of view of 132.64 degrees by multiplexing different combination of colors and angular space.

The dimensions of the reflective diffraction grating DG2 may be selected to be sufficiently small (given the thickness of the second diffraction grating) that the $\pm2^{nd}$ diffraction orders of the DG2 do not impinge on DG3. As noted above, the FoV of the whole system may be limited by the FoV obtained for red color diffracted by the DG2.

FIG. 7 is a schematic diagram illustrating the role of first waveguide (WG1) with respect to the wavelength and angular range of an RGB image with 132.64 degrees field of view. The first waveguide has one transmissive diffraction grating in-coupler (DG1 with pitch $d_1$).

FIG. 8 is a schematic diagram illustrating the role of second waveguide with respect to the wavelength and angular range of RGB image with 132.64 degrees field of view. The second waveguide has two diffraction grating in-couplers (transmissive DG2 with pitch $d_2$ and reflective diffraction grating DG3 with pitch $d_3$).

Unpolarized Light Diffraction Grating Embodiments

In this section we present the set of numerical simulations for the 2 types of transmissive diffraction gratings (with twin (FIG. 9A) and U-shape (FIG. 9B) meta-elements) with high refractive index configured to generate intensive ±2nd diffraction orders for both polarization (TE and TM) simultaneously.

Figures 9A, 9B, 9C, 9D:
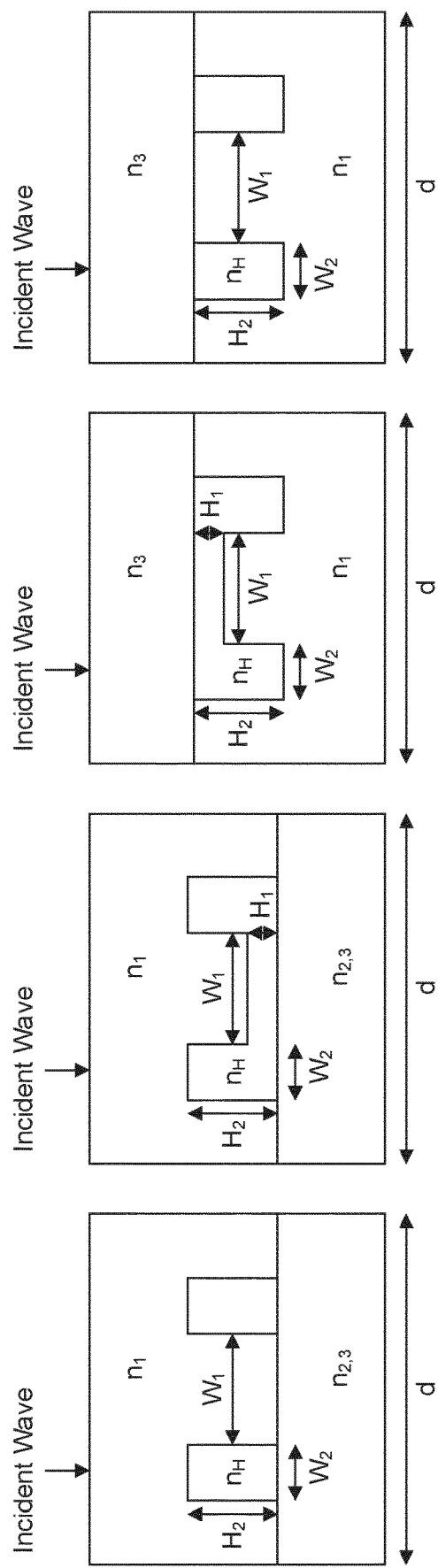
FIGS. 9A-9D are cross-sectional views illustrating examples of elements of diffractive grating structures that can be used as diffractive in-couplers and/or out-couplers in some embodiments.

FIG. 9A is a cross-section view of a base pattern of the diffraction grating with a twin-shape meta-element of transmissive grating. FIG. 9B is a cross-section view of the base pattern of the diffraction grating with a U-shape meta-element of transmissive grating. FIG. 9C is a cross-section view of the base pattern of the diffraction grating with a U-shape meta-element of reflective grating. FIG. 9D is a cross-section view of the base pattern of the diffraction grating with a twin-shape meta-element of reflective grating.

The presented data were obtained using the COMSOL Multiphysics software. The simulated embodiment uses $TiO_2$ as the material of the elements of the gratings and glass with refractive index $n_2 = n_3 = 1.7$ as the material of the substrate. The presented numerical simulations take into account the dispersion of $TiO_2$ material, as described in J. R. Devore, "Refractive indices of rutile and sphalerite," J. Opt. Soc. Am. 41, 416-419 (1951). In accordance with the results of ordinary spectra measurements presented in this paper, for three different colors we use the following values of the refractive index (see FIG. 10):

Blue color($\lambda$=460 nm)–$nH$=2.7878;

Green color($\lambda$=530 nm)–$nH$=2.6702;

Red color($\lambda$=625 nm)–$nH$=2.5884.

Figure 10:
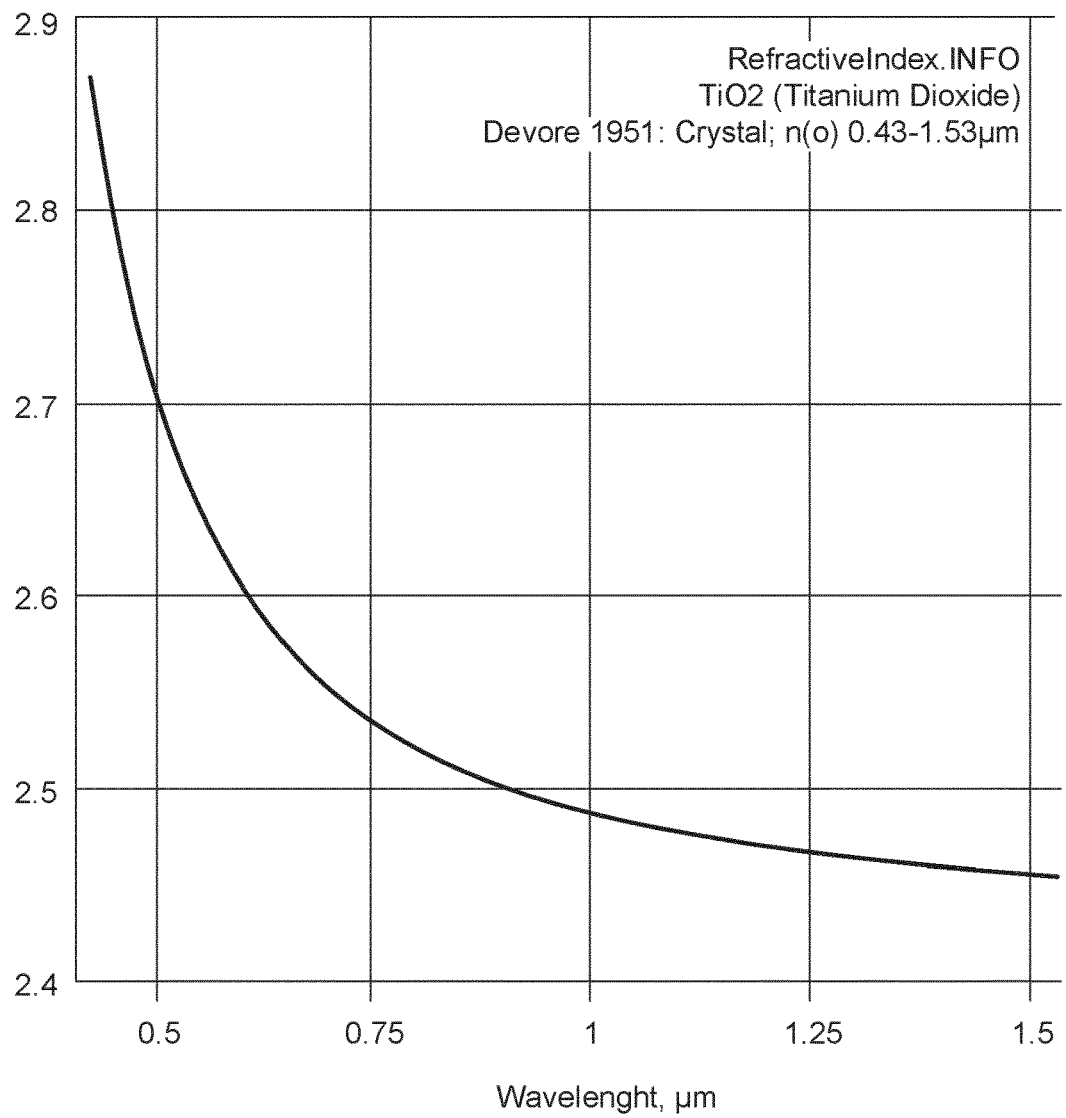
FIG. 10 illustrates the refractive index of $TiO_2$ for different wavelengths.

FIG. 10 is a graph of the refractive index for $TiO_2$ for a range of wavelengths.

Results of numerical simulations for two types of diffraction gratings (twin and U-shape topologies) with high refractive index configured for use with both polarizations are presented in FIGS. 12-22. In the simulated embodiments, $n_1$ is the refractive index of host medium and $n_1=1$. We have considered the combination of two waveguides for a full RGB system with FoV=132.64°.

The first transmissive grating DG1 for the first waveguide (WG1) configured for the green color to couple ±2nd orders at high angles of incidence has a pitch size $d_1$=471.27 nm and the twin-shape meta-elements with $W_1$=130 nm; $W_2$=110 nm; $H_2$=240 nm. Combining the response for both polarizations we can get quite good diffraction uniformity of the ±2nd order transmitted wave at the wavelengths corresponding to green and blue colors for the angles of incidence −66.34°-+66.34° (see Table 1 and FIG. 7).

The second transmissive grating DG2 for the second waveguide (WG2) configured for the green color to couple $\pm2^{nd}$ orders at low angles of incidence has a pitch size $d_2$=652.46 nm and such parameters of twin-shape meta-elements: $W_1$=180 nm; $W_2$=140 nm; $H_2$=240 nm. Using the additional block with the height $H_1$=20 nm, we obtain the U-shaped meta-elements. Combination of the responses for both polarizations will provide high diffraction uniformity of total response for three colors at different ranges of the angles (see Table 1 and FIG. 8). The presented examples for two different meta-elements demonstrate the effect of meta-element topology on the performance of the system.

The third reflective grating DG3 for the second waveguide (WG2) is configured for the red color wavelength to convert the portion of the red light transmitted by the second diffraction grating (0 transmitted order TO) into the $\pm2^{nd}$ diffracted orders which will be coupled by the WG2. The topologies described herein (for example, U-shape and twin-shape topologies) of meta-elements can be also used for high-performance over-wavelength in-coupling high refractive index dispersive material reflective grating, which also can generate intensive $\pm2^{nd}$ diffraction orders for both polarizations (TE and TM) simultaneously. To prevent the transmission through the waveguide and increase the intensity of diffracted light, in some embodiments, the surface of the diffraction grating is metallized (see FIG. 11). In an embodiment, the third diffraction grating has a pitch size $d_3$=769.41 nm and the twin-shape meta-elements have $W_1$=180 nm; $W_2$=200 nm; $H_2$=400 nm. For the U-shape system in this example, the height of the central block is equal to $H_1$=20 nm.

Figure 11:
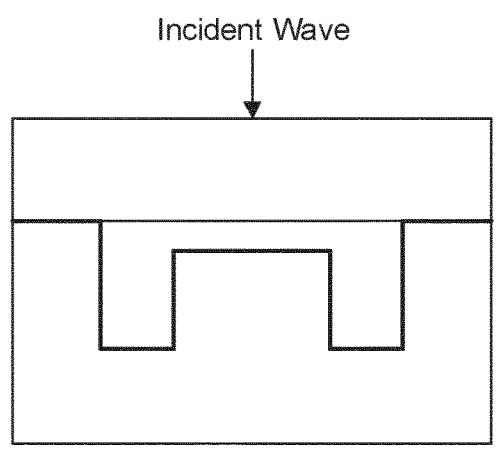
FIG. 11 is a cross-sectional view of the base pattern of a metalized U-shape meta-element of a reflective grating in-coupler.

FIG. 11 is a cross-sectional view of the base pattern of the metalized U-shape meta-element of the reflective grating in-coupler. The metalized surface is depicted by the dark line.

FIGS. 12A-F depict diffraction performance of the two-waveguide system for green light. The simulated embodiment uses a twin-shape diffraction grating DG1 for the first waveguide WG1. Both U-shape and twin-shape diffraction gratings DG2 were simulated for the second waveguide WG2.

Figure 12A:
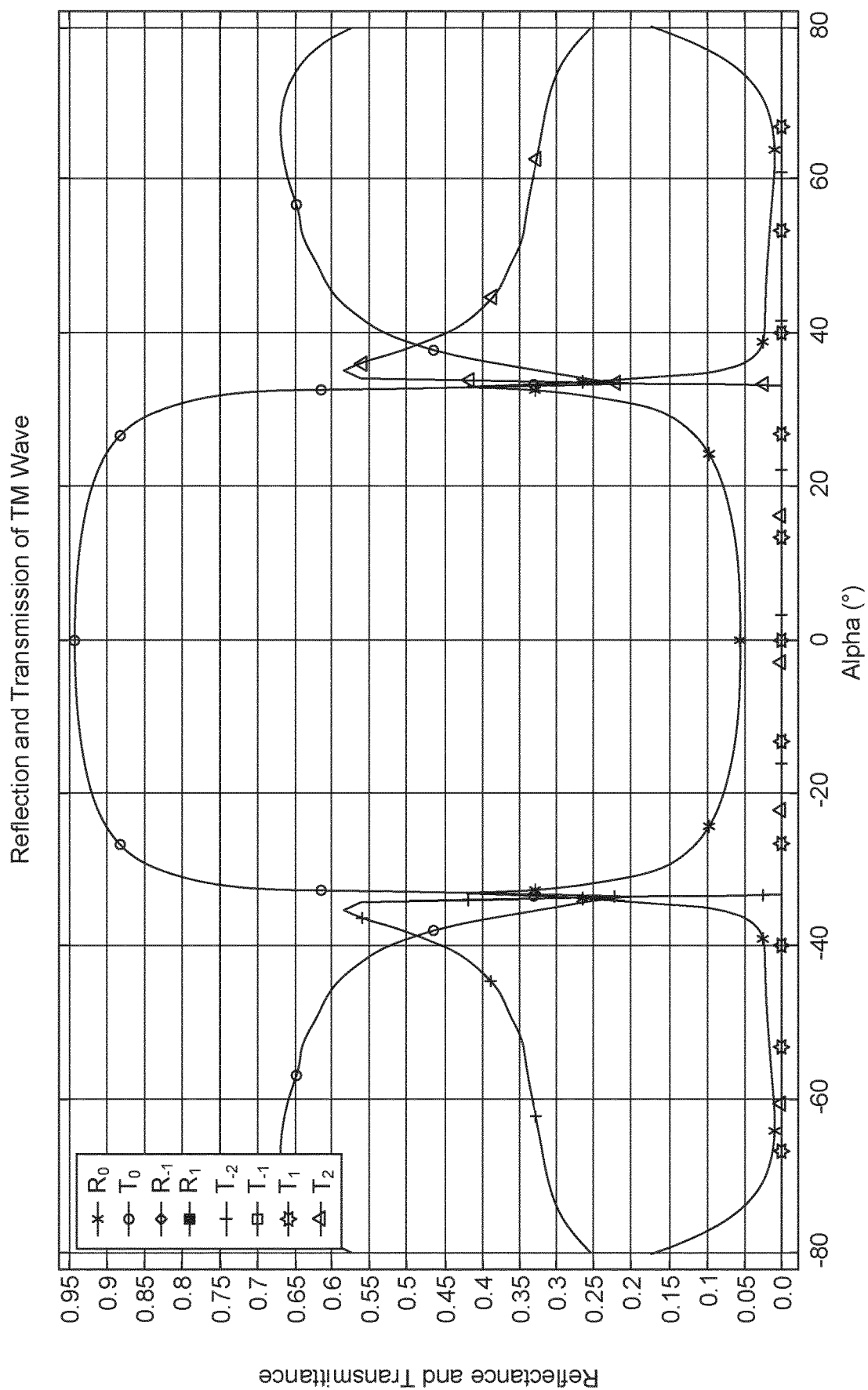
FIG. 12A illustrates reflectance and transmittance of different diffractive orders of TM-polarized green light with a wavelength of 530 nm by a transmissive diffractive in-coupler in the first waveguide using a twin-shape diffraction grating as illustrated in FIG. 9A.
Figure 12B:
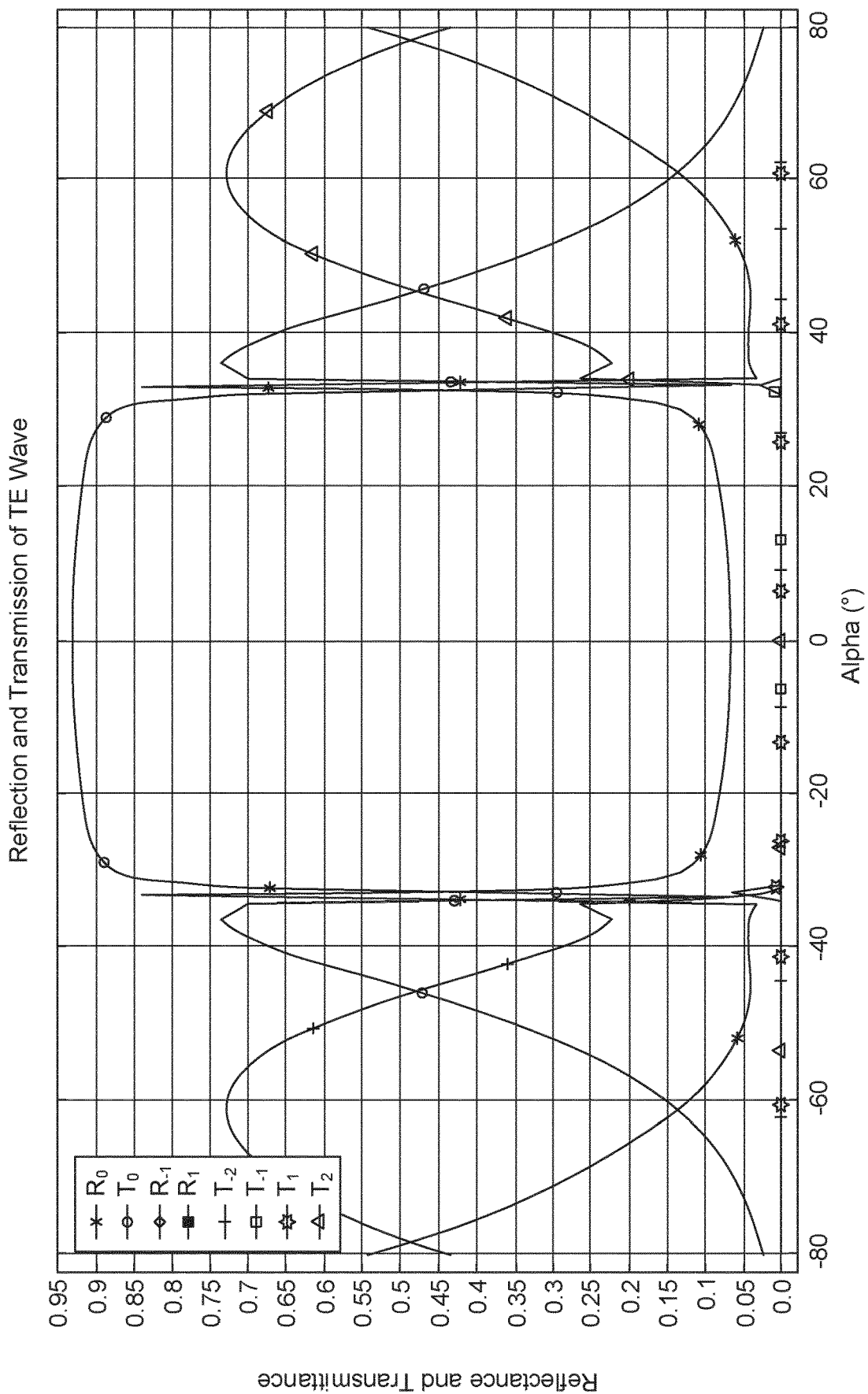
FIG. 12B illustrates reflectance and transmittance of different diffractive orders of TE-polarized green light with a wavelength of 530 nm by the transmissive diffractive in-coupler in the first waveguide using a twin-shape diffraction grating as illustrated in FIG. 9A.

Specifically, FIG. 12A illustrates reflectance and transmittance of different diffractive orders of TM-polarized green light with a wavelength of 530 nm by a transmissive diffractive in-coupler in the first waveguide. FIG. 12B illustrates reflectance and transmittance of different diffractive orders of TE-polarized green light with a wavelength of 530 nm by the transmissive diffractive in-coupler in the first waveguide. The transmissive diffractive in-coupler of embodiments simulated in FIGS. 12A-B has a twin-shape diffraction grating as illustrated in FIG. 9A.

Figure 12D:
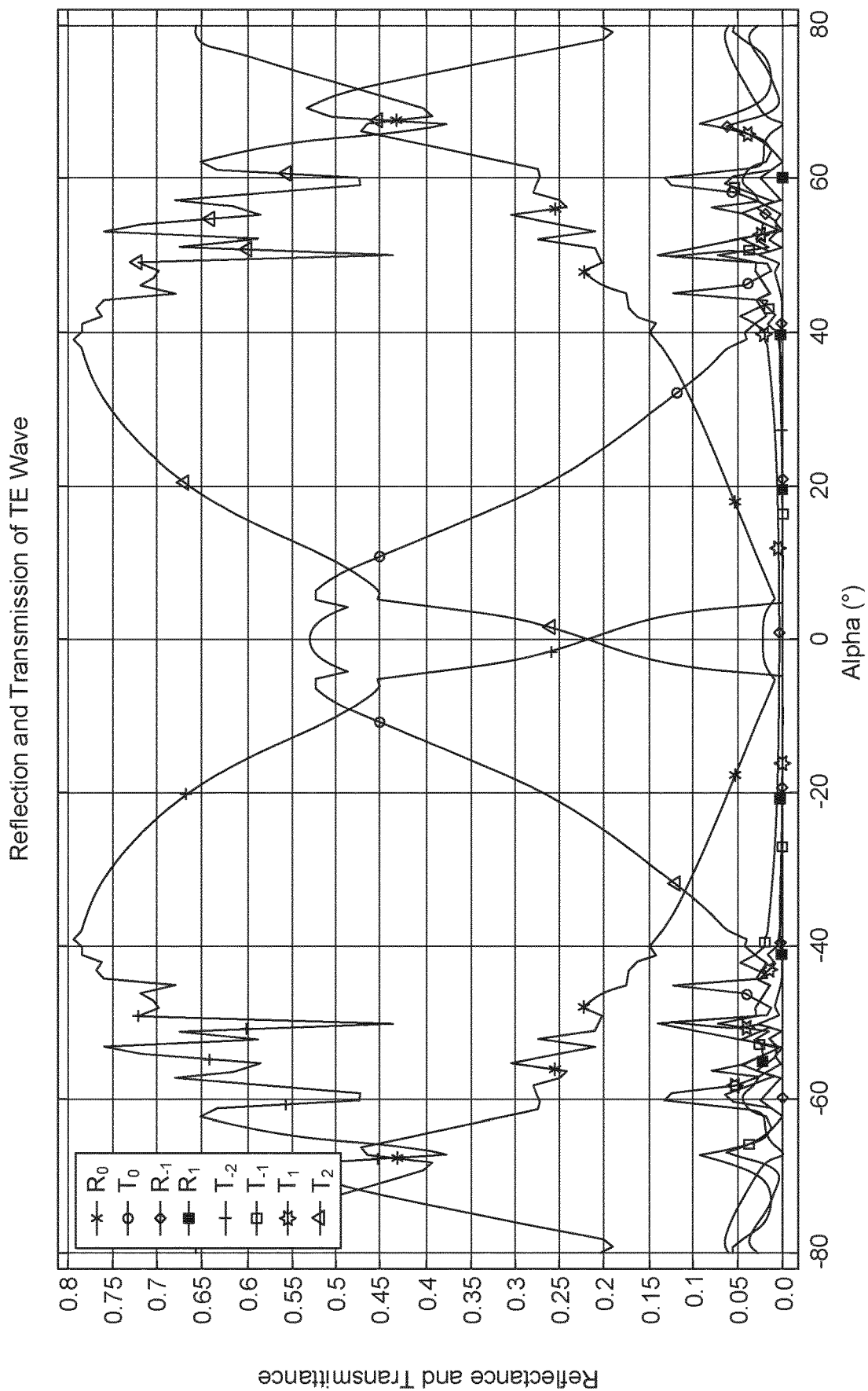
FIG. 12D illustrates reflectance and transmittance of different diffractive orders of TE-polarized green light with a wavelength of 530 nm by the transmissive diffractive in-coupler in the second waveguide using a U-shape diffraction grating as illustrated in FIG. 9B.

FIG. 12C illustrates reflectance and transmittance of different diffractive orders of TM-polarized green light with a wavelength of 530 nm by a transmissive diffractive in-coupler of the second waveguide in some embodiments. FIG. 12D illustrates reflectance and transmittance of different diffractive orders of TE-polarized green light with a wavelength of 530 nm by the transmissive diffractive in-coupler in the second waveguide. The transmissive diffractive in-coupler of embodiments simulated in FIGS. 12C-D has a U-shape diffraction grating as illustrated in FIG. 9B.

Figure 12E:
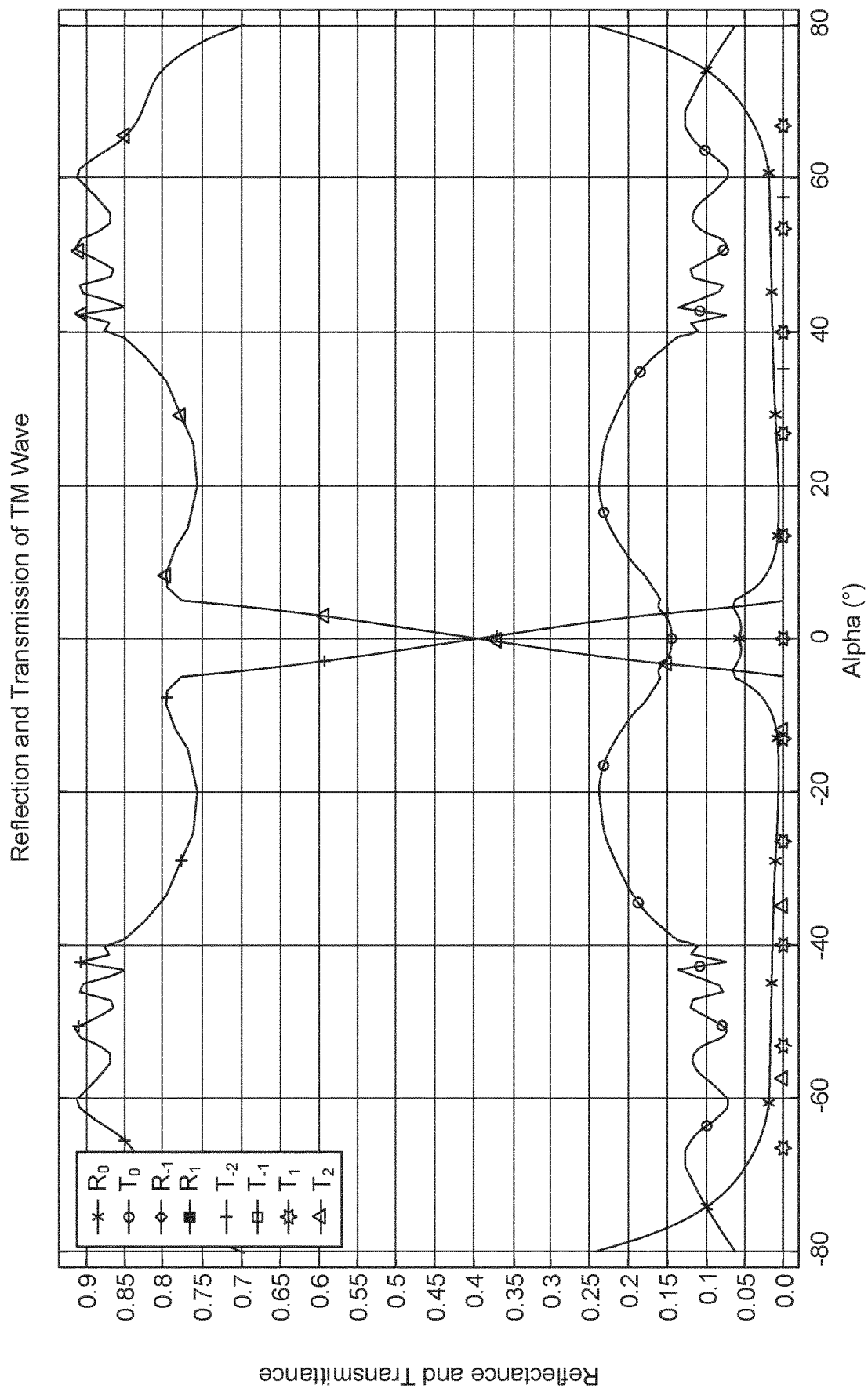
FIG. 12E illustrates reflectance and transmittance of different diffractive orders of TM-polarized green light with a wavelength of 530 nm by the transmissive diffractive in-coupler of the second waveguide using a twin-shape diffraction grating as illustrated in FIG. 9A.
Figure 12F:
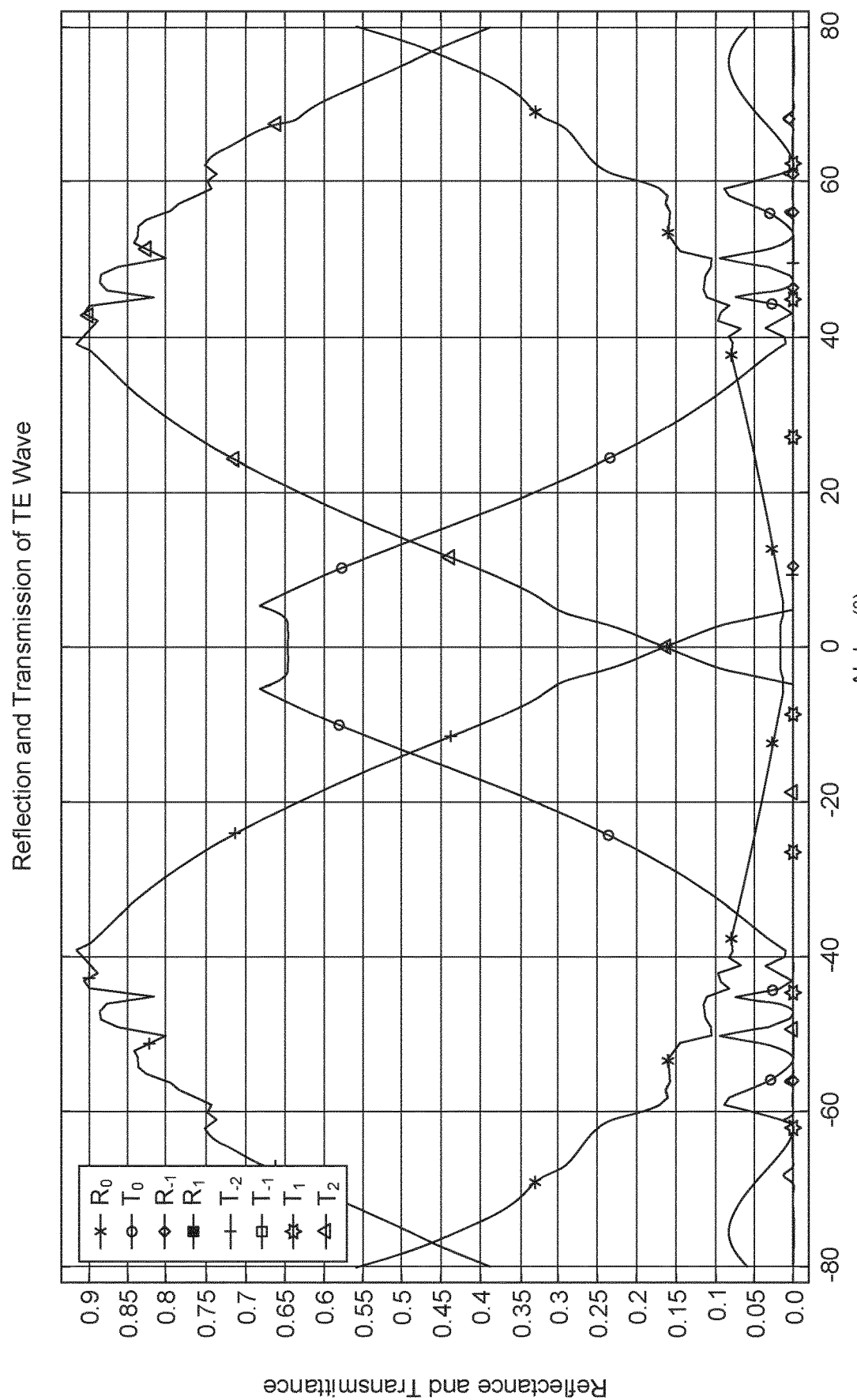
FIG. 12F illustrates reflectance and transmittance of different diffractive orders of TE-polarized green light with a wavelength of 530 nm by the transmissive diffractive in-coupler in the second waveguide using a twin-shape diffraction grating as illustrated in FIG. 9A.

FIG. 12E illustrates reflectance and transmittance of different diffractive orders of TM-polarized green light with a wavelength of 530 nm by the transmissive diffractive in-coupler of the second waveguide in some embodiments. FIG. 12F illustrates reflectance and transmittance of different diffractive orders of TE-polarized green light with a wavelength of 530 nm by the transmissive diffractive in-coupler in the second waveguide. The transmissive diffractive in-coupler of embodiments simulated in FIGS. 12E-F has a twin-shape diffraction grating as illustrated in FIG. 9A.

FIGS. 13A-F depict diffraction performance of the two-waveguide system for blue light. In the presented system we have used twin-shape diffraction grating DG1 for the first waveguide WG1; U-shape/twin-shape (for comparison) diffraction gratings DG2 for the second waveguide WG2.

Figure 13A:
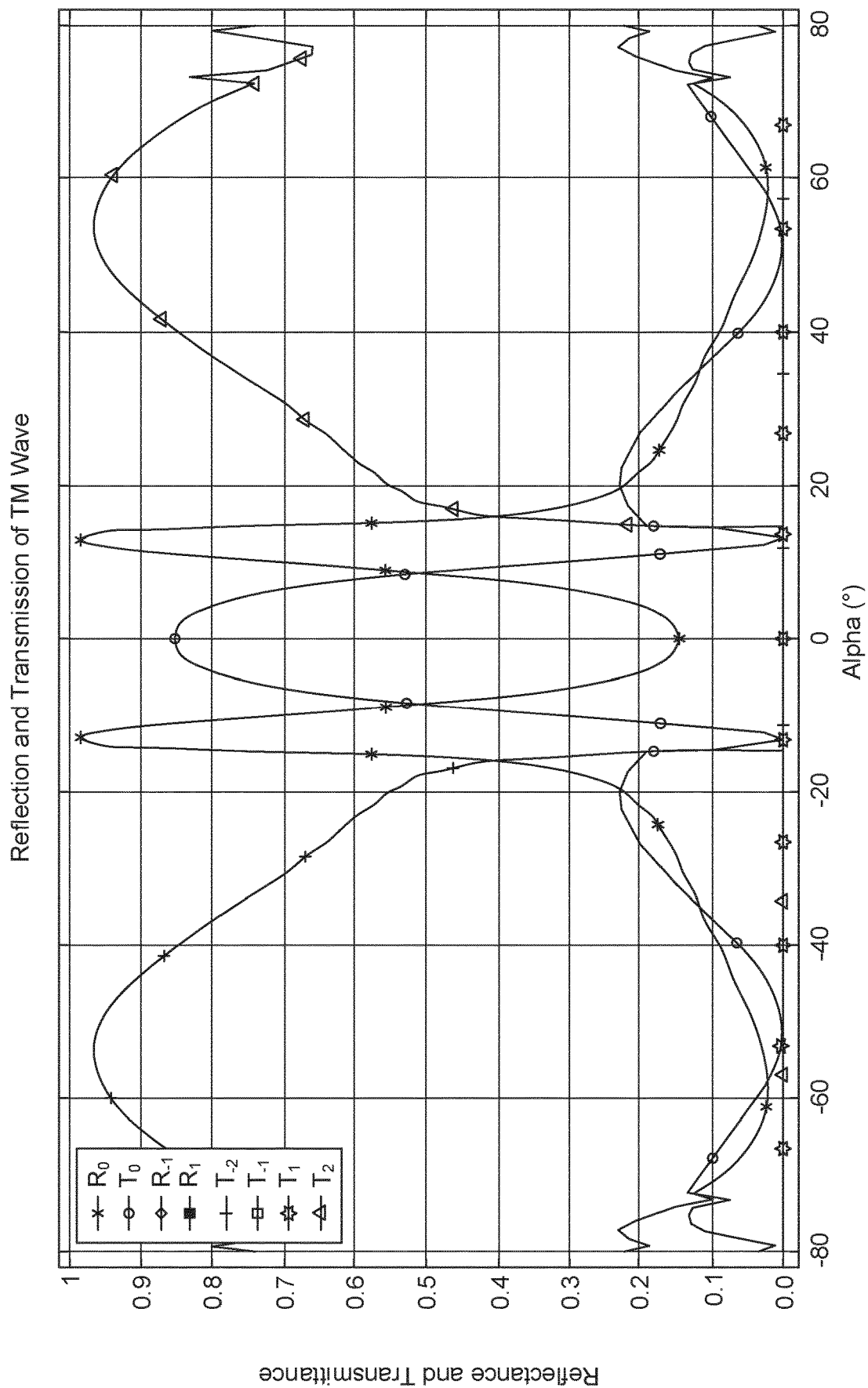
FIG. 13A illustrates reflectance and transmittance of different diffractive orders of TM-polarized blue light with a wavelength of 460 nm by a transmissive diffractive in-coupler in the first waveguide using a twin-shape diffraction grating as illustrated in FIG. 9A.
Figure 13B:
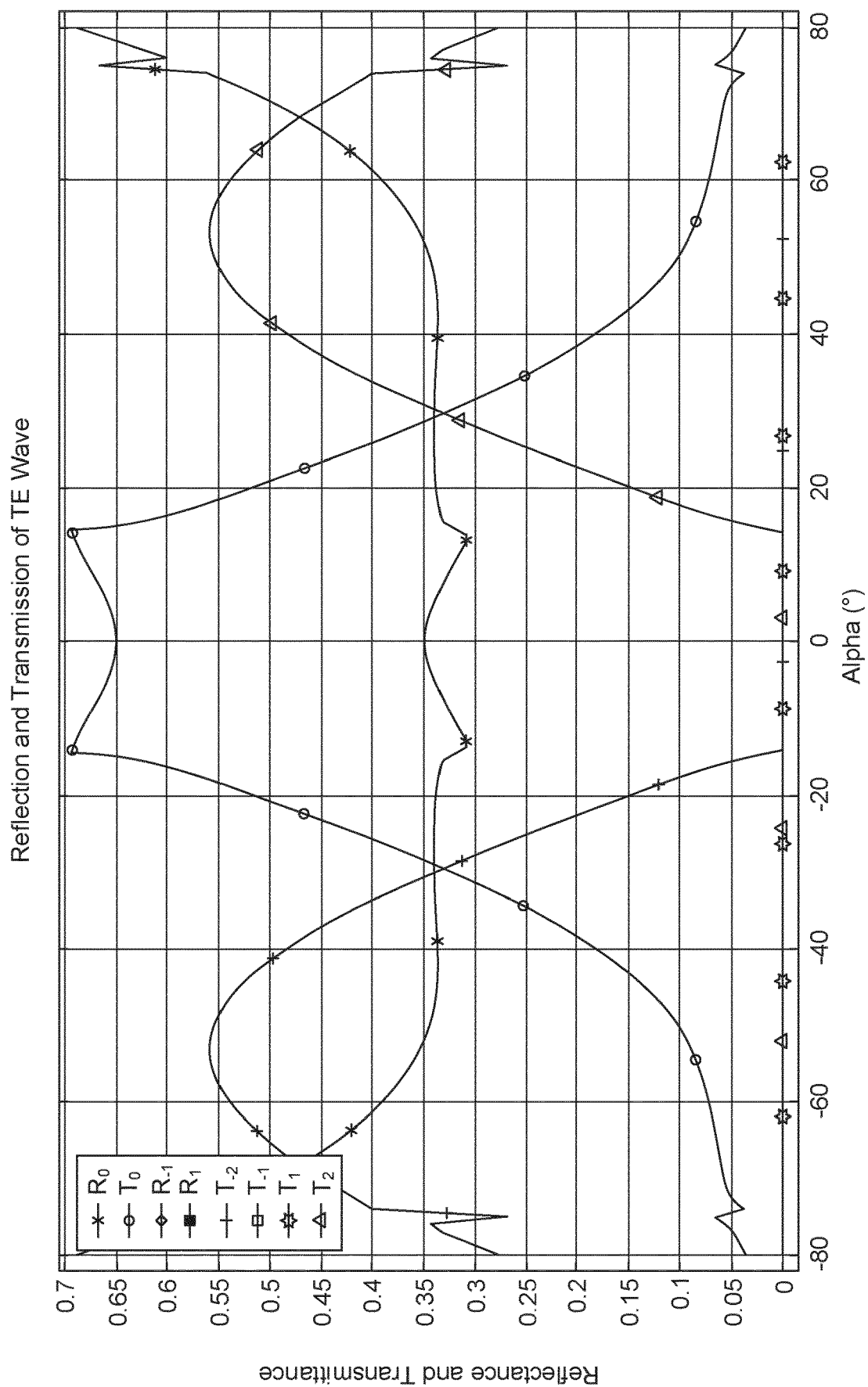
FIG. 13B illustrates reflectance and transmittance of different diffractive orders of TE-polarized blue light with a wavelength of 460 nm by the transmissive diffractive in-coupler in the first waveguide using a twin-shape diffraction grating as illustrated in FIG. 9A.

Specifically, FIG. 13A illustrates reflectance and transmittance of different diffractive orders of TM-polarized blue light with a wavelength of 460 nm by a transmissive diffractive in-coupler in the first waveguide. FIG. 13B illustrates reflectance and transmittance of different diffractive orders of TE-polarized blue light with a wavelength of 460 nm by the transmissive diffractive in-coupler in the first waveguide. The transmissive diffractive in-coupler of embodiments simulated in FIGS. 13A-B has a twin-shape diffraction grating as illustrated in FIG. 9A.

Figure 13C:
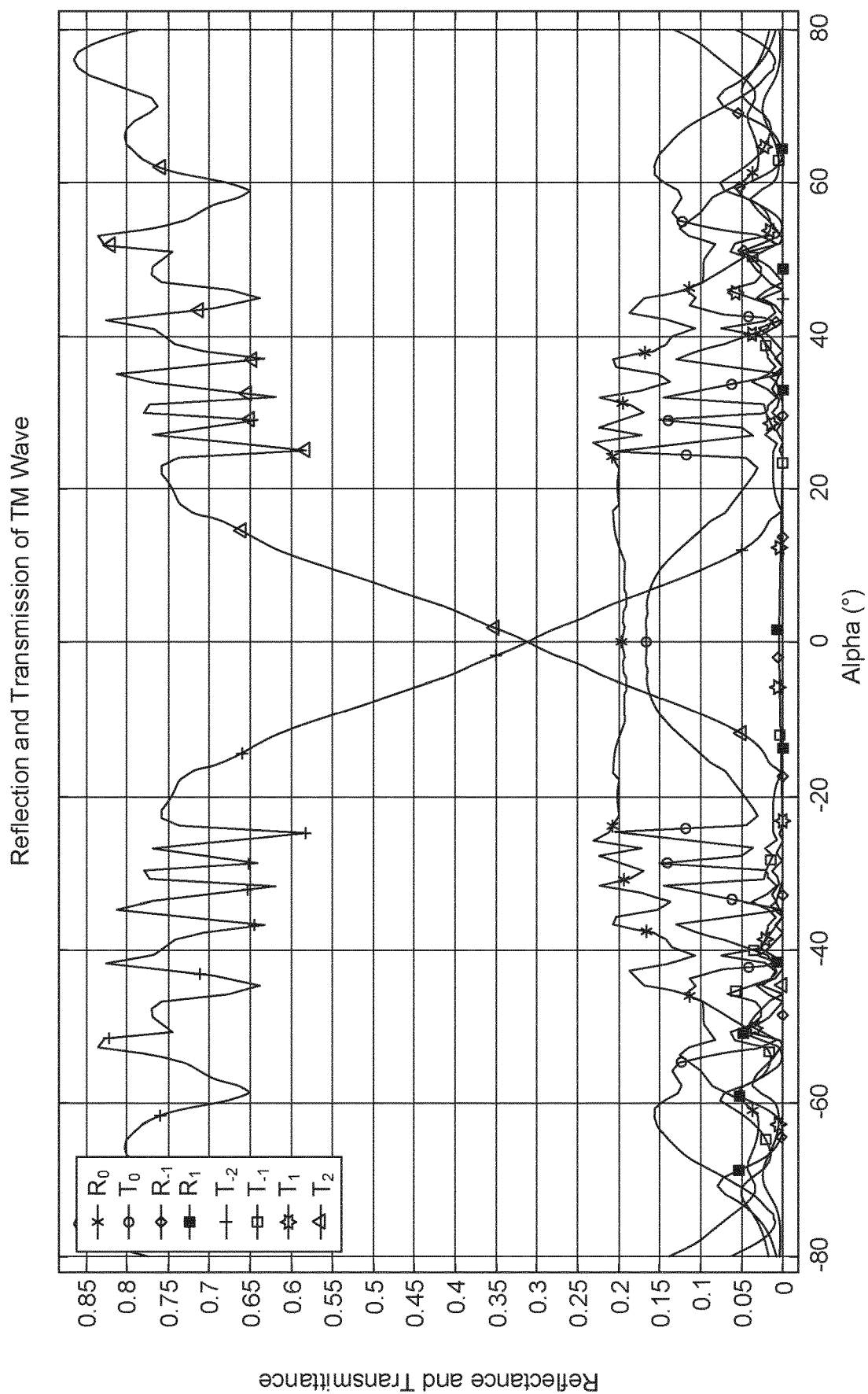
FIG. 13C illustrates reflectance and transmittance of different diffractive orders of TM-polarized blue light with a wavelength of 460 nm by a transmissive diffractive in-coupler of the second waveguide in some embodiments a U-shape diffraction grating as illustrated in FIG. 9B.
Figure 13D:
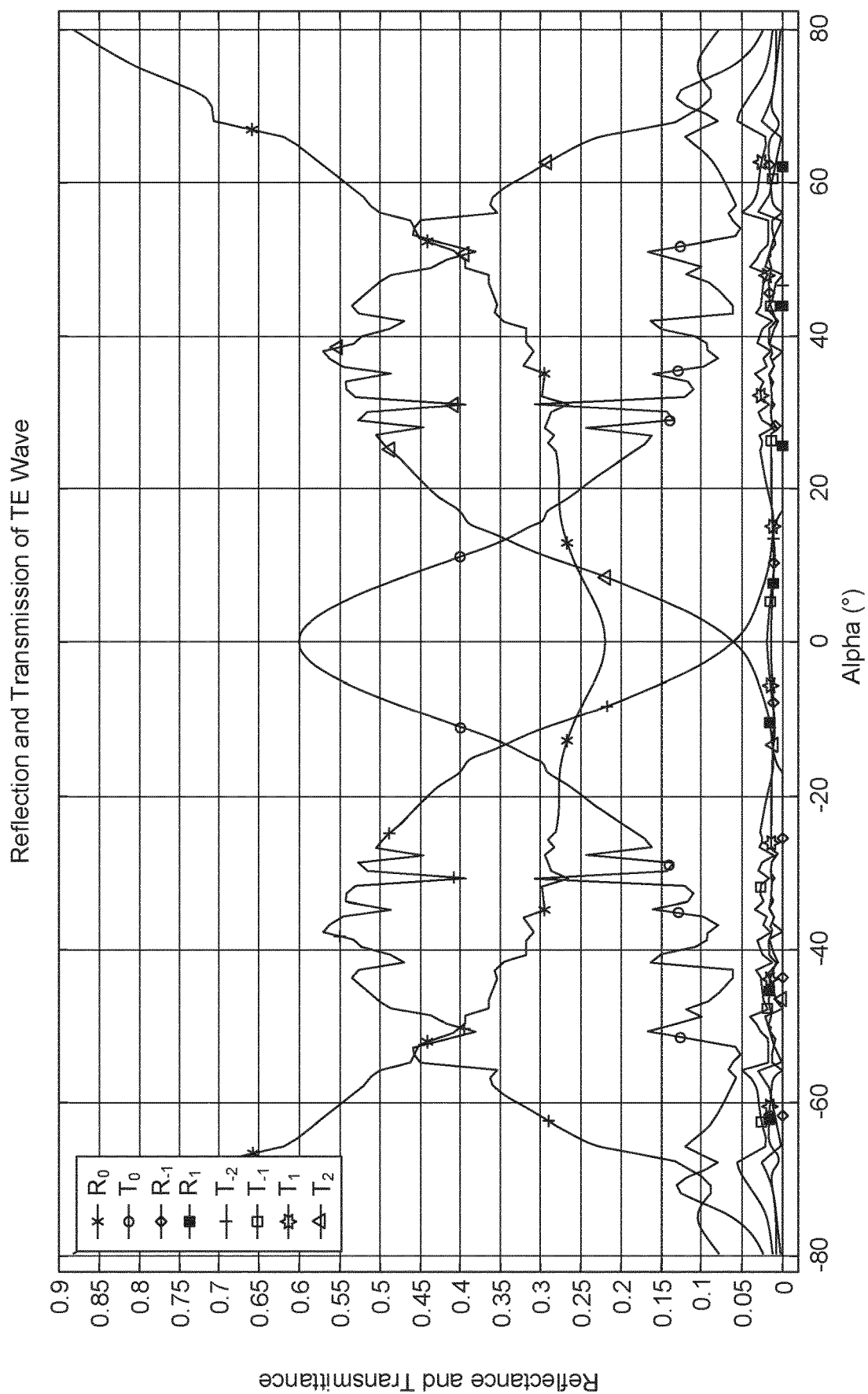
FIG. 13D illustrates reflectance and transmittance of different diffractive orders of TE-polarized blue light with a wavelength of 460 nm by the transmissive diffractive in-coupler in the second waveguide using a U-shape diffraction grating as illustrated in FIG. 9B.

FIG. 13C illustrates reflectance and transmittance of different diffractive orders of TM-polarized blue light with a wavelength of 460 nm by a transmissive diffractive in-coupler of the second waveguide in some embodiments. FIG. 13D illustrates reflectance and transmittance of different diffractive orders of TE-polarized blue light with a wavelength of 460 nm by the transmissive diffractive in-coupler in the second waveguide. The transmissive diffractive in-coupler simulated in FIGS. 13C-D has a U-shape diffraction grating as illustrated in FIG. 9B.

Figure 13F:
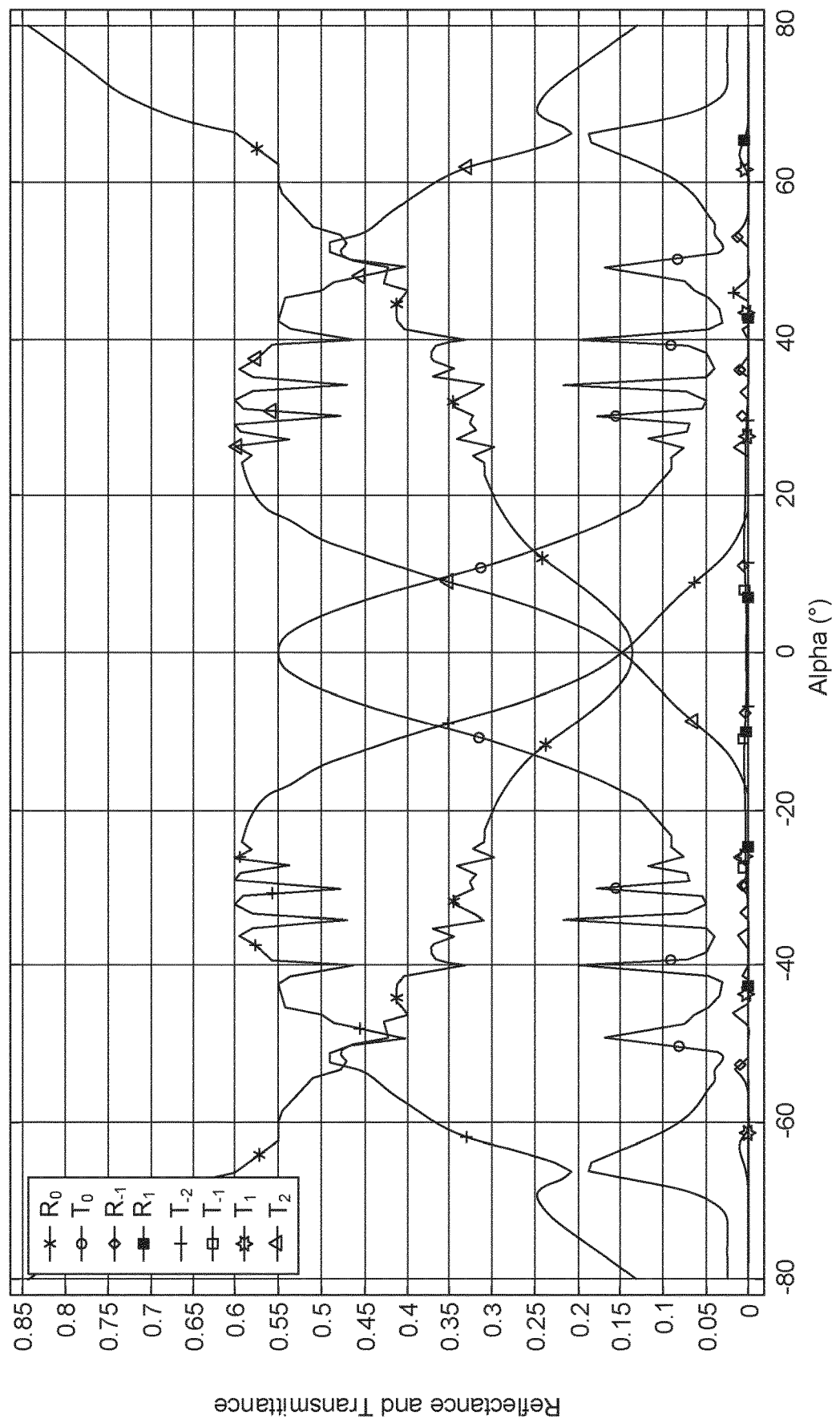
FIG. 13F illustrates reflectance and transmittance of different diffractive orders of TE-polarized blue light with a wavelength of 460 nm by the transmissive diffractive in-coupler in the second waveguide using a twin-shape diffraction grating as illustrated in FIG. 9A.

FIG. 13E illustrates reflectance and transmittance of different diffractive orders of TM-polarized blue light with a wavelength of 460 nm by the transmissive diffractive in-coupler of the second waveguide in some embodiments. FIG. 13F illustrates reflectance and transmittance of different diffractive orders of TE-polarized blue light with a wavelength of 460 nm by the transmissive diffractive in-coupler in the second waveguide. The transmissive diffractive in-coupler simulated in FIGS. 13E-F has a twin-shape diffraction grating as illustrated in FIG. 9A.

FIGS. 14A-J depict diffraction performance of the two-waveguide system for red light. In the presented system we have used twin-shape diffraction grating DG1 for the first waveguide WG1; U-shape/twin-shape (for comparison) transmissive diffraction gratings DG2 and U-shape/twin-shape (for comparison) reflective diffraction gratings DG3 for the second waveguide WG2.

Figure 14A:
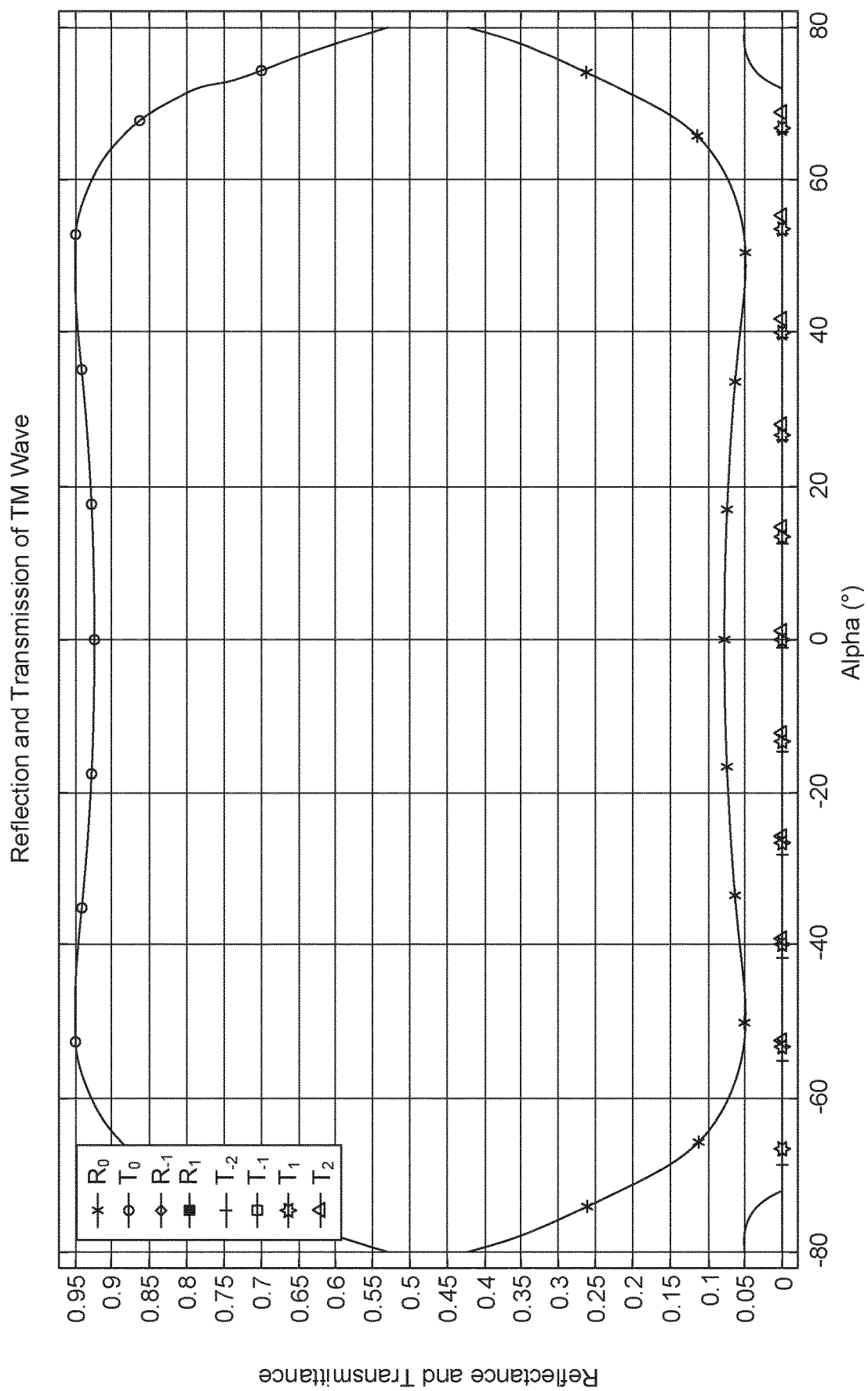
FIG. 14A illustrates reflectance and transmittance of different diffractive orders of TM-polarized red light with a wavelength of 625 nm by a transmissive diffractive in-coupler in the first waveguide using a twin-shape diffraction grating as illustrated in FIG. 9A.
Figure 14B:
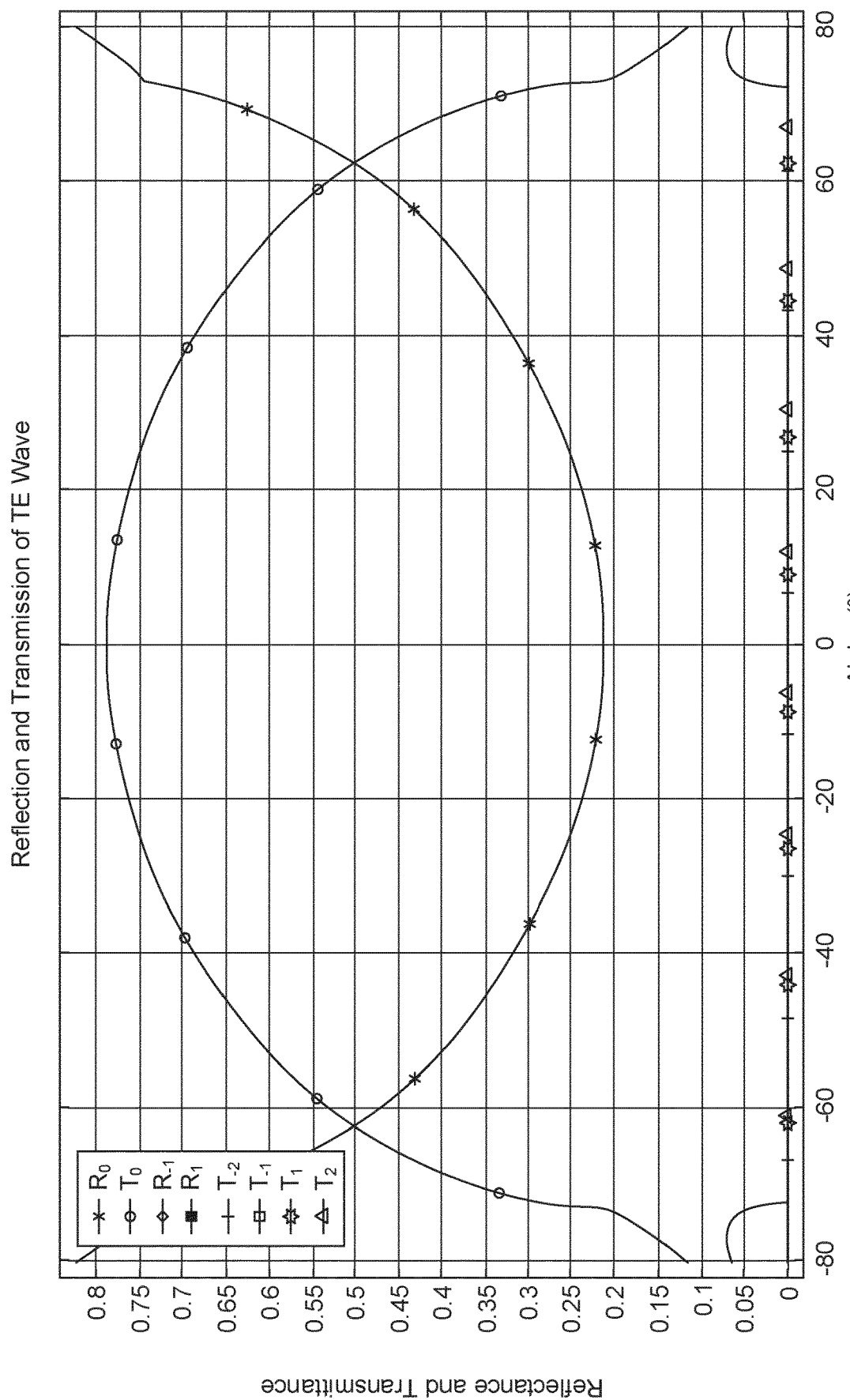
FIG. 14B illustrates reflectance and transmittance of different diffractive orders of TE-polarized red light with a wavelength of 625 nm by the transmissive diffractive in-coupler in the first waveguide using a twin-shape diffraction grating as illustrated in FIG. 9A.

Specifically, FIG. 14A illustrates reflectance and transmittance of different diffractive orders of TM-polarized red light with a wavelength of 625 nm by a transmissive diffractive in-coupler in the first waveguide. FIG. 14B illustrates reflectance and transmittance of different diffractive orders of TE-polarized red light with a wavelength of 625 nm by the transmissive diffractive in-coupler in the first waveguide. The transmissive diffractive in-coupler of embodiments simulated in FIGS. 14A-B has a twin-shape diffraction grating as illustrated in FIG. 9A.

Figure 14C:
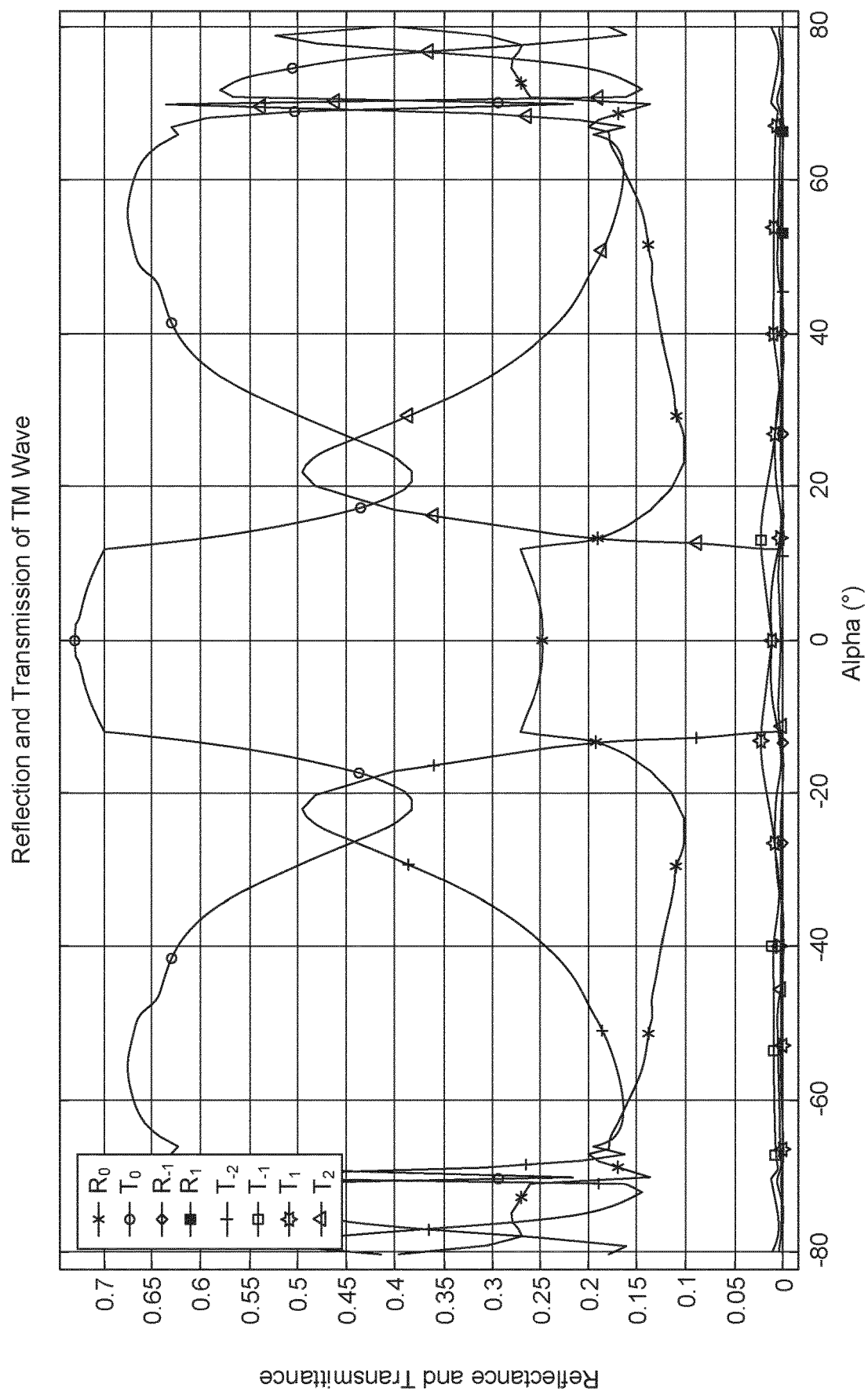
FIG. 14C illustrates reflectance and transmittance of different diffractive orders of TM-polarized red light with a wavelength of 625 nm by a transmissive diffractive in-coupler of the second waveguide in some embodiments using a U-shape diffraction grating as illustrated in FIG. 9B.
Figure 14D:
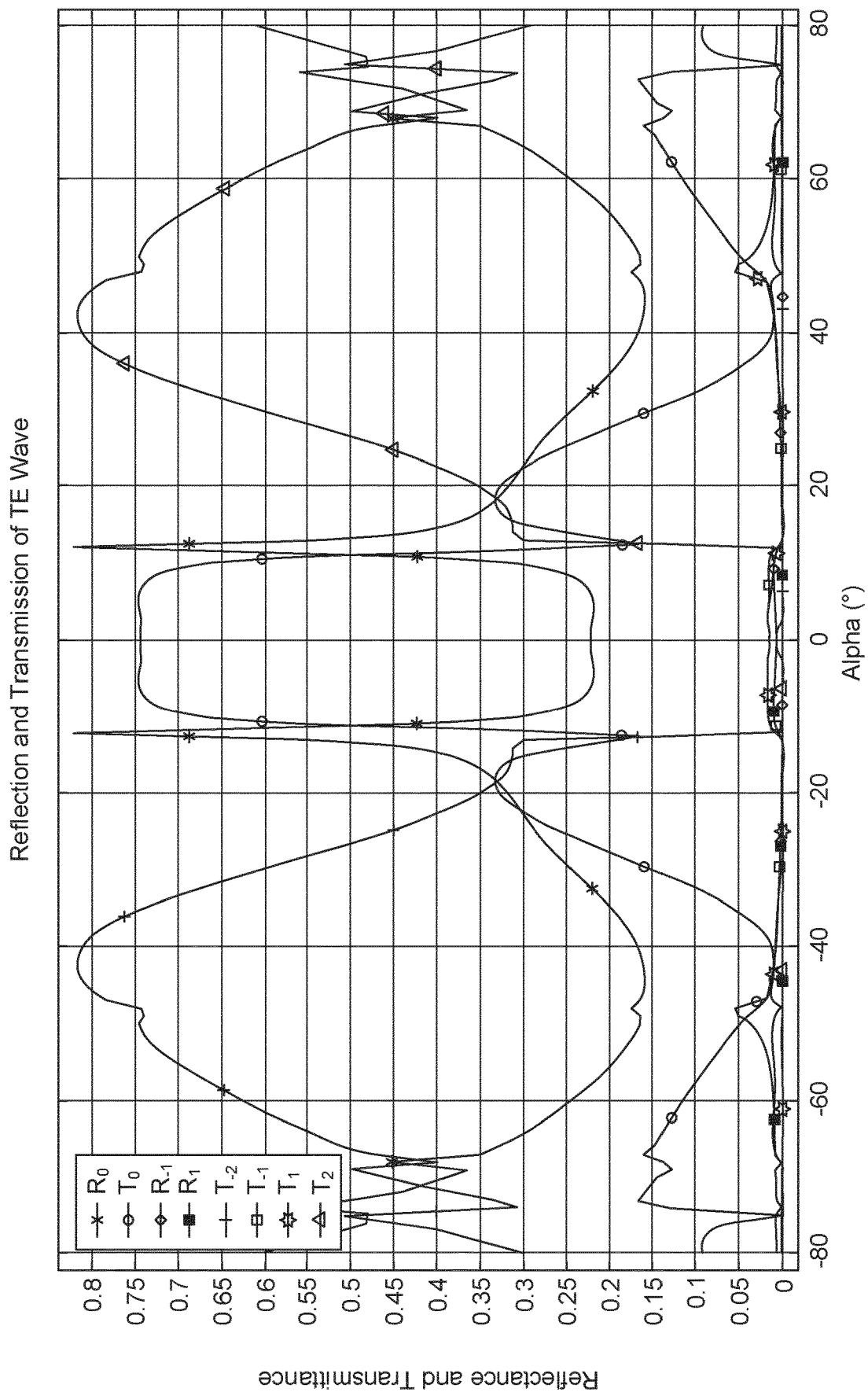
FIG. 14D illustrates reflectance and transmittance of different diffractive orders of TE-polarized red light with a wavelength of 625 nm by the transmissive diffractive in-coupler in the second waveguide using a U-shape diffraction grating as illustrated in FIG. 9B.

FIG. 14C illustrates reflectance and transmittance of different diffractive orders of TM-polarized red light with a wavelength of 625 nm by the transmissive diffractive in-coupler of the second waveguide in some embodiments. FIG. 14D illustrates reflectance and transmittance of different diffractive orders of TE-polarized red light with a wavelength of 625 nm by the transmissive diffractive in-coupler in the second waveguide. The transmissive diffractive in-coupler of embodiments simulated in FIGS. 14C-D has a U-shape diffraction grating as illustrated in FIG. 9B.

Figure 14E:
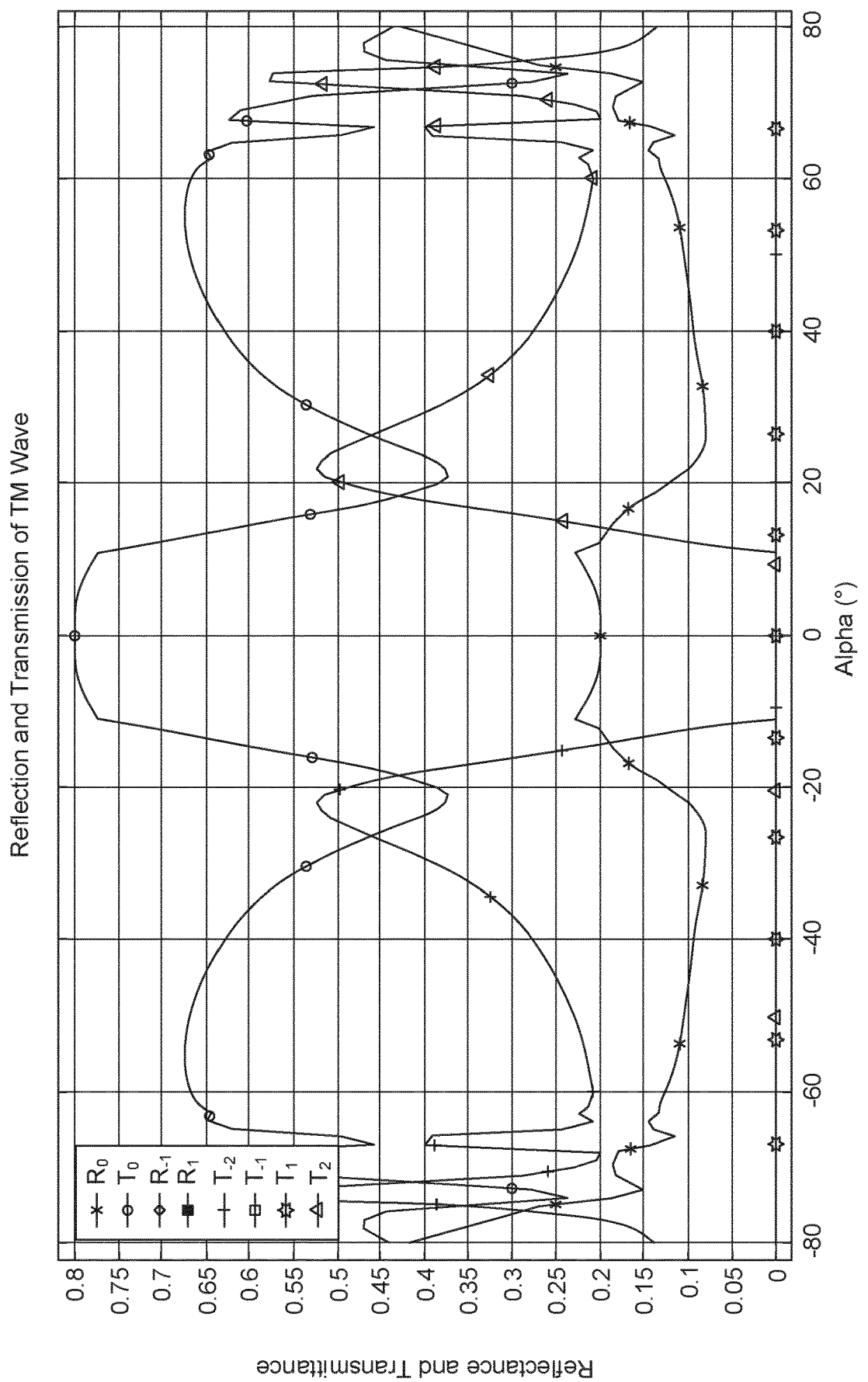
FIG. 14E illustrates reflectance and transmittance of different diffractive orders of TM-polarized red light with a wavelength of 625 nm by the transmissive diffractive in-coupler of the second waveguide using a twin-shape diffraction grating as illustrated in FIG. 9A.
Figure 14F:
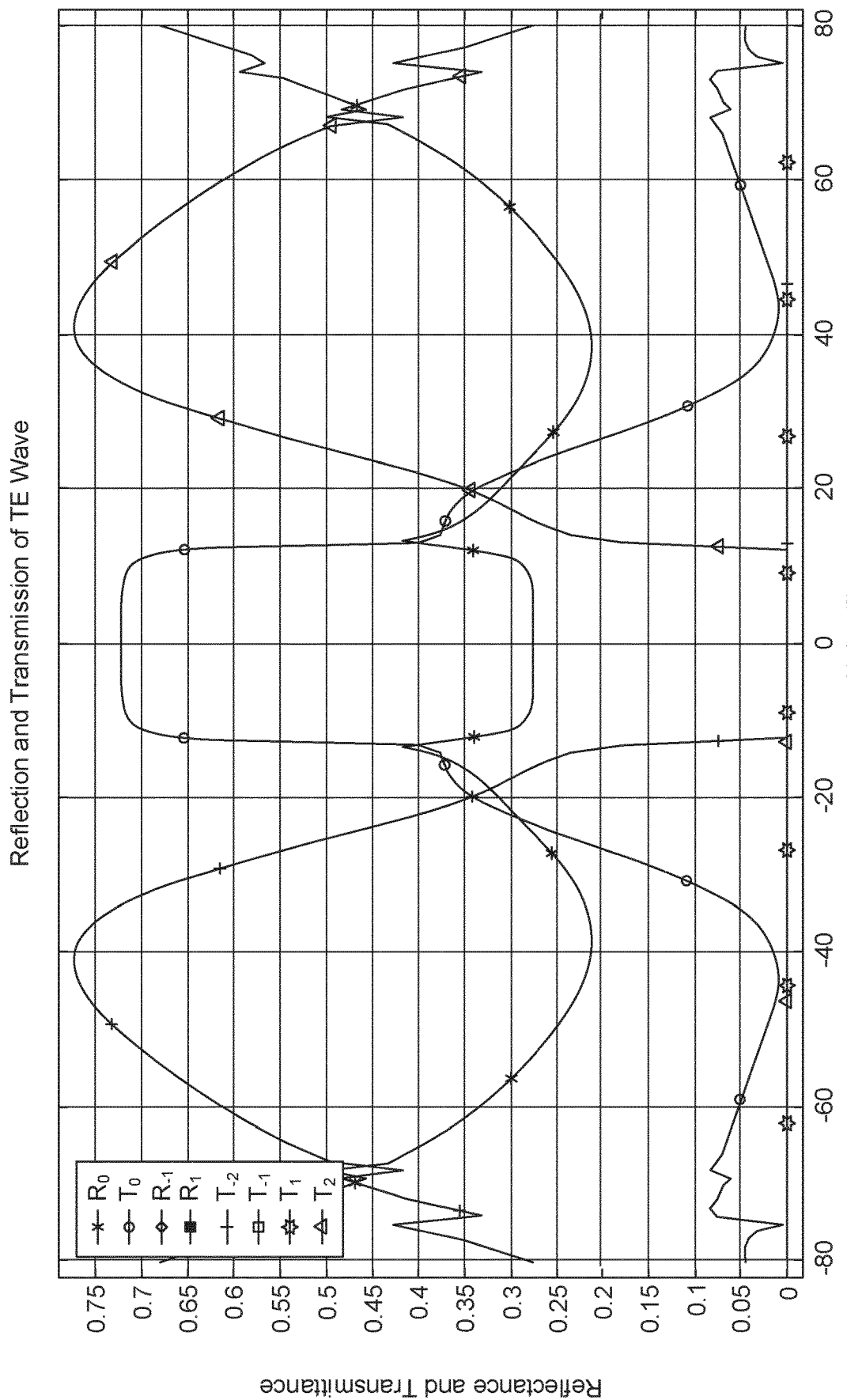
FIG. 14F illustrates reflectance and transmittance of different diffractive orders of TE-polarized red light with a wavelength of 625 nm by the transmissive diffractive in-coupler in the second waveguide using a twin-shape diffraction grating as illustrated in FIG. 9A.

FIG. 14E illustrates reflectance and transmittance of different diffractive orders of TM-polarized red light with a wavelength of 625 nm by the transmissive diffractive in-coupler of the second waveguide in some embodiments. FIG. 14F illustrates reflectance and transmittance of different diffractive orders of TE-polarized red light with a wavelength of 625 nm by the transmissive diffractive in-coupler in the second waveguide. The transmissive diffractive in-coupler of embodiments simulated in FIGS. 14E-F has a twin-shape diffraction grating as illustrated in FIG. 9A.

Figure 14G:
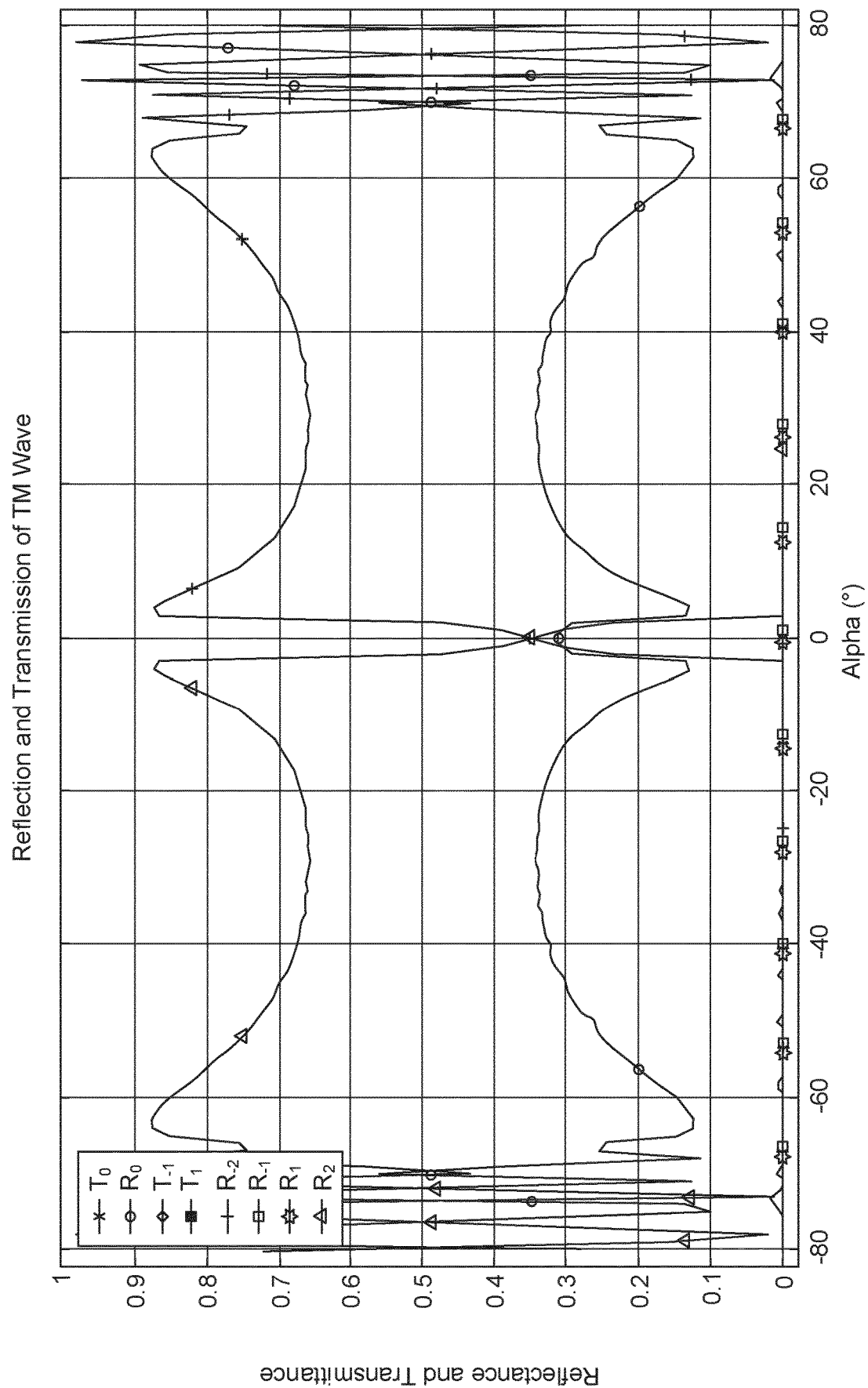
FIG. 14G illustrates reflectance and transmittance of different diffractive orders of TM-polarized red light with a wavelength of 625 nm by the reflective diffractive in-coupler of the second waveguide using a twin-shape diffraction grating as illustrated in FIG. 9D.
Figure 14H:
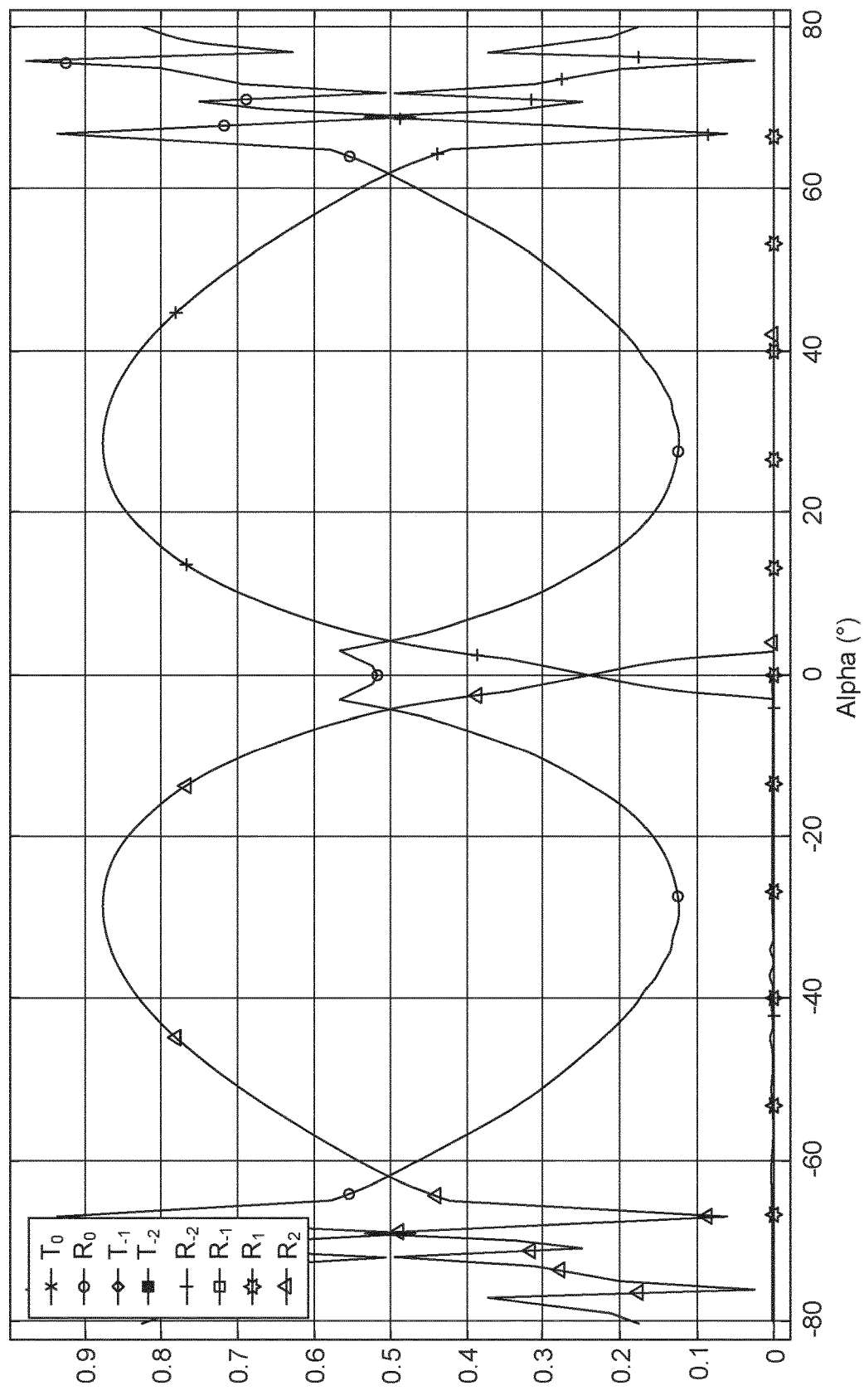
FIG. 14H illustrates reflectance and transmittance of different diffractive orders of TE-polarized red light with a wavelength of 625 nm by the reflective diffractive in-coupler in the second waveguide using a twin-shape diffraction grating as illustrated in FIG. 9D.

FIG. 14G illustrates reflectance and transmittance of different diffractive orders of TM-polarized red light with a wavelength of 625 nm by the reflective diffractive in-coupler of the second waveguide in some embodiments. FIG. 14H illustrates reflectance and transmittance of different diffractive orders of TE-polarized red light with a wavelength of 625 nm by the reflective diffractive in-coupler in the second waveguide. The reflective diffractive in-coupler of embodiments simulated in FIGS. 14G-H has a twin-shape diffraction grating as illustrated in FIG. 9D.

Figure 14I:
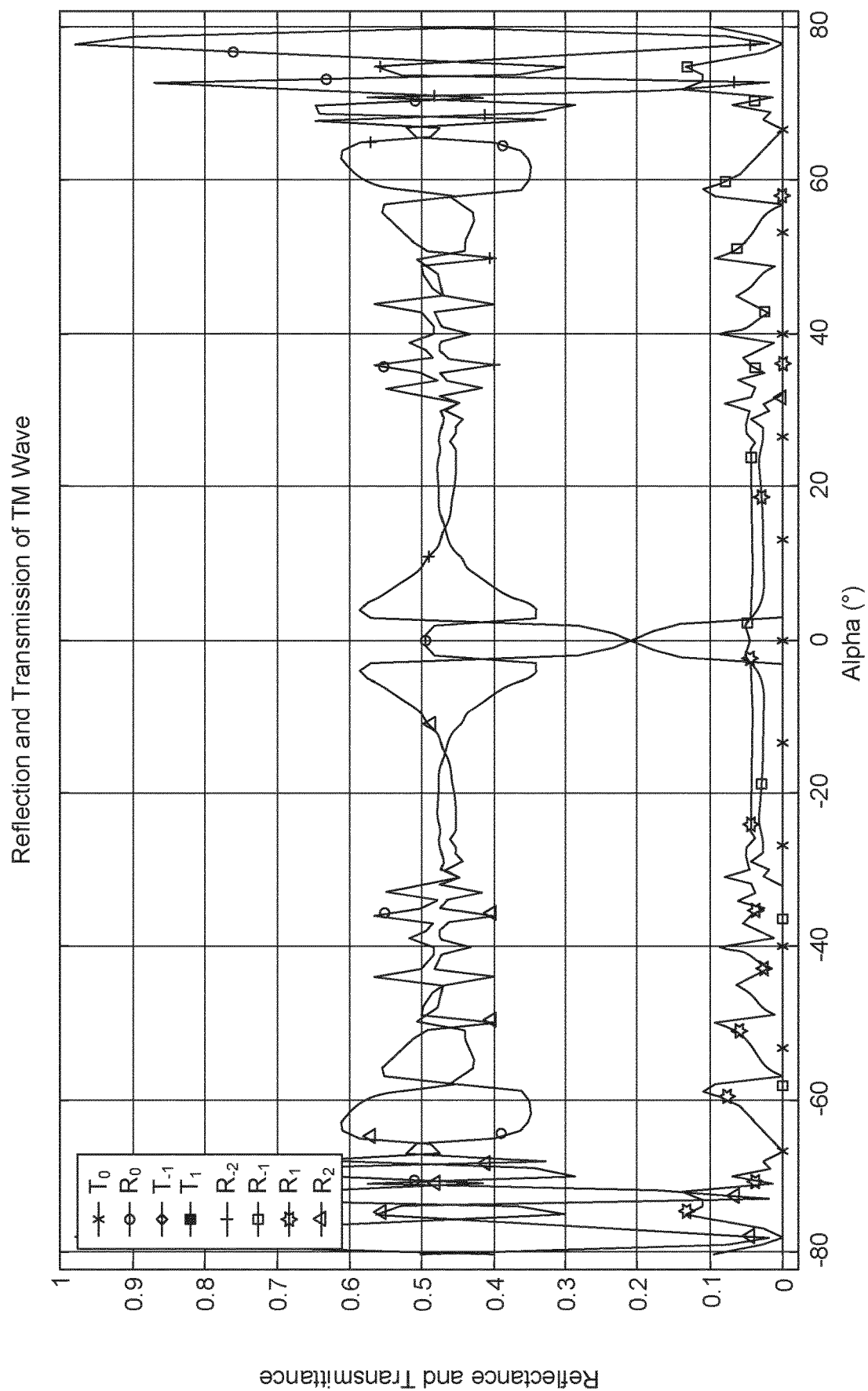
FIG. 14I illustrates reflectance and transmittance of different diffractive orders of TM-polarized red light with a wavelength of 625 nm by the reflective diffractive in-coupler of the second waveguide using a U-shape diffraction grating as illustrated in FIG. 9C.
Figure 14J:
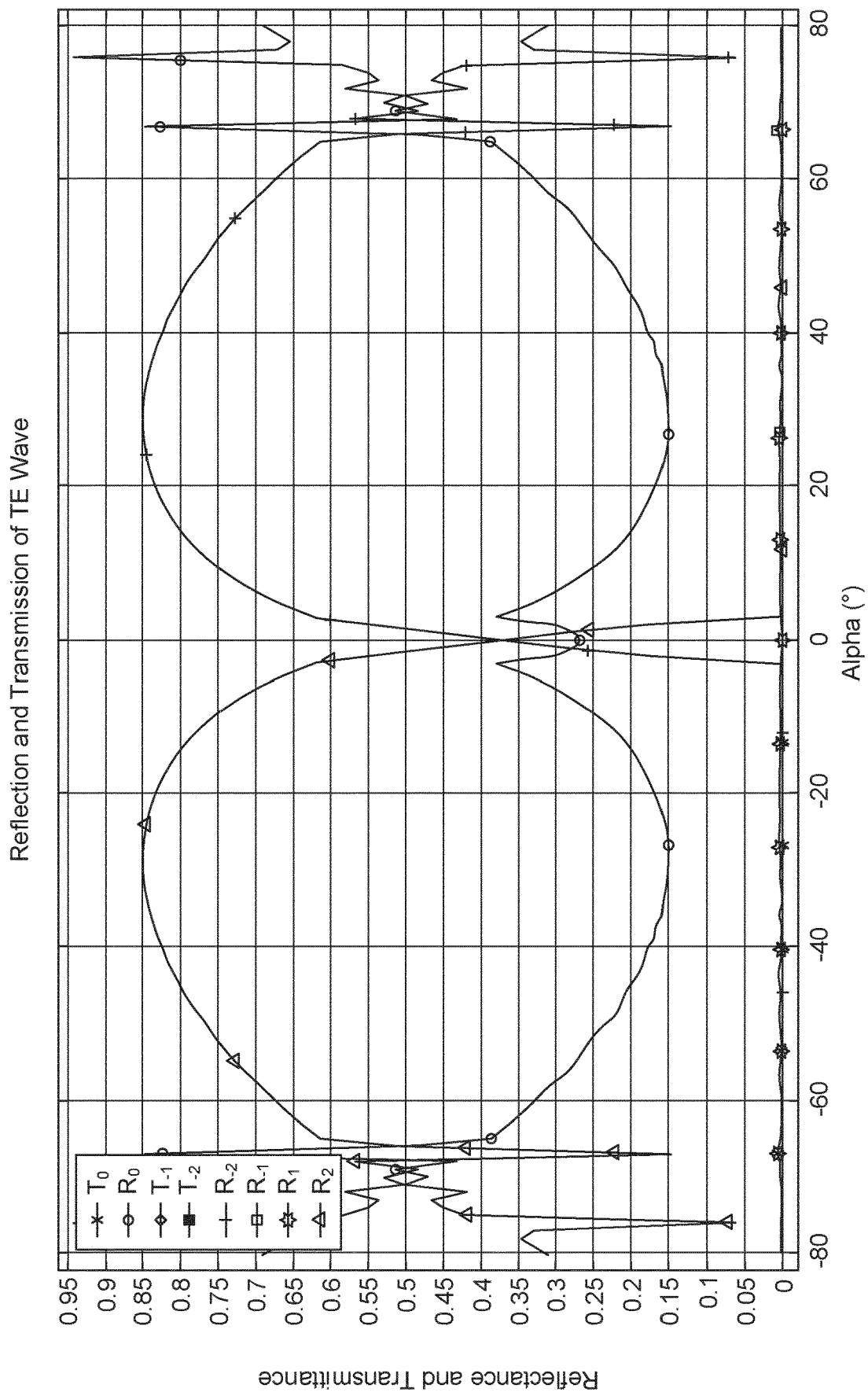
FIG. 14J illustrates reflectance and transmittance of different diffractive orders of TE-polarized red light with a wavelength of 625 nm by the reflective diffractive in-coupler in the second waveguide using a U-shape diffraction grating as illustrated in FIG. 9C.

FIG. 14I illustrates reflectance and transmittance of different diffractive orders of TM-polarized red light with a wavelength of 625 nm by the reflective diffractive in-coupler of the second waveguide in some embodiments. FIG. 14J illustrates reflectance and transmittance of different diffractive orders of TE-polarized red light with a wavelength of 625 nm by the reflective diffractive in-coupler in the second waveguide. The reflective diffractive in-coupler of embodiments simulated in FIGS. 14I-J has a U-shape diffraction grating as illustrated in FIG. 9C.

Out-Coupler System for the Second Waveguide

Discussed below are example embodiments of out-couplers configured for out-coupling the red image from the second waveguide. Example embodiments are configured to out-couple an incident image with the proper angular span.

To out-couple the red image in coupled into the waveguide WG2 by diffraction gratings DG2 and DG3 some embodiments use two diffraction gratings DG4 (a reflective grating), and DG5 (a transmissive grating) from the both sides of the plate. Example embodiments are dual-mode devices that use the diffraction mode +2 of DG2 to carry the right-hand side image (positive high angles of incidence on the in-coupler) in right hand direction and the −2 mode to propagate the negative high angles of incidence into the opposite direction of the waveguide. The positive low angles of incidence will be directly transmitted by the diffraction grating DG2 and converted into the −2 order of reflective DG3 propagating into the left-hand direction, the negative low angles of incidence will be transformed into the +2 mode and propagate into the right-hand side direction of the waveguide. In example embodiments, the out-couplers are configured to preserve the same angular span. For sake of illustration, consider the portion of the image propagating into the left part of the waveguide, as illustrated with respect to FIGS. 15 and 16.

Figure 15:
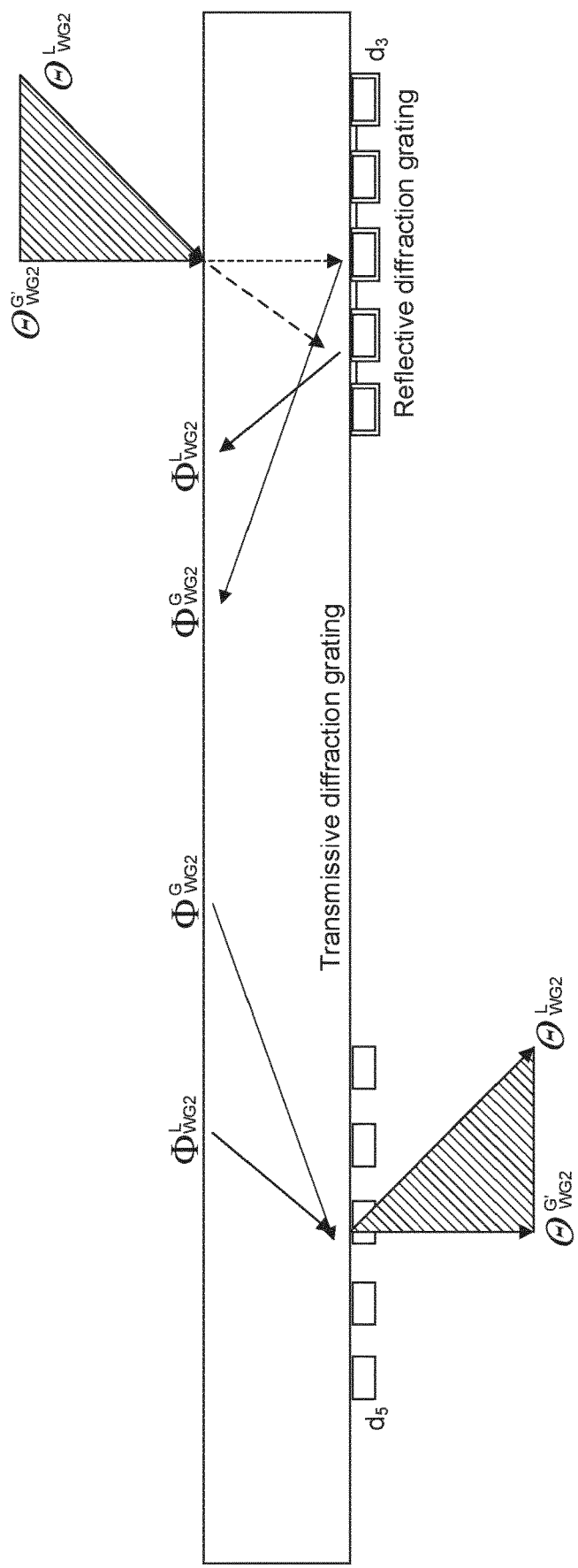
FIG. 15 is a schematic diagram illustrating propagation of a portion of the field of view with relatively lower angles of incidence through the second waveguide.

FIG. 15 is a schematic diagram illustrating some of the optical components of the second waveguide, with reflective in-coupling diffraction grating DG3 and transmissive out-coupling diffraction grating DG5.

Figure 16:
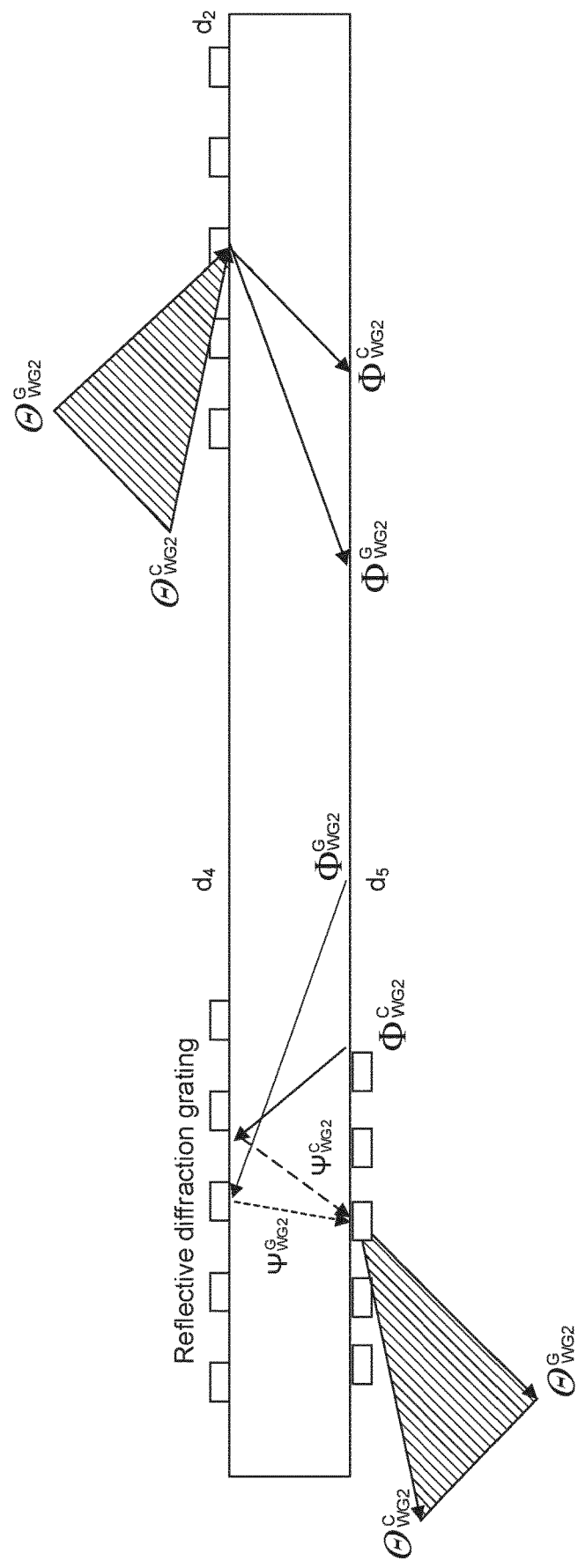
FIG. 16 is a schematic diagram illustrating propagation of a portion of the field of view with relatively higher angles of incidence through the second waveguide.
Figure 18:
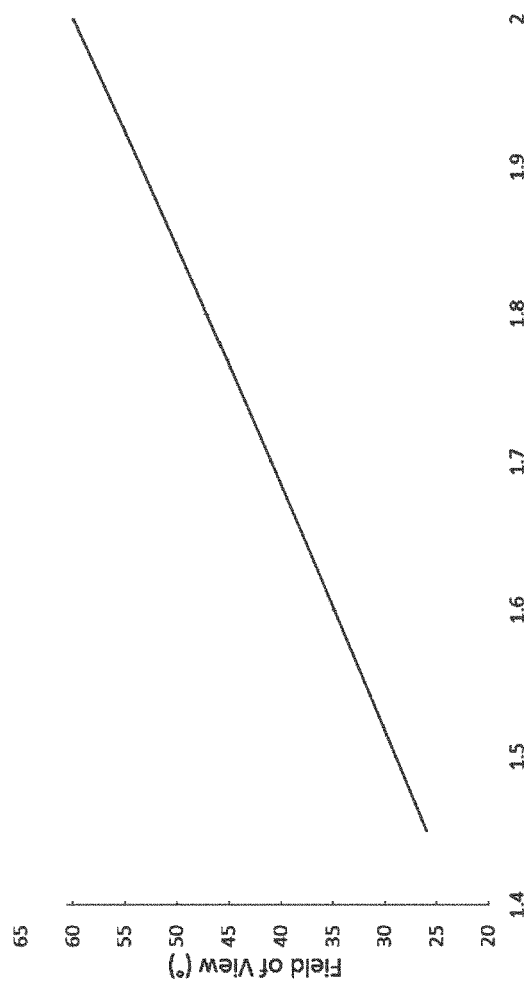
FIG. 18 is an example graph of a wave guide's field of view as a function of the refractive index of its material.
Figure 17:
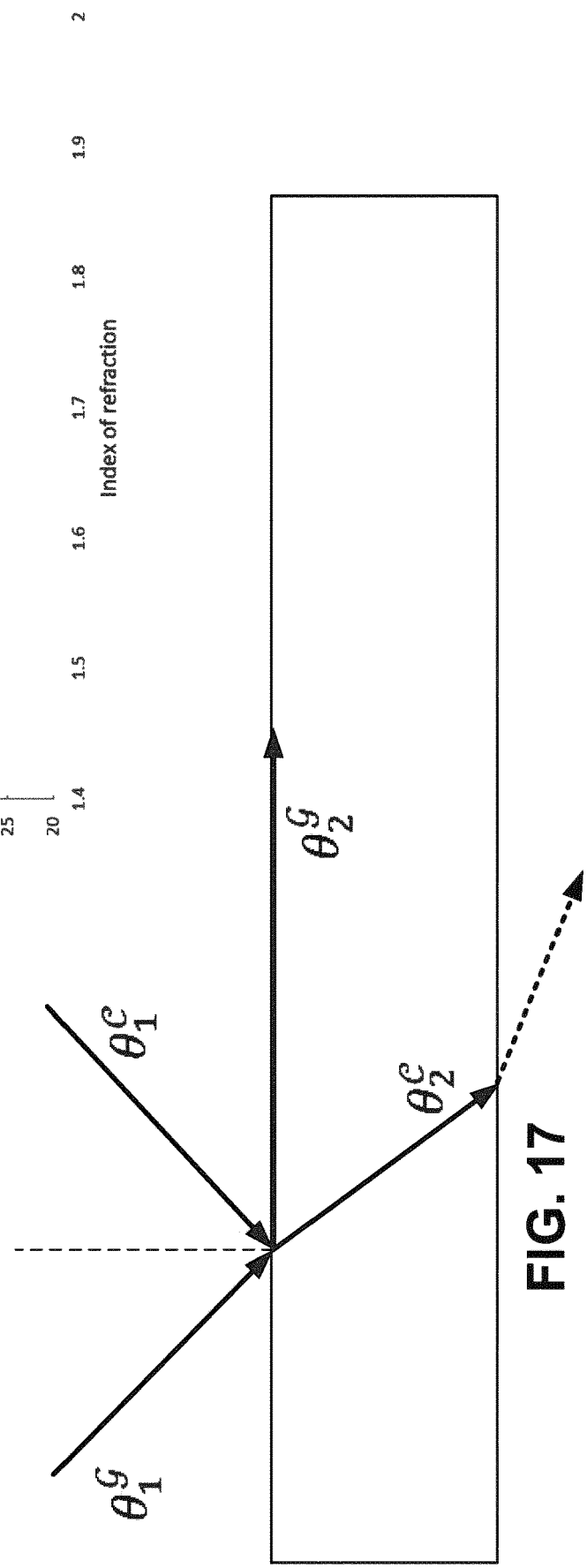
FIG. 17 is a schematic illustration of a single mode system where a single diffraction mode is used to carry the image using either the +1 or the −1 diffraction mode.

FIG. 16 is a schematic diagram of some of the optical components in a second waveguide with transmissive in-coupling diffraction grating DG2 and system of two out-coupling diffraction gratings DG4 and DG5.

To out-couple the portion of the image directly transmitted by the second diffraction grating DG2 (the zero order beam TO transmitted without diffraction) and converted into the +2nd diffracted order by the third reflective diffraction grating, example embodiments use a fifth diffraction grating with a pitch size $d_5$. The thickness of the waveguide and size and location of the diffraction grating DG4 may be selected to avoid the interaction of this portion of the image with the DG4. From FIG. 15, the angular range $[-\Theta^G{}_{WG2}; -\Theta^L{}_{WG2}]$, where $\Theta^L{}_{WG2}$ is the maximal angle of incidence directly transmitted through the DG2, transmits inside of the waveguide WG2 and diffracts inside this waveguide by DG3 into the angular range $[\phi^G{}_{WG2}; \phi^L{}_{WG2}]$. Into this waveguide, the right-hand side of the image with low angles of incidence will propagate toward the left. Finally, after multiple internal reflections it will reach the DG5. To get the out-coupled light with the same angular space, the pitch size $d_5$ of the transmissive diffraction gratings DG5 of the waveguide WG2 may be selected using such system of diffraction grating equations:

$$n_3 \sin \Phi^G_{WG2} + \sin \Theta^{G'}_{WG2} = \frac{M'\lambda}{d_5} \qquad \text{Eq. 7}$$

$$n_3 \sin \Phi^L_{WG2} + \sin \Theta^{L'}_{WG2} = \frac{M'\lambda}{d_5}$$

As before, it is assumed that $n_1=1$, and $\Phi^G{}_{WG2}$ is Chosen to approximately equal 75°. M' corresponds to the diffraction order of the diffraction grating DG5.

Then, $$d_5 = \frac{M'\lambda}{n_3 \sin \Phi^G_{WG2} + \sin \Theta^{G'}_{WG2}}.$$

The comparison of presented expression with Eq. 6 taking into account the signs of corresponding angles shows that to get the same angular span for the out-coupled light, $d_5$ may be selected such that $d_5=d_3$ and $N=-M'$.

To out-couple the portion of the image diffracted by the second diffraction grating DG2 (specifically the +2$^{nd}$ diffracted order) which is coupled by the WG2 avoiding diffraction by the DG3, a fourth diffraction grating may be used with a pitch size $d_4$. From FIG. 16, the angular range $[\Theta^C{}_{WG2}; \Theta^G{}_{WG2}]$ (high angles of incidence), diffracts inside of the waveguide WG2 into the angular range $[\phi^G{}_{WG2}; \phi^G{}_{WG2}]$ propagating toward the left. Finally, after multiple internal reflections it will reach the reflective diffraction grating DG4 with the pitch size that may be selected according to a the system of diffraction equations:

$$-n_3 \sin \Phi^G_{WG2} + n_3 \sin \psi^G_{WG2} = \frac{N'\lambda}{d_4} \qquad \text{Eq. 8}$$

$$-n_3 \sin \Phi^C_{WG2} + n_3 \sin \psi^C_{WG2} = \frac{N'\lambda}{d_4}$$

where $\psi^G{}_{WG2}$ and $\psi^C{}_{WG2}$ are grazing and critical angles diffracted by reflective diffraction grating DG4. In this example, it is assumed that the incident angle is positive, the angle for corresponding diffracted order is positive and diffracted order is negative. N' corresponds to the diffraction order of the diffraction grating DG4. So, pitch of DG4 can be calculated as:

$$d_4 = \frac{N'\lambda}{-n_3 \sin \Phi^G_{WG2} + n_3 \sin \psi^G_{WG2}} \qquad \text{Eq. 9}$$

Assuming that after it the diffracted light should be directly transmitted by the DG5 (such that the angular range $[-\psi^G{}_{WG2}; -\psi^C{}_{WG2}]$ will correspond to the 0 diffraction order) into the host medium with refractive index $n_1=1$ and with the angular range $[\Theta^C{}_{WG2}; \Theta^G{}_{WG2}]$ we obtain that $n_2 \sin \psi^G{}_{WG2} = -\sin \Theta^G{}_{WG2}$ and $n_2 \sin \psi^C{}_{WG2} = -\sin \Theta_{WG2}{}^C$. Then, the pitch of DG4 can be calculated using the formula:

$$d_4 = \frac{N'\lambda}{-n_3 \sin \Phi^G_{WG2} - n_3 \sin \psi^G_{WG2}}. \qquad \text{Eq. 10}$$

The comparison of presented expression with Eq. (4) taking into account the signs of corresponding angles shows that to get the same angular span for the out-coupled light, in some embodiments, $d_4=d_2$ for $N'=-M_2$.

Taking into account the angles of diffraction inside the waveguide, it can be concluded that the green and blue virtual images will be out-coupled only by the diffraction grating DG5 without substantial interaction with DG3 and DG4.

While some of the embodiments described herein employ a second diffractive order of each of the in-couplers and out-couplers, other embodiments may use a first diffractive order. In such embodiments, a coupler using the first diffractive order may have a grating pitch that is half of a grating pitch of the corresponding coupler using the second diffractive order.

An advantage of some embodiments is the reduced number of waveguides used to provide a high FoV using unpolarized light. Example embodiments combine the beams diffracted by the reflective and transmissive diffraction gratings placed from the both side of the glass plate. We also have calculated the parameters of out-coupler to preserve the angle range for out-coupling light. It has also to be noted that our nano jet-wave based technology can be used in the twin and U-shape structures of the reflective diffraction gratings for the ±2 order of diffraction. We should note that if the index of refraction of both waveguides are tweaked a little bit, a full 180 degrees field of view can be achieved for full RGB system with two waveguides.

In some embodiments, to calculate FoV range, the following formulas are used:

$$FoV^{min} = 2 \sin^{-1}\left(0.75 n_3 \frac{\lambda_R}{\lambda_G} - 1\right)$$

$$FoV^{max} = 2 \sin^{-1}\left(\max\left[n_3 \frac{\lambda_R}{\lambda_G} - 1; 1\right]\right)$$

In some embodiments, the system is operative to couple light with an incident angle of greater than 38° and lower than 100° into at least one of the first waveguide and the second waveguide for $n_3=1.5$, $\lambda_R=625$ nm and $\lambda_G=530$ nm.

In some embodiments, the system is operative to couple light with an incident angle of greater than 100° and up to 180° into at least one of the first waveguide and the second waveguide for $n_3=2.0$, $\lambda_R=625$ nm and $\lambda_G=530$ nm.

In some embodiments, the system is operative to couple light with an incident angle of greater than 38° and up to 180° into at least one of the first waveguide and the second waveguide for $n_3$ changing from 1.5 to 2.0, $\lambda_R$=625 nm and $\lambda_G$=530 nm.

In some embodiments, to determine an acceptable range for the pitch $d_2$ the following formula is used:

$$d_2^{max} = \frac{M_2}{0.8\, n_3}\lambda_G,\ d_2^{min} = \frac{M_2}{n_3}\lambda_G$$

$$d_1^{max} = \frac{M_1}{0.8 n_2 + 0.8\, n_3 - 1}\lambda_G,\ d_1^{min} = \frac{M_1}{n_2 + n_3 - 1}\lambda_G$$

$$d_3^{max} = \frac{N}{0.8\, n_3}\lambda_R,\ d_3^{min} = \frac{N}{n_3}\lambda_R$$

In some embodiments, a first grating pitch ($d_1$) of the first transmissive diffractive in-coupler is between 170 nm and 760 nm for $n_2$ and $n_3$ between 1.5 to 2.0 and for $M_1$=1 or 2.

In some embodiments, a second grating pitch ($d_2$) of the second transmissive diffractive in-coupler is between 260 nm and 890 nm for $n_3$ between 1.5 and 2.0 and for $M_1$=1 or 2.

In some embodiments, the third grating pitch ($d_3$) of the reflective diffractive in-coupler is between 300 nm and 1050 nm for $n_3$ between 1.5 and 2.0 and for $M_1$=1 or 2.

Example Single-Waveguide Structures

Some example embodiments provide a full-RGB single waveguide system with high FoV. Some such embodiments are based on the combination of two in-coupling and two out-coupling diffraction gratings placed from both sides of the waveguide. Some such embodiments allow for the use of only one waveguide. Some embodiments exhibit a very high field of view due to the use of dual-mode image propagation.

Example embodiments use a high FoV optical full RGB system with just one waveguide that can be used for in-coupling light into the optical device and/or out coupling light from the optical device. Such an optical device can be used as a waveguide for AR/VR glasses for instance. Reducing the number of waveguides while keeping the high FoV allowed by the index of the guide helps to miniaturize (reduce in weight or size) and simplify the system.

For waveguides based on diffraction gratings with an optical system generating a synthetic image to be superimpose in the field of view, it is desirable for lens systems to have real and not virtual exit pupils. In other words, its exit pupil location is external to the lens, and it is also at the same time the aperture stop of the lens.

Figure 19:
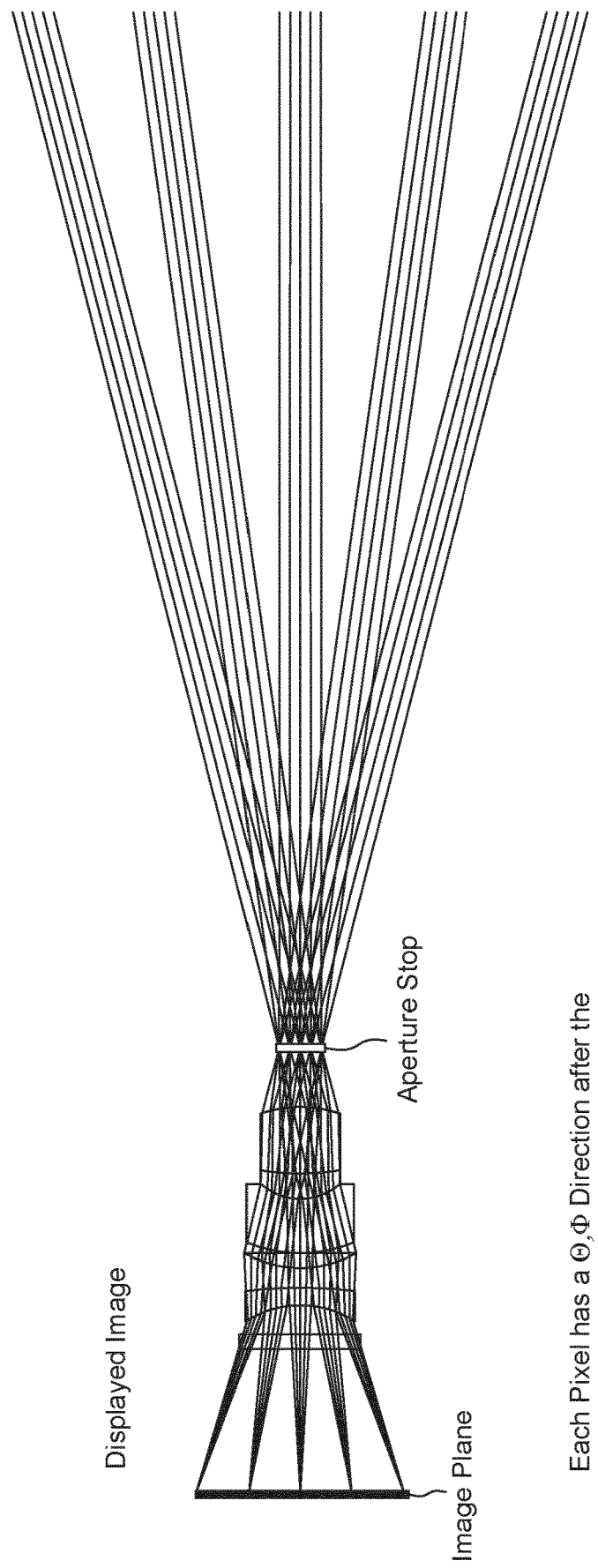
FIG. 19 is a cross-sectional side view of a lens system that provides a real exit pupil.

The lens system of FIG. 19 provides an appropriate exit pupil. The system has a disk-shaped aperture stop whose diameter is dependent on the diameter of the lens that limits the most its size. As there are no lenses after that aperture stop, it is the image of itself and hence the exit pupil. It is at this place or at the vicinity thereof that the in-coupler may be set.

A lens system may be referred to as afocal if either one of the object or the image is at infinity. The lens system of FIG. 19 is afocal on the image side as the rays leaving the lens are parallel for each field and there is an image at infinity.

A point position on an object may be referred to as a field. FIG. 19 illustrates rays leaving five different fields. In some cases, a pixel may be considered to be field. The size of a pixel may be assumed to be negligible as compared to other quantities in the system.

As seen in FIG. 19, each field's rays are spilled over the whole exit pupil. Hence, if we aperture down the exit pupil, we will homogeneously also cut-off on pixel's number of rays, for all fields at the same time, which means the light intensity will go down. This is the functionality of the aperture stop and this demonstrates that the exit pupil and the aperture stop are the same in that lens and that the exit pupil is real and not virtual.

The pupil can be tiled spatially. This means that the positive side of the pupil (rays hitting the pupil at y>0) will undergo one diffraction process, while rays hitting the pupil at the negative side (y<0), will undergo another diffraction process. The origin of the y axis is the optical axis. The rays hitting the pupil with some angular sign will undergo a particular process, while those hitting with the opposite sign will undergo another diffraction process. Alternatively, pupil angular tiling may lead to rays with a range [$\theta_1,\theta_2$] being diffracted into one direction in the waveguide while rays with [$-\theta_1,-\theta_2$] are diffracted into the opposite direction.

Another property of an afocal lens is to map all pixels from the display, which are referenced by their respective position in a cartesian coordinates by their (x,y) coordinates on the display, into a spherical coordinate system. With respect to FIG. 19, consider the image plane to be in the x-y plane, with the y-axis extending up and down on the page and the x-axis being perpendicular to the page. After the afocal lens system, the rays issued from one single field cannot be referenced by x or y since they spread, but they all have a unique direction which is different from one pixel to another. The lens converts pixel (x,y) coordinates to a spherical ($\theta,\phi$) pair. This means that for each ray's direction in the exit pupil (or in-coupler) we deal with another pixel.

Figure 20:
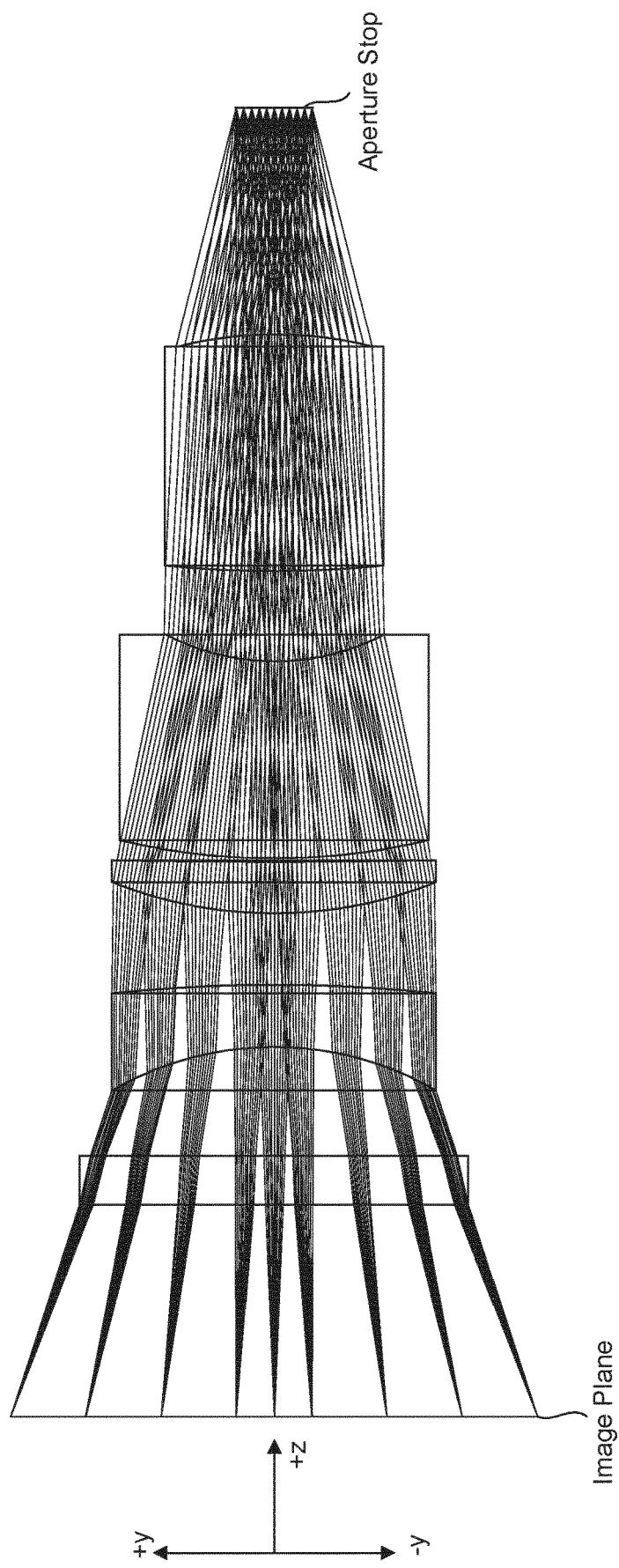
FIG. 20 is a cross-sectional side view of a lens system suitable for use in some embodiments.

In the example of FIG. 20, the rays from fields with y>0 and the rays from fields with y<0 have angles with opposite sign at the exit pupil in a polar coordinate system. If we use a spherical coordinate system with the z-axis pointing along the optical axis, then the polar angles are always between 0 and pi (positive) and only the azimuthal direction sign will distinguish the rays hitting the exit pupil 'from above' or 'from below'. At each position along the exit pupil, we have positive as well as negative ray directions in a polar coordinate system.

When symmetric diffraction modes are used, the diffraction grating will diffract an incoming ray in the plus or minus order. In some cases, if the ray has one particular sign orientation, it will diffract in one mode, and if the sign changes, it will diffract into the opposite mode. In fact, mathematically, the diffraction occurs always in all modes. Hence what we mean here is that if for a particular direction of incoming ray we diffract into a particular mode, the energy in that mode is stronger than in the mode of opposite sign. Symmetric here means that if a plus direction diffracts efficiently into the mode M, the minus direction will diffract efficiently into the −M direction. (M is a relative natural number).

Figure 21:
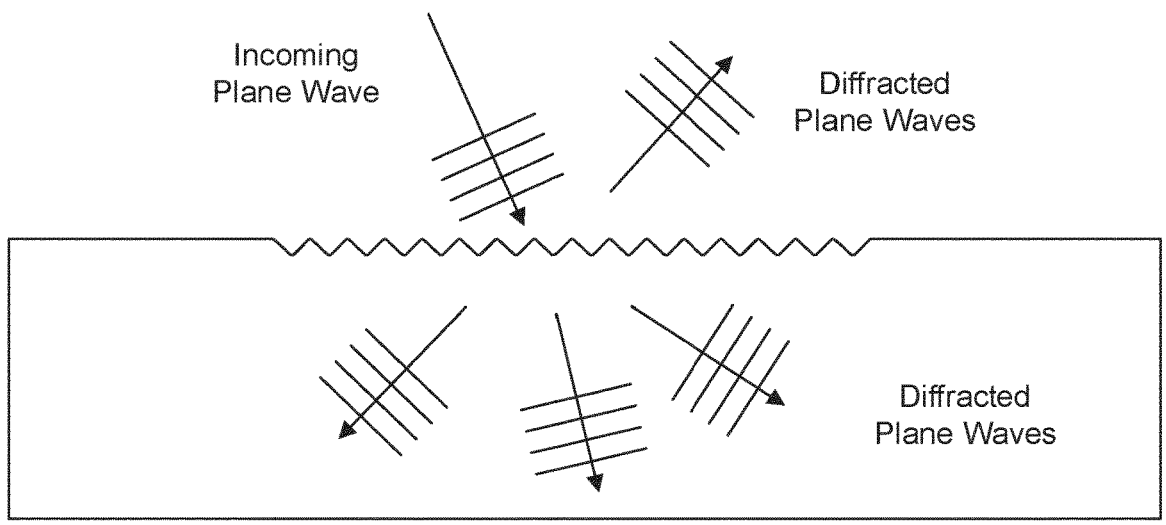
FIG. 21 is a cross-sectional view of a symmetric diffraction grating.
Figure 22:
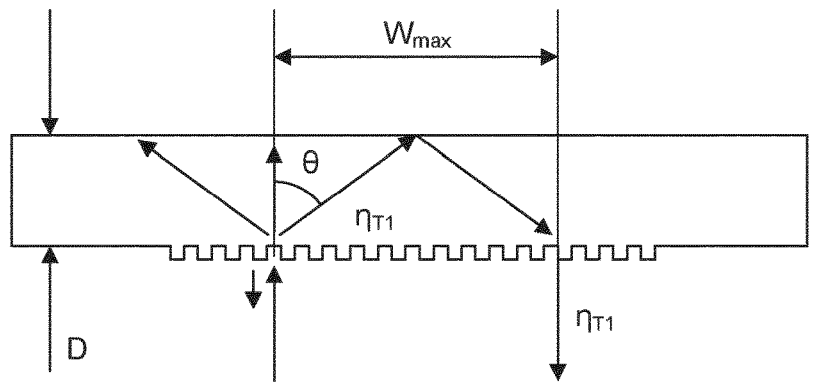
FIG. 22 is a cross-sectional view of another symmetric diffraction grating.

A symmetric diffraction grating generally permits the previous property of symmetric diffraction modes. This property may be effected with the use of a basic structure (elementary pitch) that has a left-right geometrical symmetry. Blazed and slanted grating are not symmetric diffraction gratings. Grating based on square shape steps (door shape) can be symmetric diffraction gratings. FIGS. 21 and 22 offer examples of symmetric diffraction gratings.

Example embodiments use symmetric diffraction gratings that can achieve symmetric diffraction modes of very high efficiency. For opposite signed angle of incidence, some embodiments provide +M or −M diffraction modes of high efficiency.

Figure 23:
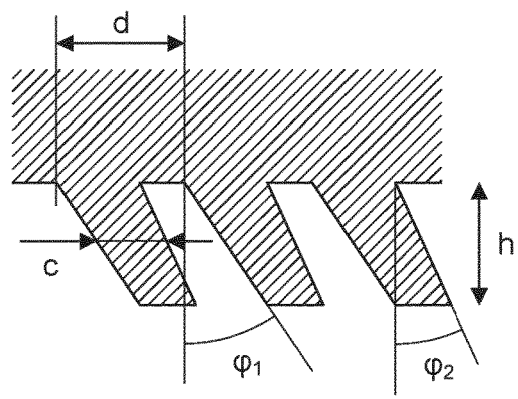
FIG. 23 is a cross-sectional view of a slanted diffraction grating.

FIG. 23 illustrates a slanted grating which, when illuminated from above, will be efficient for rays tilted toward the left (negative angles in our case) and will have the best diffraction mode towards the right hand side. When illuminated from the right hand side (positive angle), the diffraction mode toward the left will be very weak.

FIG. 24 illustrates use of symmetric diffraction with non-symmetrical gratings that employs two different diffraction gratings. The in-coupling grating in FIG. 24 has asymmetric groove profiles. The grating is split in two parts, each coupling mainly to one direction. In the system of FIG. 24, rays on the left-hand side will diffract with high efficiency toward the left, those on the right-hand side will diffract to the right, with high efficiency for a limited angular range. In addition to that process, a small part of the energy will also diffract into the opposite direction for the opposite diffraction mode.

In a grating as in FIG. 24, only rays hitting the right hand side grating with negative direction of propagation will efficiently diffract into the right hand side diffraction mode. Rays hitting the right hand side diffraction grating with positive angles of incidence will not diffract into the right hand side diffraction mode. (They will in fact but with a low intensity). Only rays hitting the left hand side grating with positive direction of propagation will efficiently diffract into the left hand side diffraction mode. Rays hitting the left hand side diffraction grating with negative angles of incidence will diffract into the left hand side diffraction mode only with a low intensity. As, at each position of the exit pupil, there is an equal distribution of positive and negative angles of propagation approximately half of the light will be lost. FIG. 25 illustrates typical diffraction efficiencies for both gratings as a function of the angle of incidence.

In contrast, a diffraction grating with a profile as illustrated in FIG. 26A, which is used in some embodiments, provides for more even coupling of light across different angles of incidence, as is illustrated schematically in FIG. 26B.

Figure 27:
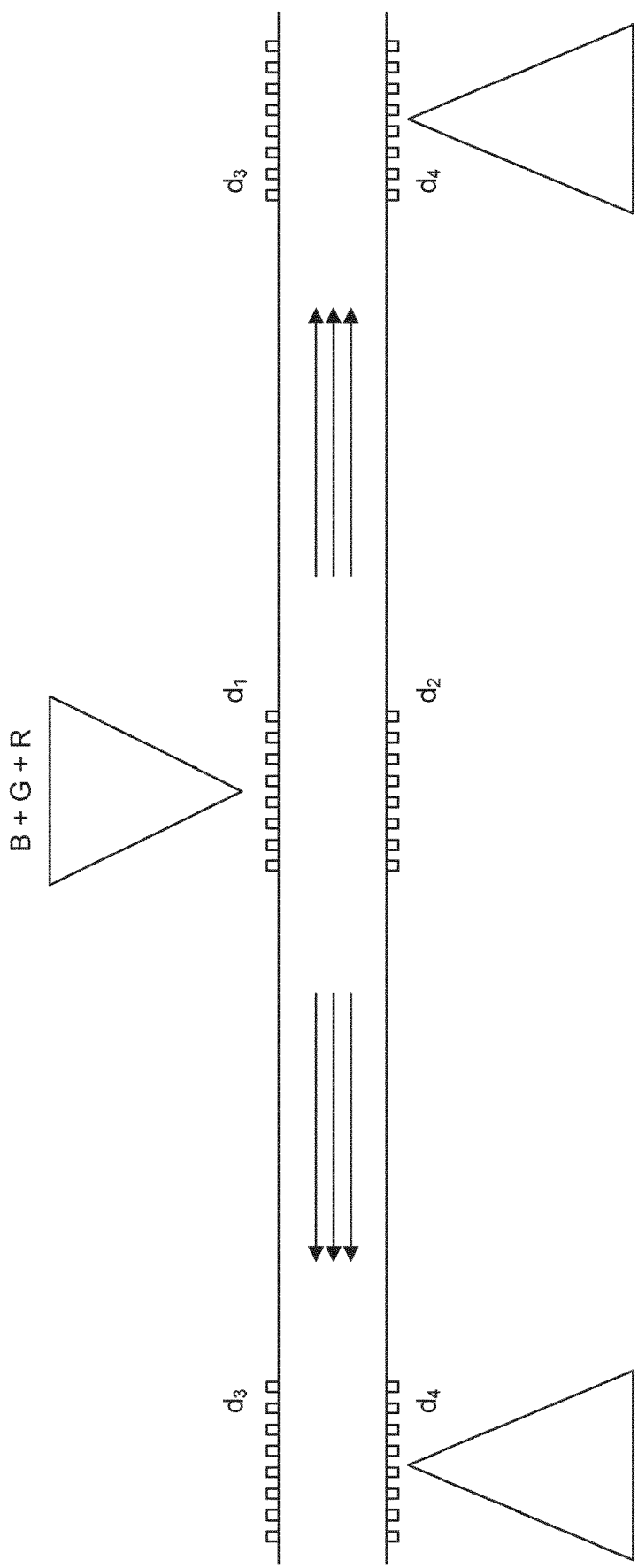
FIG. 27 is a schematic side view of a waveguide used in some embodiments.

Some example embodiments provide a single waveguide full-color solution with high FOV for in-coupling light into the optical device. Some embodiments provide high efficiency and high diffraction uniformity for in-coupled light. FIG. 27 is a schematic side view of a waveguide used in some embodiments.

Figure 28A:
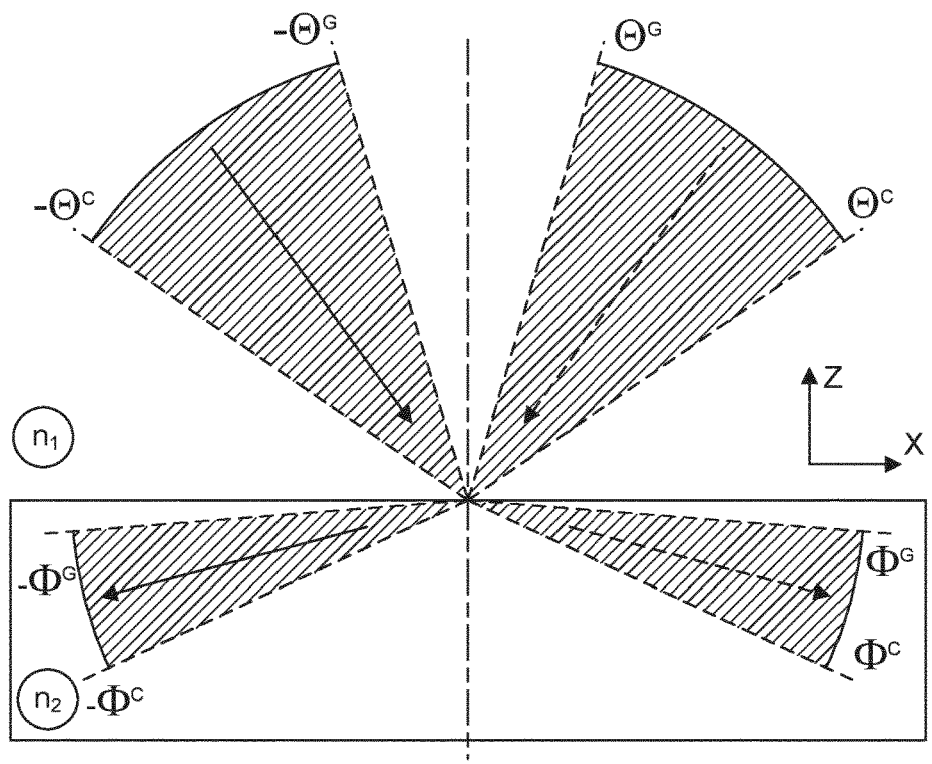
FIGS. 28A-28B are schematic side views of a single-waveguide in-coupling system illustrating angles of incident and diffracted light for transmissive (FIG. 28A) and reflective (FIG. 28B) diffraction gratings.
Figure 28B:
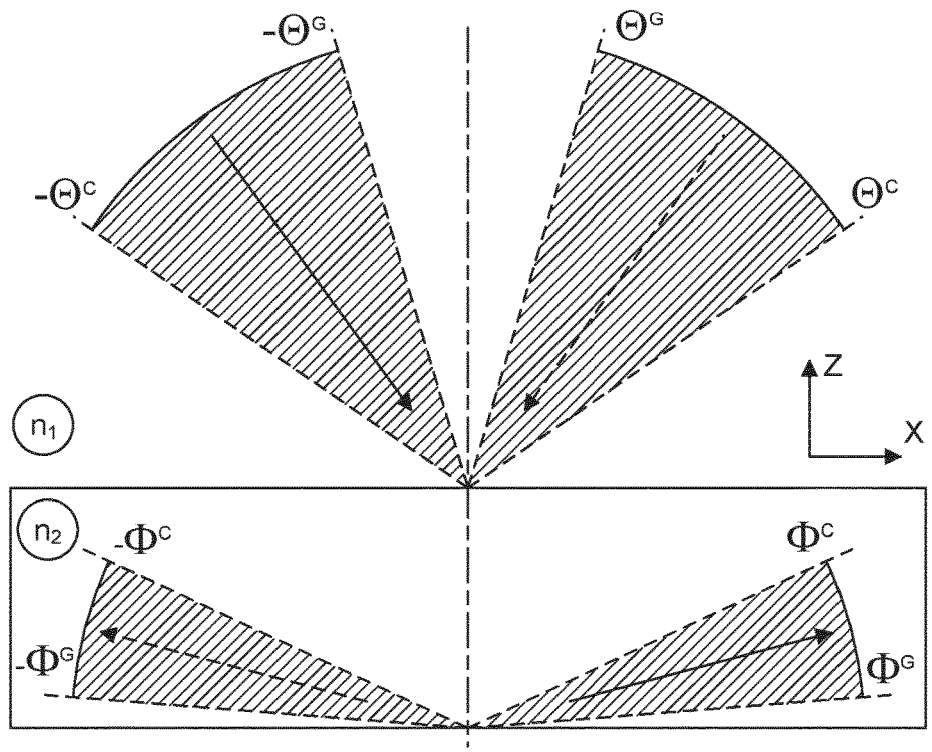

FIGS. 28A-28B are schematic side views of a single-waveguide in-coupling system illustrating angles of incident and diffracted light for transmissive (FIG. 28A) and reflective (FIG. 28B) diffraction gratings. Angles whose name begins with $\Theta$ are located in the air (or other ambient medium). Angles whose name begins with $\phi$ are located in the waveguides and measure the angle of rays that have been diffracted. C is a critical ray, either in air or in the waveguide, G is a grazing ray. The negative angles of incidence and corresponding diffracted angles inside the waveguide are marked by the solid arrows, and the positive angles of incidence and corresponding diffracted angles inside the waveguide are marked by the dashed arrows.

Example embodiments operate by diffracting of the incident light by two diffraction gratings and in-coupling it into the waveguide. Proper combination of diffraction gratings described in this disclosure provide a high FoV for three colors. FIGS. 28A-28B demonstrate the functionality of transmissive (28A) and reflective (28B) diffraction gratings. The angular ranges $[\Theta^C; \Theta^G]$ and $[-\Theta^G; -\Theta^C]$ diffract inside the waveguide into the angular ranges $[\phi^C; \phi^G]$ and $[-\phi^G; -\phi^C]$. Passing through the transmissive diffraction grating into the waveguide, the left-hand side of the image will propagate toward the left into the waveguide while the right-hand side of the image will propagate toward the right. Finally, the left-hand side of the image corresponds to the negative angles of incidence, which inside the waveguide will be mainly transferred into the negative transmitted diffraction order (first or second depending on the topology of the system). The right-hand side of the image corresponding to the positive angles of incidence will be transferred into the positive transmitted diffraction order. In a case of light diffraction by the reflective diffraction grating which is from the bottom of the waveguide, the positive angles of incidence will propagate toward the left in the waveguide corresponding to the negative reflected diffraction order while negative angles of incidence will propagate toward the right corresponding to the positive reflected diffraction order. The reflective grating is different from the transmissive one in that it has a different pitch size calculated for the proper wavelength, but the geometrical structure that emphasizes the edge-waves can be of the same shape.

To reduce the number of the waveguides to one waveguide, some embodiments use diffraction gratings with the following characteristics.

In some embodiments, for the transmissive diffraction grating (DG1 with the pitch $d_1$), the pitch sizes are calculated for blue color wavelength and an angular range covering full FoV for the transmissive diffraction grating ($2\Delta\theta_1$ for a dual-mode system), assuming that the incoming grazing rays are in the vicinity of the normal. The diffraction grating may be selected to get high diffraction efficiency of corresponding orders ($\pm 2^{nd}$ or $\pm 1^{st}$ depending on the topology) in the mentioned angular range at blue color wavelength. As illustrated in FIG. 29A, corresponding to the blue color, the angular ranges $[\Theta^C_1; \Theta^G_1]$ and $[-\Theta^G_1; -\Theta^C_1]$ diffract inside of the waveguide into the angular ranges $[\phi^G_1; \phi^C_1]$ and $[-\phi^C_1; -\phi^G_1]$. DG1 may be configured such that $\Theta^C_1 \approx \Delta\theta_1$. (Note that $\Theta^C_1$, $\Theta^G_1$, $\phi^G_1$, and $\phi^C_1$ can have different values for each color.)

At a wavelength corresponding to the green color, there is a shift of an angular distribution toward the higher angles of an incidence. As illustrated in FIG. 29B, at a green color wavelength, the angular ranges $[\Theta^C_1; \Theta^G_1]$ and $[-\Theta^G_1; -\Theta^C_1]$ diffract inside of the waveguide into the angular ranges $[\phi^G_1; \phi_C^1]$ and $[-\phi^C_1; -\phi^G_1]$. The angular range between $[-\Theta^G_1; \Theta^G_1]$ transmits through the transmissive diffraction grating DG1 (it corresponds to the 0 transmitted order $T_0$) with a very high efficiency. This portion of incident image will be diffracted by reflective grating which is from the bottom of the waveguide. If for angular ranges above $|\pm\Theta^G_1|$ the transmittivity $T_0$ is also high, it also will be diffracted by the reflective DG2 (corresponding range of diffracted angles depends on the parameters of reflective DG2 and cannot be bigger than $[-\Theta^C_2; \Theta^C_2]$) and after it can be combined with the portion of image diffracted by DG1.

Similar functionality will be observed at a wavelength corresponding to the red color. Increasing the wavelength, we obtain the additional shift of an angular distribution toward the higher angles of an incidence. As shown in FIG. 29C, at red color wavelength the angular ranges $[\Theta^C_1; \Theta^G_1]$ and $[-\Theta^C_2; -\Theta^C_1]$ diffract inside of the waveguide into the angular ranges $[\phi^G_1; \phi^C_1]$ and $[-\phi^C_1; -\phi^G_1]$. As in a case of green color, the angular range between $[-\Theta^G_1; \Theta^G_1]$ transmits through the transmissive diffraction grating DG1 (it corresponds to the 0 transmitted order $T_0$) with a very high efficiency. This portion of incident image will be also diffracted by reflective grating DG2. If for angular ranges above $|\pm\Theta^G_1|$ the transmittivity $T_0$ is also high, it also can be diffracted by the reflective DG2 (range of diffracted angles depends on the parameters of DG2 and cannot be bigger than $[-\Theta^C{}_2; \Theta^C{}_2]$) and after it can be combined with the portion of image diffracted by DG1.

In some embodiments, the reflective diffraction grating (DG2 with the pitch $d_2$) has a pitch size calculated for red color wavelength and an angular range covering full FoV for the reflective diffraction grating ($2\Delta\theta_1$ for a dual-mode system), also assuming that the grazing rays are in the vicinity of the normal. This diffraction grating may be selected to provide high diffraction efficiency of corresponding orders ($\pm 2^{nd}$ or $\pm 1^{st}$ depending on the topology) in the mentioned angular range at red color wavelength. From FIG. 29C corresponding to the red color, the angular ranges $[\Theta^C{}_2; \Theta^G{}_2]$ and $[-\Theta^G{}_2; -\theta^C{}_2]$ diffract inside of the waveguide into the angular ranges $[\Theta^G{}_2; \Theta^C{}_2]$ and $[-\phi^C{}_2; -\phi^G{}_2]$. DG2 may be configured such that $\Theta^C{}_2 \approx \Delta\theta_1$.

At the wavelength corresponding to the green color, there is a shift of an angular distribution toward the lower angles of an incidence leading to the angular overlapping of the corresponding positive/negative diffraction orders. It means that the positive diffraction order will correspond to negative and some range of positive angles of incidence. The negative diffraction order will correspond to positive and some negative angles of incidence. Finally, we obtain the range of low angles for which we have the response for both diffraction orders (angular overlapping of the characteristics). This fact may be taken into account to prevent the undesirable deterioration of the image quality.

The following diffraction equations may be used in some embodiments to calculate the pitch sizes $d_1$ and $d_2$ of the transmissive and reflective diffraction gratings DG1 and DG2 of two waveguides WG1 and WG2 and the total field of view coupled by the optical in-coupling device illustrated in FIG. 27.

$$n_2 \sin \Phi_1^C + n_1 \sin \Theta_{1,blue}^C = \frac{M_1 \lambda_{blue}}{d_1} \quad \text{(Eq. 11)}$$

$$n_2 \sin \Phi_1^G + n_1 \sin \Theta_{1,blue}^G = \frac{M_1 \lambda_{blue}}{d_1}$$

$$n_2 \sin \Phi_2^C - n_1 \sin \Theta_{2,red}^C = \frac{M_2 \lambda_{red}}{d_2}$$

$$n_2 \sin \Phi_2^G - n_1 \sin \Theta_{2,red}^G = \frac{M_2 \lambda_{red}}{d_2}$$

We assume that $n_1=1$. Some values are known, $$\sin \Phi_1^C = \frac{1}{n_2},$$

wherein $n_2$ is a refractive index of the waveguide's material, $M_1$ and $M_2$ correspond respectively to the diffraction orders of the first and second diffraction gratings DG1 and DG2. According to an embodiment of the present disclosure, $\Phi_1^G$ and $\Phi_2^G$ are chosen to approximately equal to 75°.

It is to be reminded that these values are design parameters, and other values can be selected. The values chosen for $\Phi_1^G$ and $\Phi_2^G$ may be chosen according to the distance the image has to travel into the waveguide before being extracted, the number of TIR bounces and thickness of the waveguide.

Taking into account the corresponding signs for the angles and diffraction orders we can present the equations for the pitch sizes of DG1 in such form:

$$d_1 = \frac{M_1 \lambda_{blue}}{n_2 \sin \Phi_1^G + n_1 \sin \Theta_{1,blue}^G} \quad \text{(Eq. 12)}$$

and we can get the critical incident angle of the first grating:

$$\sin \Theta_{1,blue}^C = -1 + \frac{M_1 \lambda_{blue}}{d_1} \quad \text{(Eq. 13)}$$

The pitch size $d_2$ of the reflective diffraction grating DG2 can be presented in the form:

$$d_2 = \frac{M_2 \lambda_{red}}{n_2 \sin \Phi_2^G - n_1 \sin \Theta_{2,red}^G}. \quad \text{(Eq. 14)}$$

The critical incident angle of the second grating has the form:

$$\sin \Theta_2^C = 1 + \frac{M_2 \lambda_{red}}{d_2}. \quad \text{(Eq. 15)}$$

Those equations can be used to calculate the field of view of the system. The next table (Table 2) shows some practical parameters and the calculated values according to the previously solved set of equations for 2 diffraction gratings at 3 different wavelengths and $n_2$ corresponding to high index wafer. Taking into account the dispersion of the waveguide material (sapphire ($Al_2O_3$), for example), for 3 different colors we have such values of the refractive index:

At $\lambda=460$ nm (blue color) $n_2=1.7783$;

At $\lambda=530$ nm (green color) $n_2=1.7719$;

At $\lambda=625$ nm (red color) $n_2=1.7666$.

In Table 2, input parameters of the proposed system are shown in parentheses. All calculated parameters are not in parentheses. To calculate the pitch at 3 different wavelengths for the diffraction gratings optimized to in-couple first diffraction order ($M_{1,2}=1$), we use eqs. (2) and (4). (For $M_{1,2}=2$ one would double the pitches of the gratings: $d_1=535.598$ nm, $d_2=749.67$ nm)

TABLE 2

|  | $\lambda = 460$ nm | $\lambda = 530$ nm | $\lambda = 620$ nm |
|---|---|---|---|
| DG1 ($M_1 = 1$) |  | $d_1 = 267.799$ nm |  |
| $\Theta_1^G$ | (0°) | 15.52° | 37.5° |
| $\Phi_1^G$ | (75°) | (75°) | (75°) |
| $\Theta_1^C$ | 45.87° | 78.26° | >90° |
| DG2 ($M_2 = -1$) |  | $d_2 = 374.835$ nm |  |
| $\Theta_1^G$ |  | 17.32° | (3°) |
| $\Phi_1^G$ |  | (75°) | (75°) |
| $\Theta_1^C$ |  | −24.46° | −40.84° |

Below we assume that the FoV is limited by the angular range $[-\Theta^C{}_1; \Theta^C{}_1]$ for blue color, where $\Theta^C{}_1=45.87°$. To avoid the black bands for some colors we propose the FoV of full RGB system should be equal to $2\times 45.87=91.74°$ (this value corresponds to $2\times\Theta_1^C$ for blue color). Such a system achieves high field of view using just 1 waveguide. But if the index of refraction of the waveguide is increased, higher field of view can be achieved for full RGB system with single waveguide.

FIGS. 29A-29C schematically depict the operation of an example system using three colors. An example of possible values of the angles is presented in Table 2. As an input we have the RGB image and three colors are superimposed but, for the sake of illustration, we show them disjointed in order emphasize the difference in behavior of each color. The schematics explain the angular space for each color (starting from blue color in FIG. 29A). For green (29B) and red (29C) colors, we show the portion of light coupled by this waveguide using ±1st diffraction orders of the DG1 and DG2.

Figure 35:
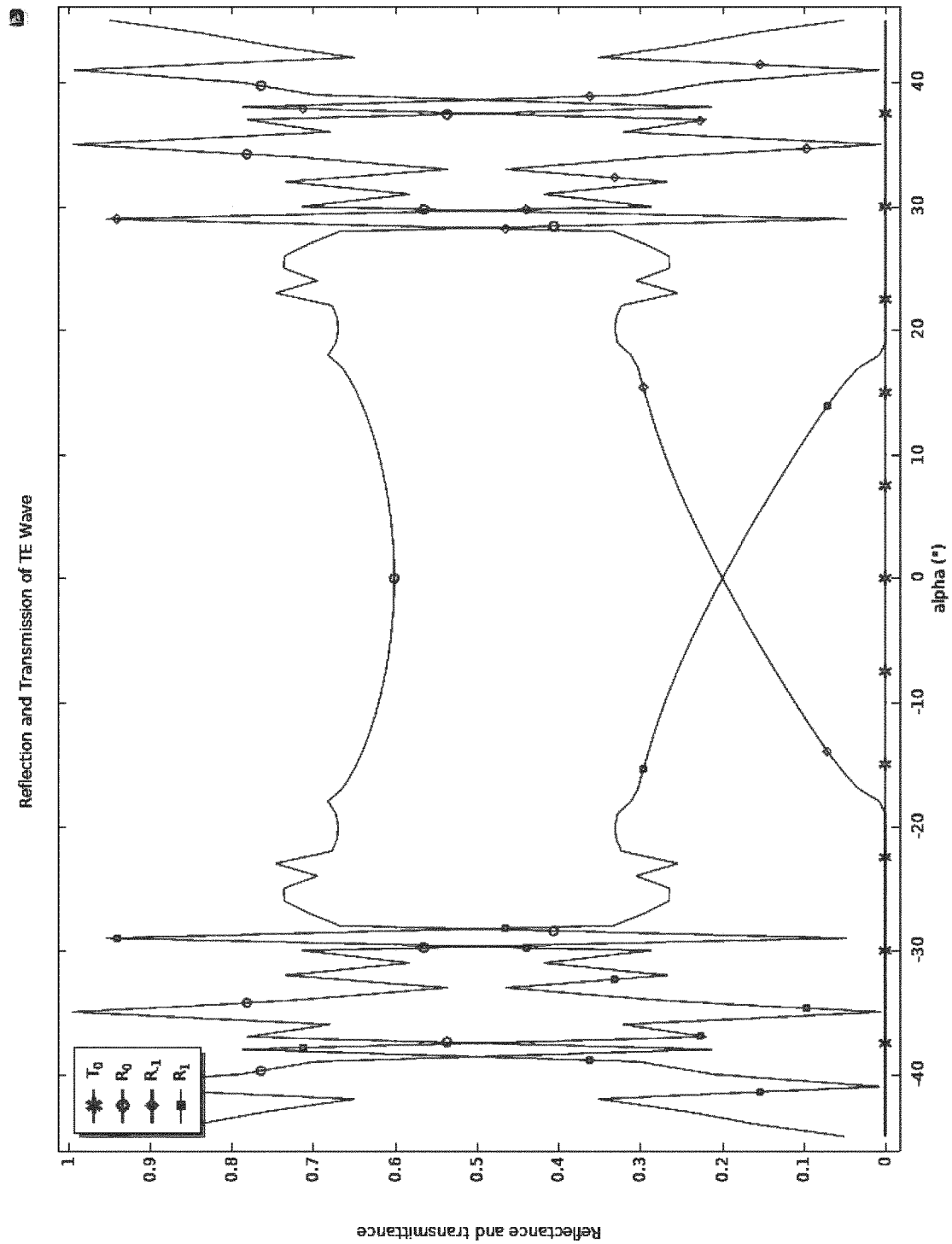
FIG. 35 is a graph illustrating simulated performance of the second reflective grating DG2 for blue light.

In the example, the majority of blue zero order has angles below the TIR limit. Those angles when hitting DG2 will have several diffraction components. As shown in FIG. 35, they will get diffracted into modes 0, +1 and −1. The light diffracted into mode 0 will be reflected back, its angle will be mirrored around the normal and it is going to hit the input interface again. If it hits at a place where there is no DG1, it will get out of the waveguide, which is desirable. If it hits the DG1, it will also get out by diffraction. It remains two modes of diffracted blue light by DG2, they can be diffracted with a maximum efficiency of around 30% at around 20 degrees. At 20 degrees inside of the waveguide, due to Snell's law, this corresponds to 37.5 degrees of incidence angle an DG1, at this incidence, the rays have below 10% of the initial power in TO mode (FIG. 32), which means that 3.0% of blue will be left at maximum, because of the unwanted reflection by DG2.

About the lateral sizes of DG2 relative to DG1, the first one should be big enough in order to gather all useful diffracted rays for green and red channels. Its size may be a function of the waveguide's thickness.

The FoV of whole system may be limited by the FoV obtained for blue color diffracted by the DG1. The total FoV for such system is about $2\Delta\theta_1$, where $\Delta\theta_1$ is maximal theoretically possible FoV for the waveguide material.

Numerical simulations have been conducted for the transmissive (FIG. 30A) and reflective (FIG. 30B) diffraction gratings with high refractive index optimized to generate intensive ±1st diffraction orders for TE polarization.

Figure 31:
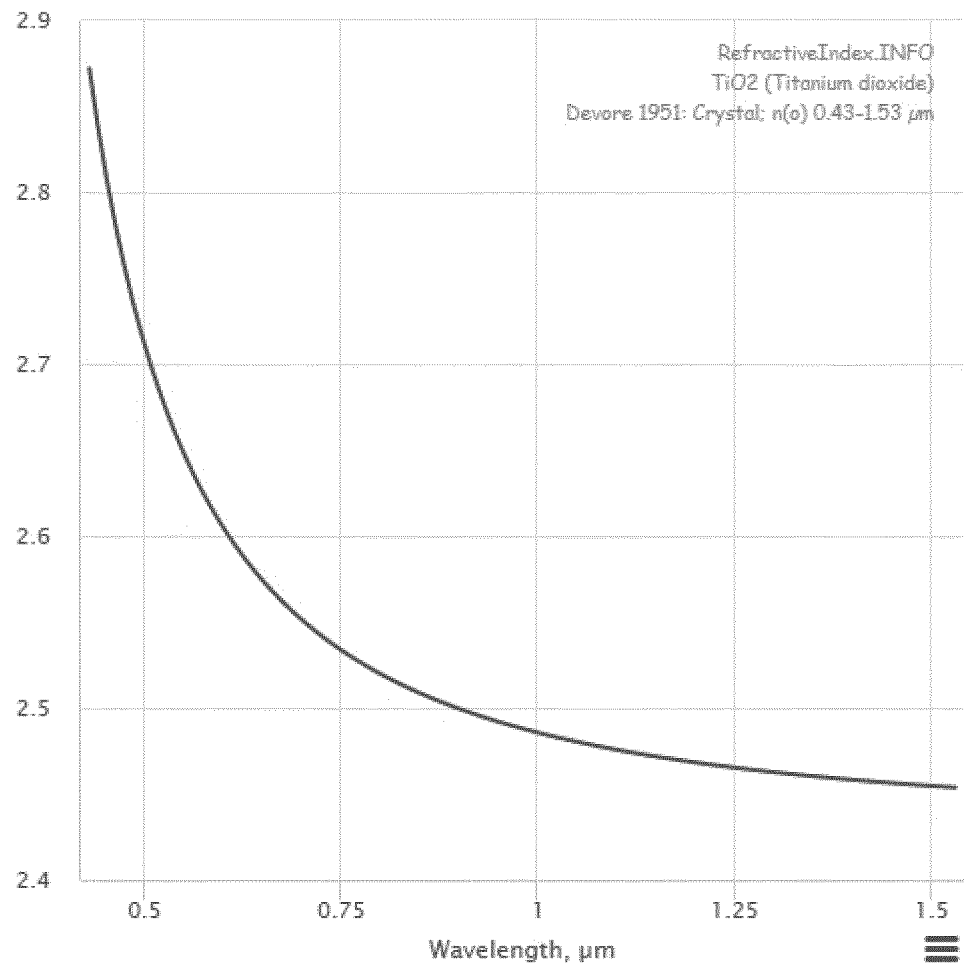
FIG. 31 is a graph illustrating the refractive index of $TiO_2$ as a function of wavelength.

The presented data were obtained using the COMSOL Multiphysics software. The simulations use $TiO_2$ as the material of the elements of the gratings and sapphire ($Al_2O_3$) as the material of the substrate. The presented numerical simulations take into account the dispersion of $TiO_2$ material. In accordance with the results of ordinary spectra measurements presented in this paper, for 3 different colors we have such values of the refractive index (see FIG. 31).

At $\lambda$=460 nm (blue color) $n_3$=2.7878;

At $\lambda$=530 nm (green color) $n_3$=2.6702;

At $\lambda$=620 nm (red color) $n_3$=2.5915.

The set of numerical simulations for two diffraction gratings with high refractive index configured for TE polarization are presented in FIGS. 32-37. We have assumed that $n_1$ is the refractive index of host medium and $n_1$=1 (air). We have considered the combination of 2 diffraction gratins for a full RGB system with FoV=91.74°.

Figure 32:
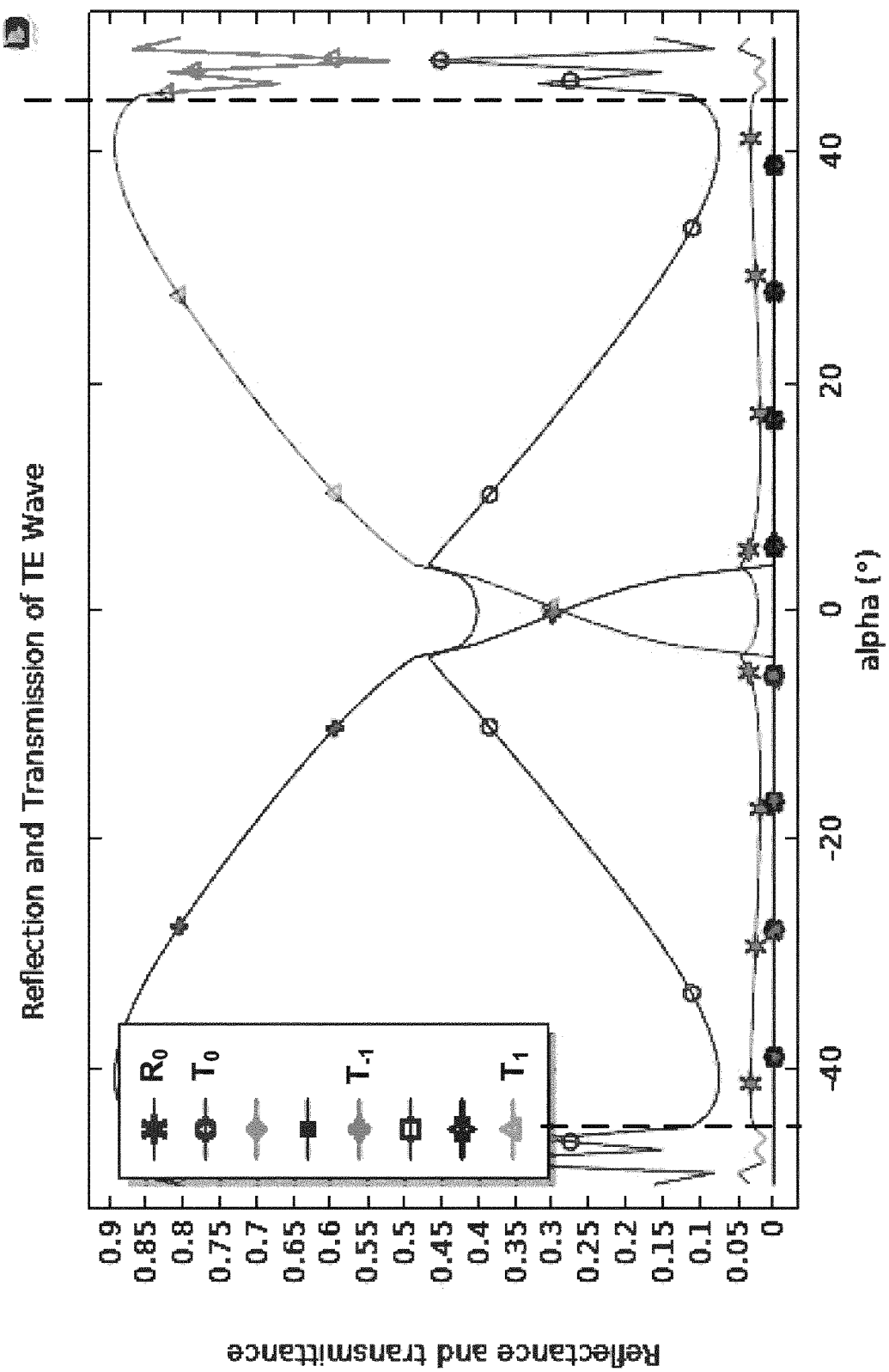
FIG. 32 is a graph illustrating simulated performance of the first transmissive grating DG1 for blue light.
Figure 33:
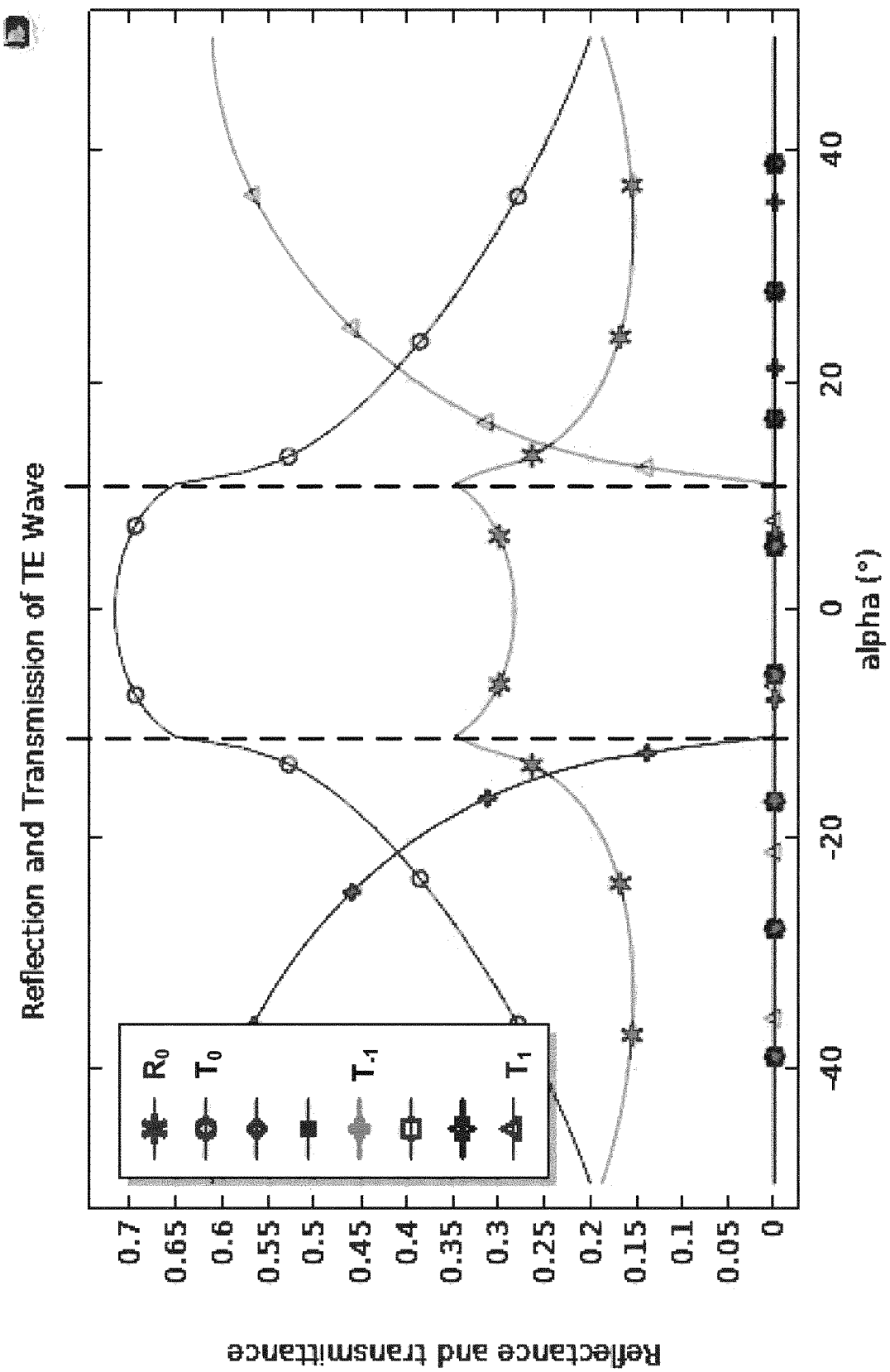
FIG. 33 is a graph illustrating simulated performance of the first transmissive grating DG1 for green light.
Figure 34:
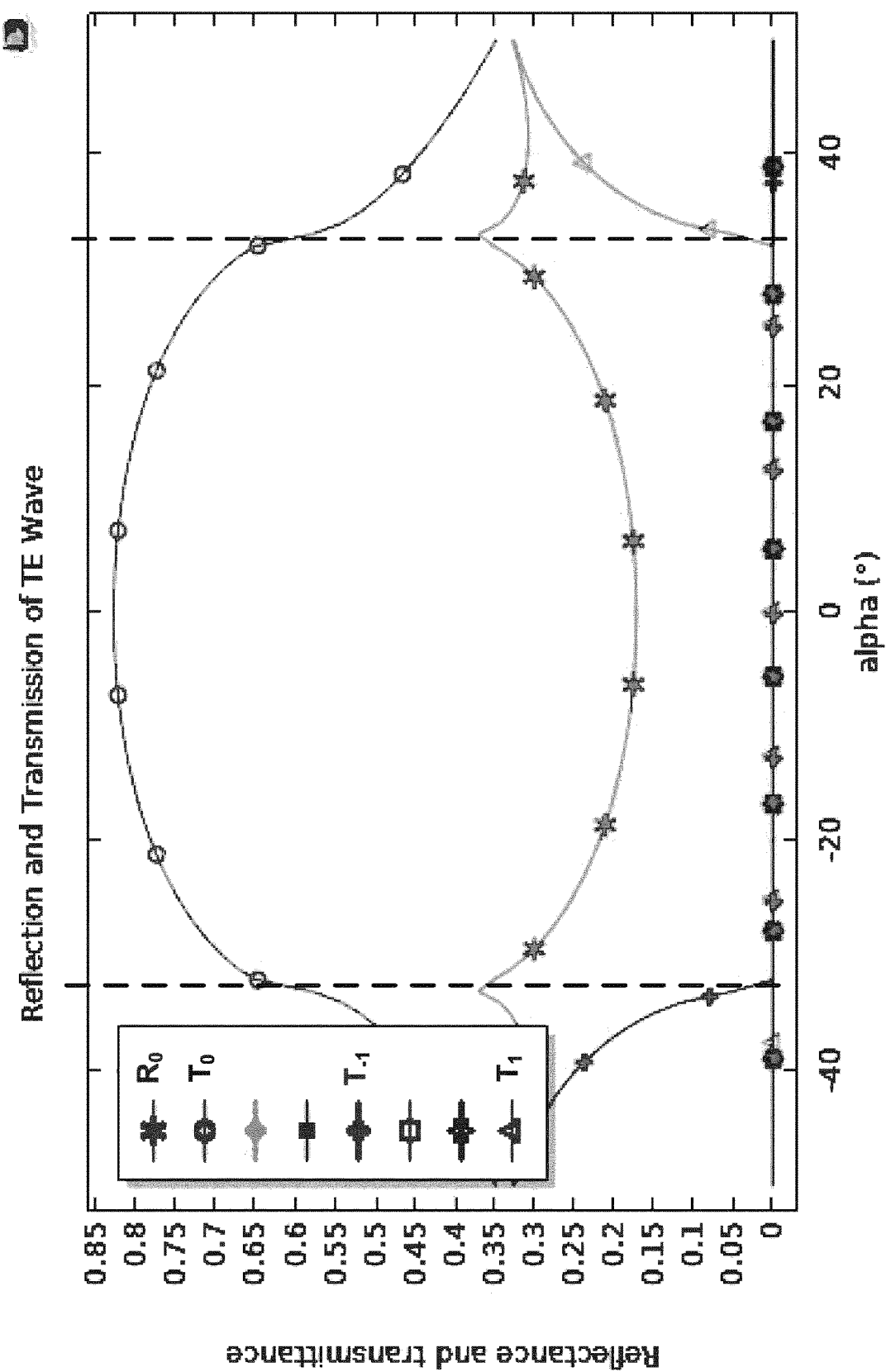
FIG. 34 is a graph illustrating simulated performance of the first transmissive grating DG1 for red light.

Illustrated in FIGS. 32-34 is simulated performance of the first transmissive grating DG1 configured for the blue color ($\lambda$=460 nm) to couple ±$1^{st}$ orders with a pitch size $d_1$=267.799 nm and the elements with $w_1$=80 nm; $h_1$=110 nm. Performance with blue light ($\lambda$=460 nm) is illustrated in FIG. 32. Performance with green light ($\lambda$=530 nm) is illustrated in FIG. 33. Performance with red light ($\lambda$=620 nm) is illustrated in FIG. 34.

Figure 36:
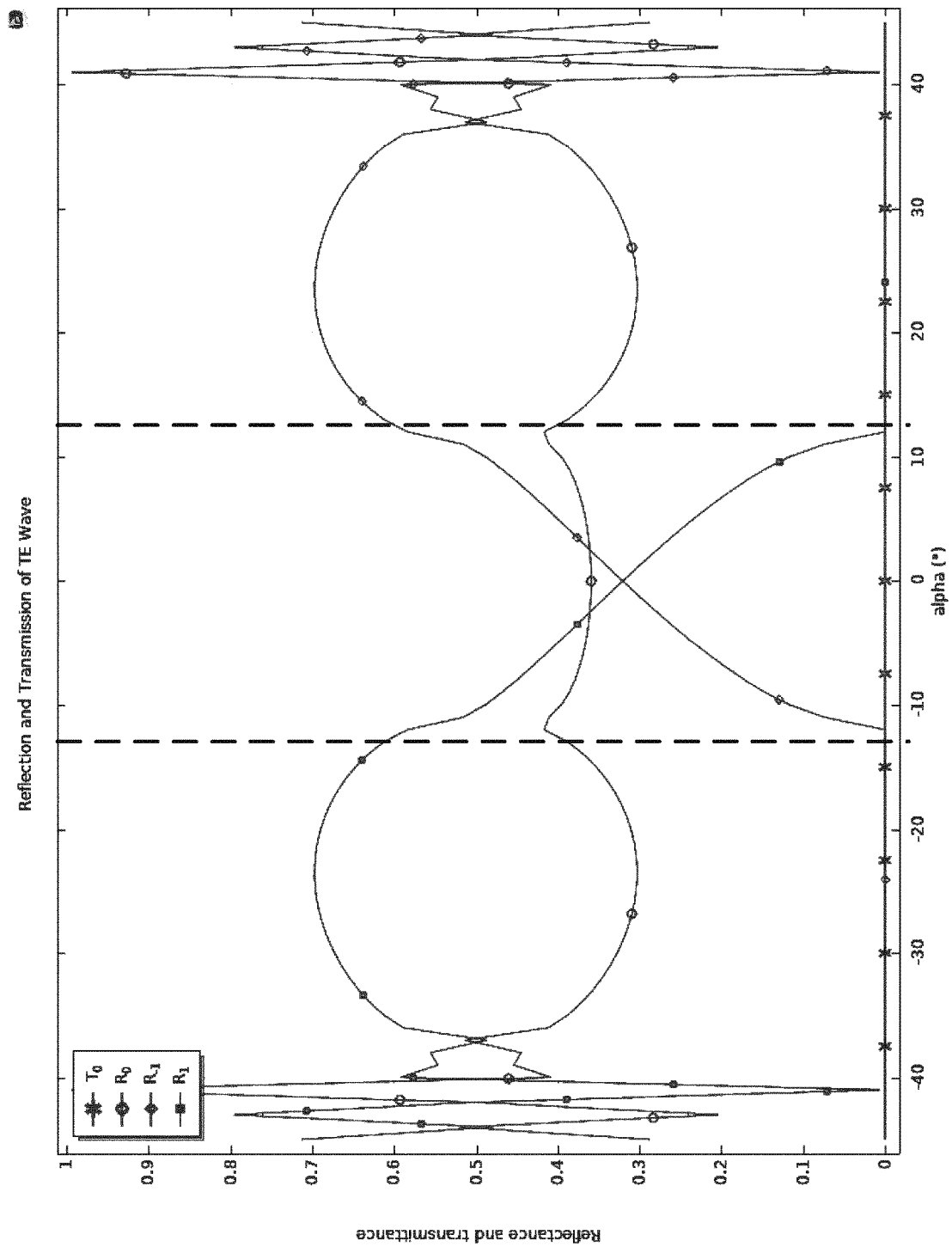
FIG. 36 is a graph illustrating simulated performance of the second reflective grating DG2 for green light.
Figure 37:
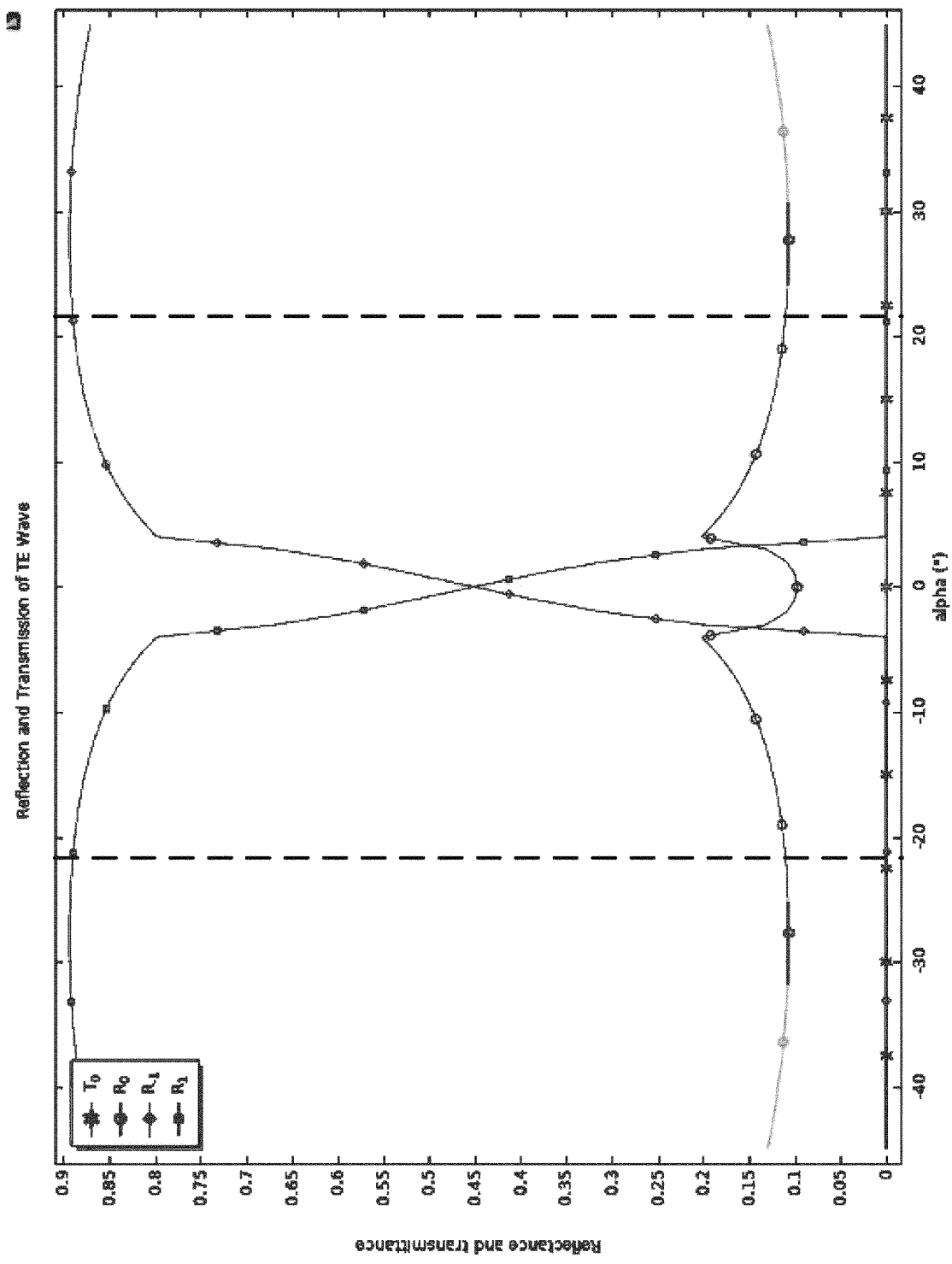
FIG. 37 is a graph illustrating simulated performance of the second reflective grating DG2 for red light.

Illustrated in FIGS. 35-37 is simulated performance of the second reflective grating DG2 configured for the red color ($\lambda$=620 nm) with a pitch size $d_2$=374.835 nm and elements with parameters $w_2$=140 nm; $h_2$=380 nm. This grating converts the portion of the red light transmitted by the first diffraction grating (0 transmitted order $T_0$) into the ±1st diffracted orders which will be coupled by the waveguide. To prevent the transmission through the waveguide and increase the intensity of diffracted light, the surface of the diffraction grating may be metallized (see FIG. 30C). The angle range presented in FIGS. 35-37 corresponds to the incidence from the medium with refractive index $n_2$. Using Snell's law, we can calculate the range corresponding to the medium $n_1$. Performance with blue light ($\lambda$=460 nm) is illustrated in FIG. 35. Performance with green light ($\lambda$=530 nm) is illustrated in FIG. 36. Performance with red light ($\lambda$=620 nm) is illustrated in FIG. 37.

Figure 38C:
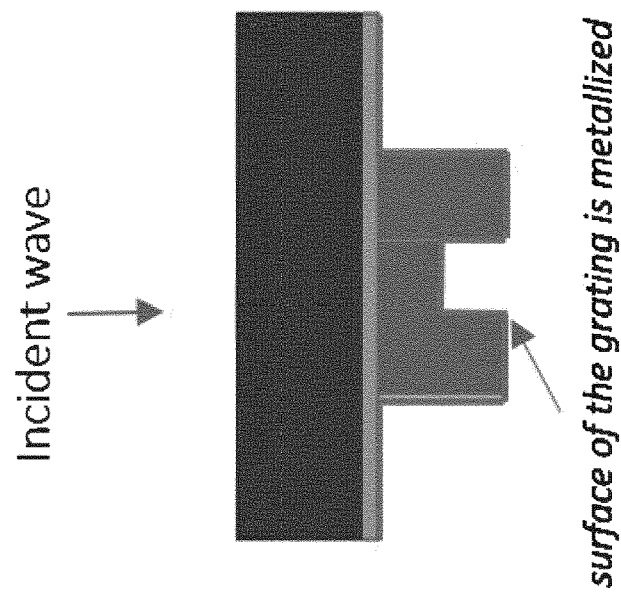
FIG. 38C illustrates a metallized surface on the grating of FIG. 38B.
Figure 38B:
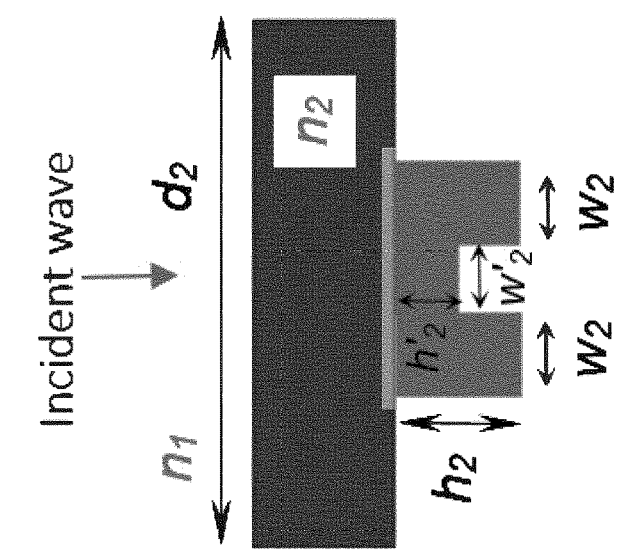
FIG. 38B illustrates a grating profile of a reflective grating used in some embodiments.
Figure 38A:
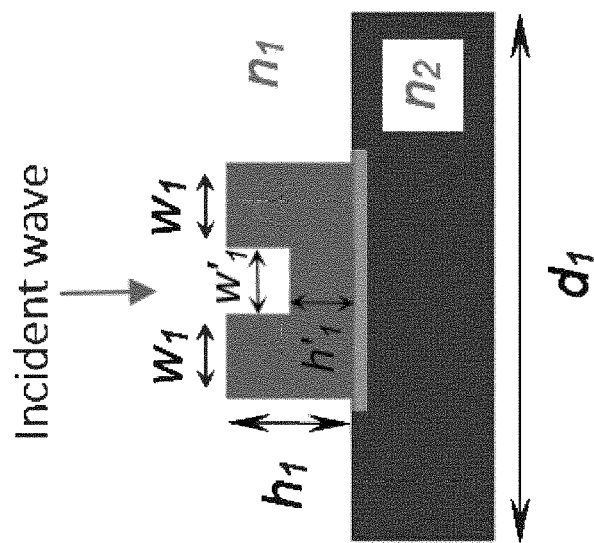
FIG. 38A illustrates a grating profile of a transmissive grating used in some embodiments.

Numerical simulations were also performed for transmissive (FIGS. 39-41) and reflective (FIGS. 42-43) with high refractive index configured to generate intensive ±2nd diffraction orders for TE polarization. FIG. 38A illustrates a grating profile of the simulated transmissive grating. FIG. 38B illustrates a grating profile of the simulated reflective grating. FIG. 38C illustrates a metallized surface on the grating of FIG. 38B.

The presented data were obtained for the same materials ($TiO_2$ as the material of the elements of the gratings and sapphire ($Al_2O_3$) as the material of the substrate) and using the COMSOL Multiphysics software.

The set of numerical simulations for 2 diffraction gratings with high refractive index optimized for TE polarization are presented in FIGS. 39-43. We have assumed that $n_1$ is the refractive index of host medium and $n_1$=1 (air). We have considered the combination of two diffraction gratings for a full RGB system with FoV=91.74°.

Figure 39:
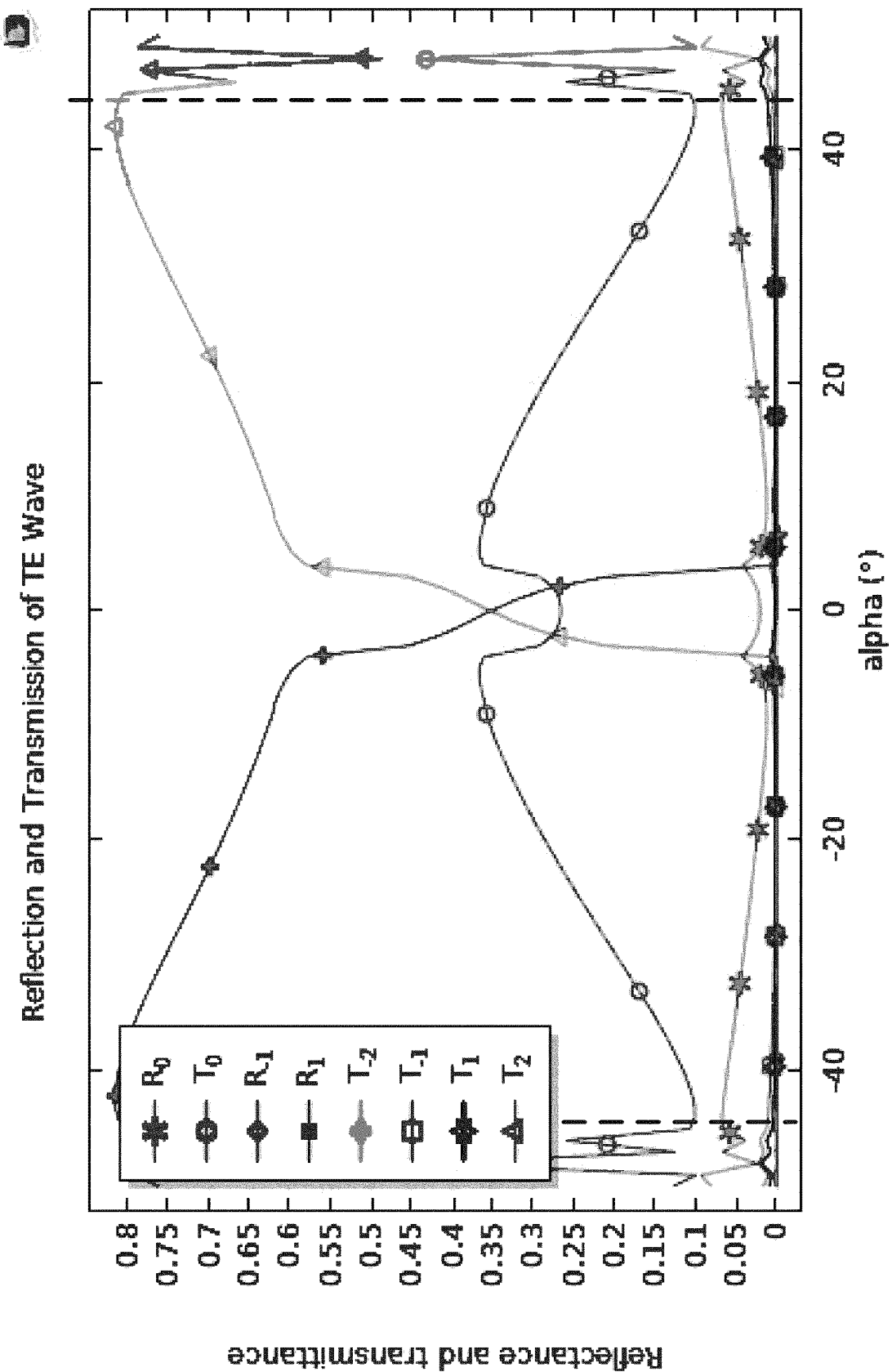
FIG. 39 is a graph illustrating simulated performance of the first transmissive grating DG1 for blue light.
Figure 40:
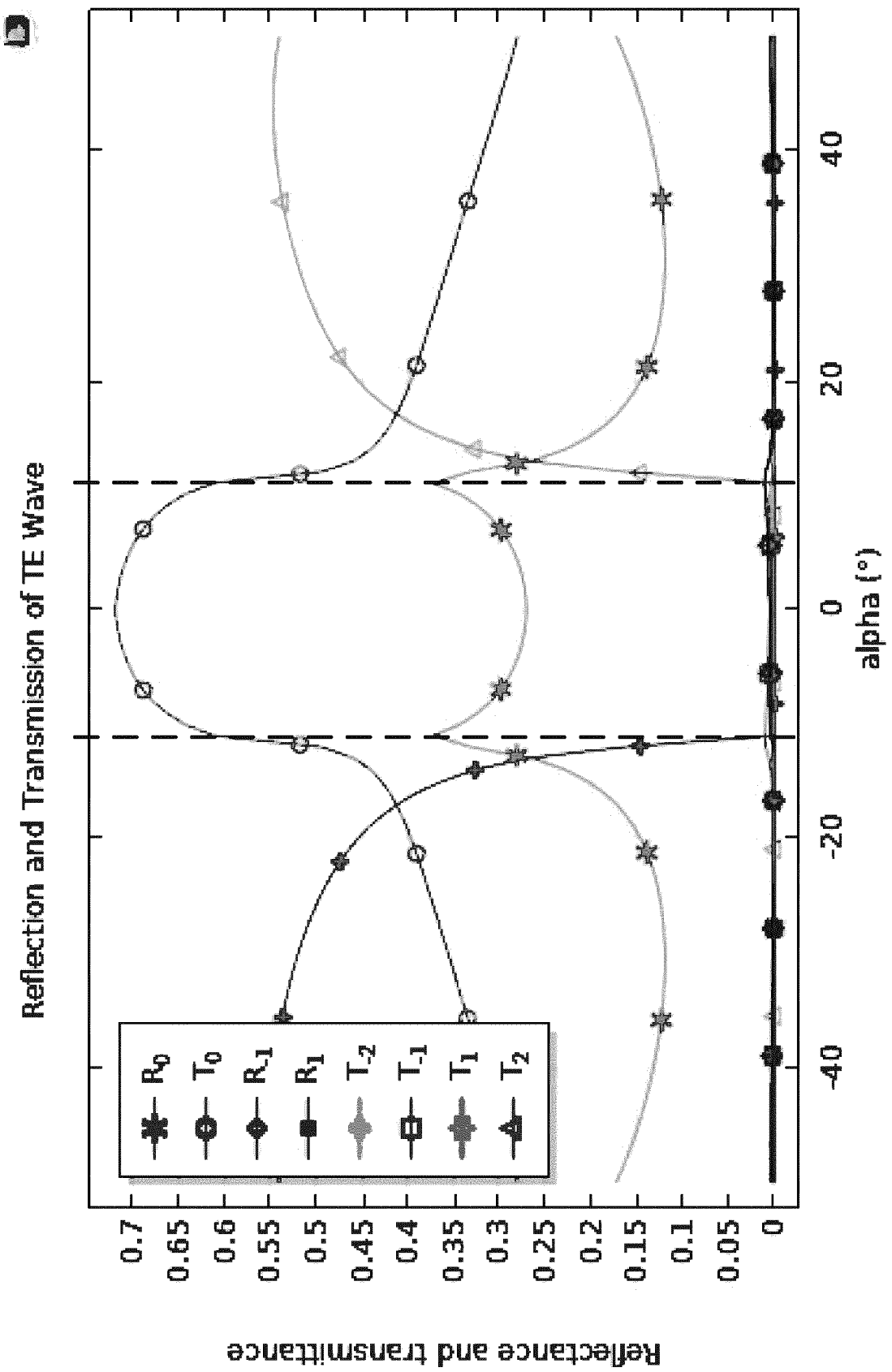
FIG. 40 is a graph illustrating simulated performance of the first transmissive grating DG1 for green light.
Figure 41:
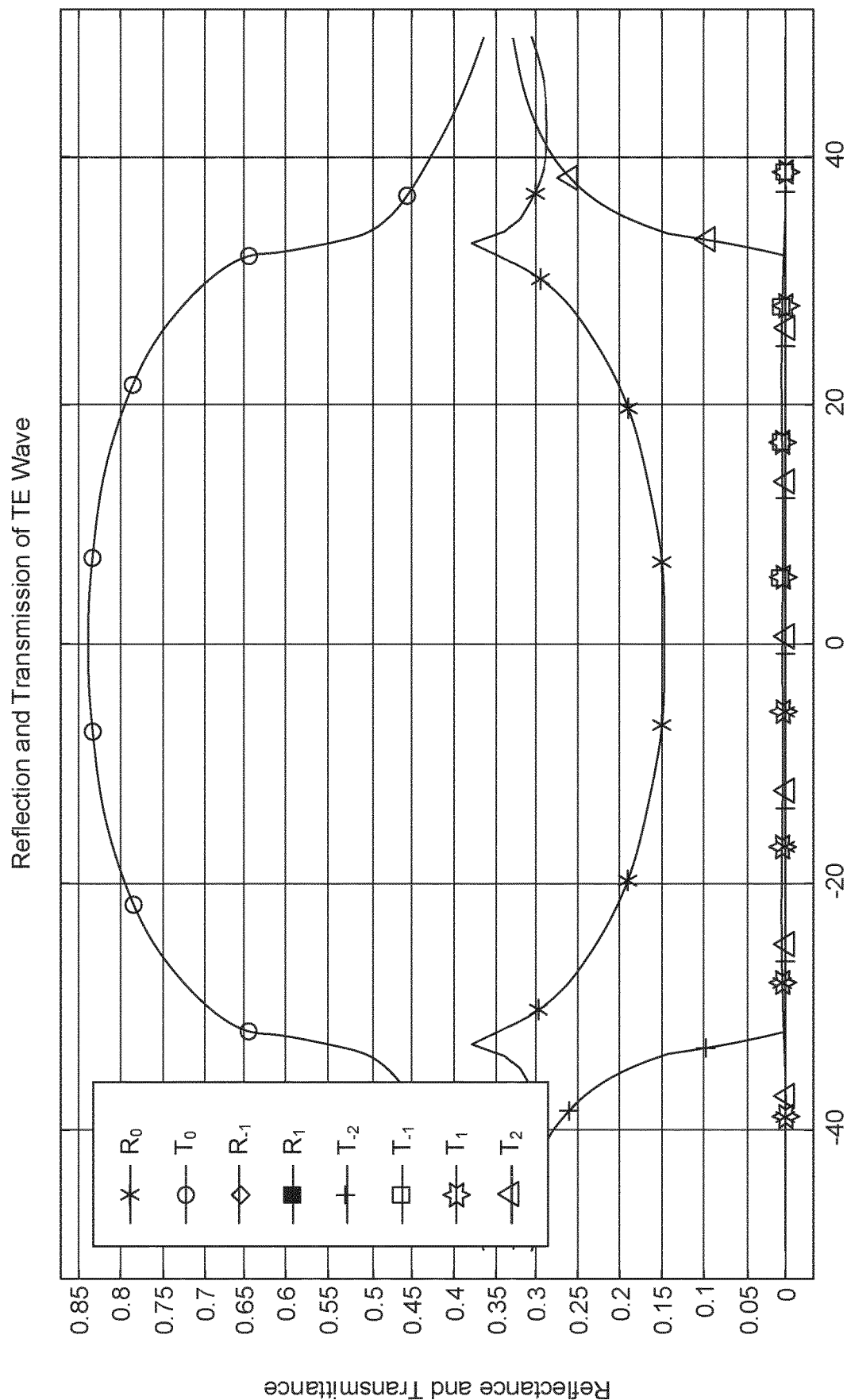
FIG. 41 is a graph illustrating simulated performance of the first transmissive grating DG1 for red light.

Illustrated in FIGS. 39-41 is simulated performance of the first transmissive grating DG1 configured for the blue color to couple ±$2^{nd}$ orders with a pitch size $d_1$=535.598 nm and elements with $w_1$=80 nm; $h_1$=110 nm; $w'_1$=187.799 nm; $h'_1$=10 nm. Use of a more complicated u-shape element may provide better diffraction uniformity for blue light. FIG. 39 illustrates simulated performance of DG1 with blue light ($\lambda$=460 nm). FIG. 40 illustrates simulated performance of DG1 with green light ($\lambda$=530 nm). FIG. 41 illustrates simulated performance of DG1 with red light ($\lambda$=620 nm).

Figure 42:
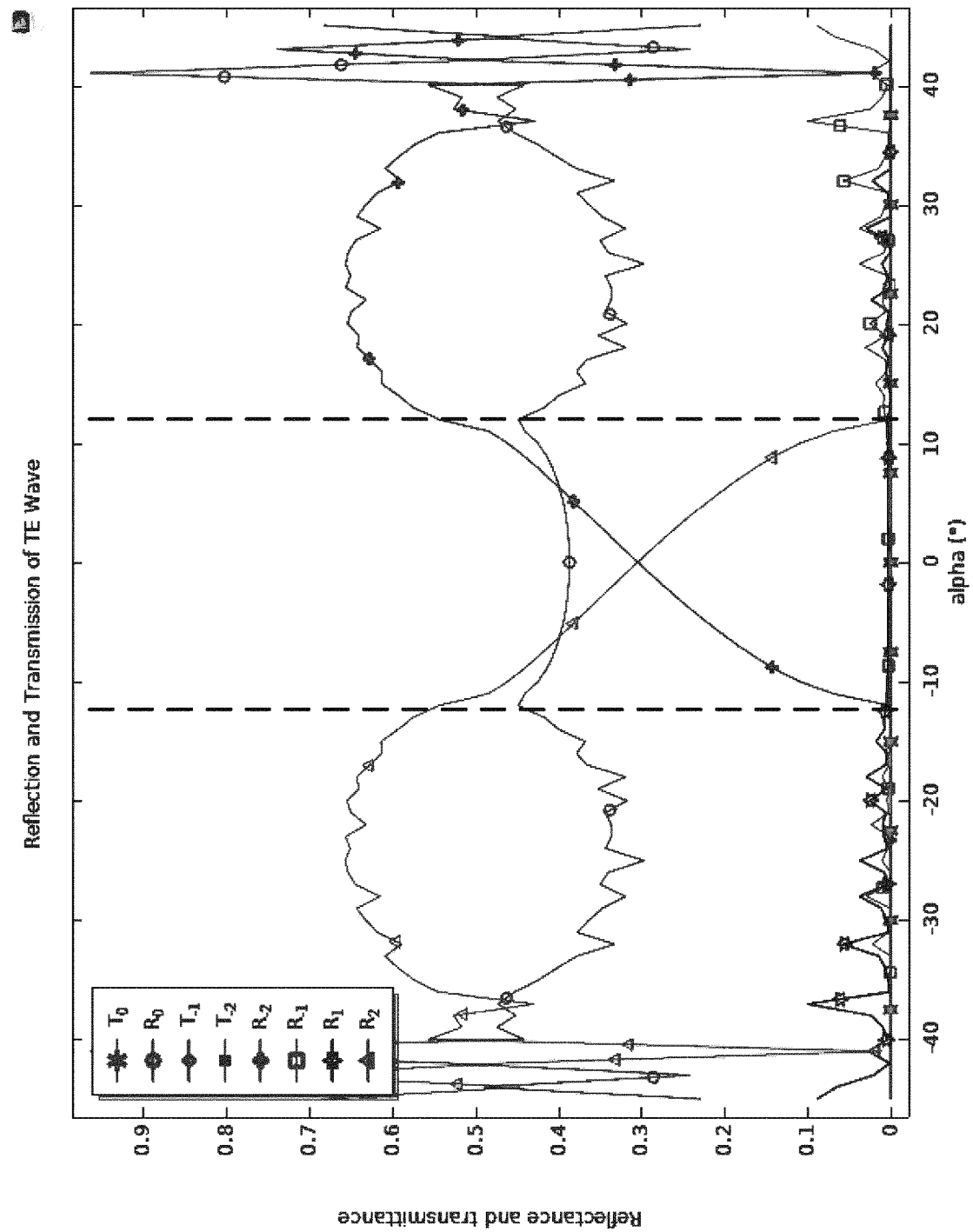
FIG. 42 is a graph illustrating simulated performance of the second reflective grating DG2 for green light.
Figure 43:
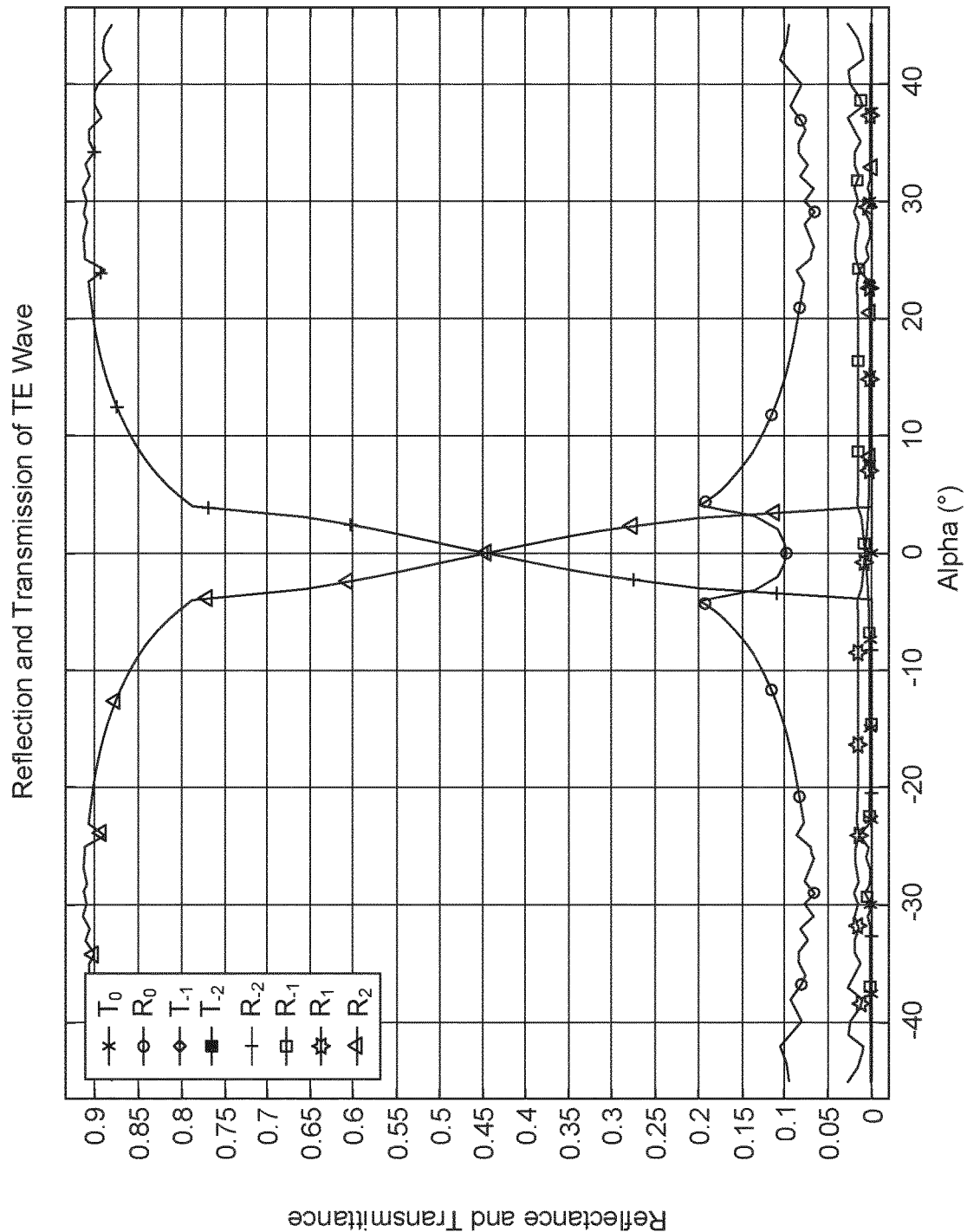
FIG. 43 is a graph illustrating simulated performance of the second reflective grating DG2 for red light.

Illustrated in FIGS. 42 and 43 is simulated performance of the second reflective grating DG2 configured for the red color with a pitch size $d_2$=749.67 nm and such parameters of the elements: $w_2$=140 nm; $h_2$=380 nm; $w'_2$=234.835 nm; $h'_2$=10 nm. This grating converts the portion of the red light transmitted by the first diffraction grating (0 transmitted order $T_0$) into the ±2nd diffracted orders which will be coupled by the waveguide. To prevent the transmission through the waveguide and increase the intensity of diffracted light, some embodiments metalize the surface of the diffraction grating (see FIG. 38C). The angle range presented in FIGS. 42-43 corresponds to the incidence from the medium with refractive index $n_2$. Using Snell's law, we can calculate the range corresponding to the medium $n_1$. FIG. 42 illustrates simulated performance of the second reflective grating DG2 for green light. FIG. 43 illustrates simulated performance of the second reflective grating DG2 for red light.

Discussed below are example embodiments of out-couplers configured for out-coupling from the waveguide the half of RGB image diffracted toward the left. Example embodiments are configured to out-couple an incident image with the proper angular span.

Figure 44:
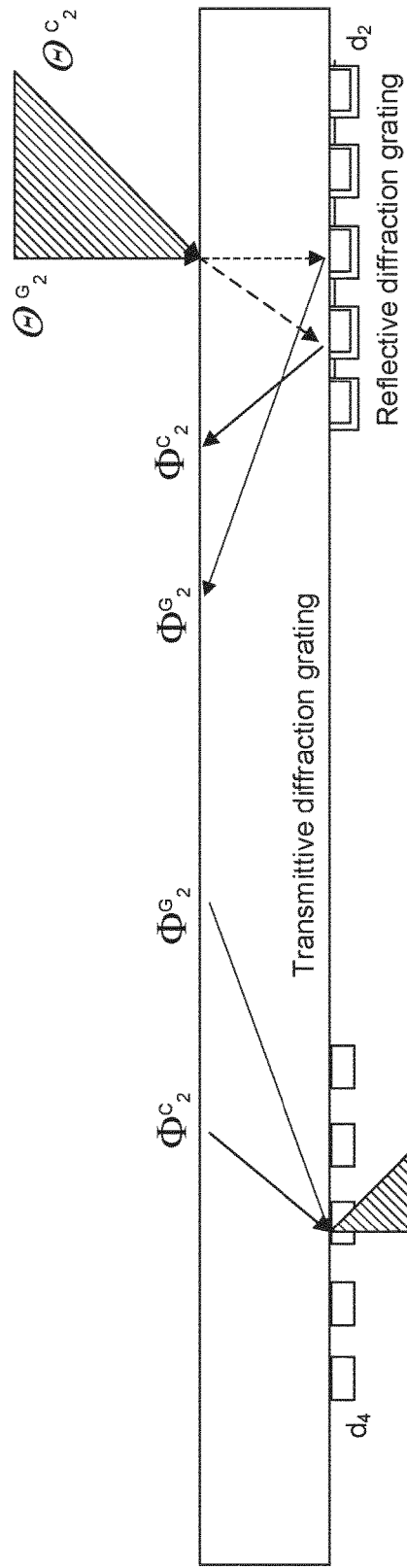
FIG. 44 is a schematic cross-sectional side view of a half of second waveguide with reflective in-coupling diffraction grating DG2 and transmissive out-coupling diffraction grating DG4.
Figure 45:
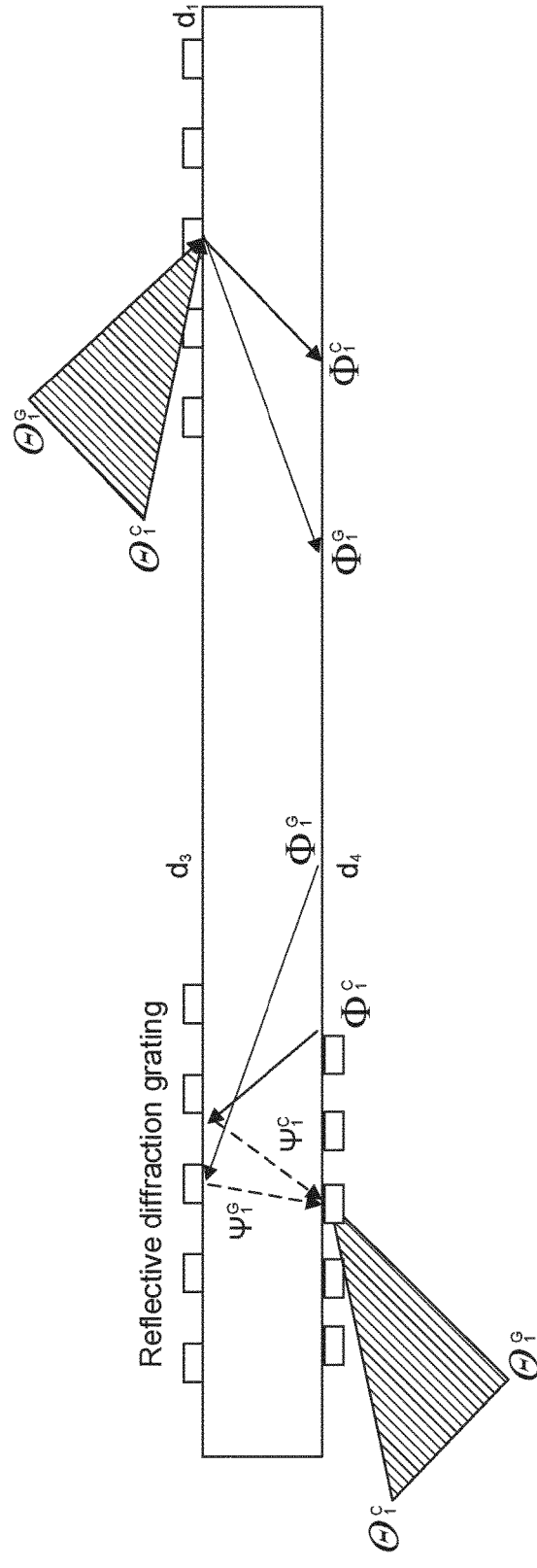
FIG. 45 is a schematic cross-sectional side view of a half of second waveguide with transmissive in-coupling diffraction grating DG1 and system of 2 out-coupling diffraction gratings DG3 and DG4.

To out-couple the image in coupled into the waveguide by diffraction gratings DG1 and DG2 some embodiments use two diffraction gratings DG3 (a reflective grating), and DG4 (a transmissive grating) from the both sides of the plate. Example embodiments use the positive diffraction mode of DG1 to carry the right-hand side image (positive high angles of incidence on the in-coupler) in right hand direction and the negative mode to propagate the negative high angles of incidence into the opposite direction of the waveguide. For the blue color wavelength and high angles of incidence at green and red colors' wavelengths the negative angles of incidence will be converted into the negative order by the diffraction grating DG1 propagating into the left-hand direction, for the blue color wavelength and high angles of incidence at green and red colors' wavelengths the positive angles of incidence will be converted into the positive order by the diffraction grating DG1 propagating into the right-hand side direction of the waveguide. In example embodiments, the out-couplers are configured to preserve the same angular span. For the green and red colors the positive low angles of incidence will be directly transmitted by the diffraction grating DG1 and converted into the negative order of reflective DG3 propagating into the left-hand direction, the negative low angles of incidence will be transformed into the positive mode and propagate into the right-hand side direction of the waveguide. In example embodiments, the out-couplers are configured to preserve the same angular span. For sake of illustration, consider the portion of the image propagating into the left part of the waveguide, as illustrated with respect to FIGS. 44 and 45.

To out-couple the portion of the image incident at low angles of incidence at red and green color wavelengths directly transmitted by the first diffraction grating DG1 (the zero order beam $T_0$ transmitted without diffraction) and converted into the positive diffracted order by the second reflective diffraction grating, example embodiments use a diffraction grating with a pitch size $d_4$. The thickness of the waveguide and size and location of the diffraction grating DG3 may be selected to avoid the interaction of this portion of the image with the DG3. From FIG. 44, the angular range $[\Theta^G_2; \Theta^C_2]$, where $\Theta^C_2$ is the critical angle of incidence directly transmitted through the DG1, transmits inside of the waveguide and diffracts inside this waveguide by DG2 into the angular range $[-\phi^G_2; -\phi^C_2]$. So, the right-hand side of the image with low angles of incidence will propagate toward the left. Finally, after multiple internal reflections it will reach the DG4. To get the out-coupled light with the same angular space, the pitch size $d_4$ of the transmissive diffraction gratings DG4 of the waveguide may be selected using such system of diffraction grating equations:

$$n_2 \sin \Phi^G_2 + \sin \Theta^G_2 = \frac{M_4 \lambda}{d_4} \quad \text{(Eq. 16)}$$

$$n_2 \sin \Phi^C_2 + \sin \Theta^C_2 = \frac{M_4 \lambda}{d_4}$$

As before, it is assumed that $n_1=1$, and $\Phi^G_2$ is chosen to approximately equal 75°. $M_4$ corresponds to the diffraction order of the diffraction grating DG4.

Then, $$d_4 = \frac{M_4 \lambda}{n_2 \sin \Phi^G_2 + \sin \Theta^G_2}.$$

The comparison of presented expression with Eq. 14 taking into $n_2 \sin D_2$ account the signs of corresponding angles (for the reflective grating DG2: angle of incidence $\Theta^G_2$ is positive, coupled diffraction order $M_2$ is negative, $\Phi^G_2$ is negative; for the transmissive grating DG4: angle of incidence $\Phi^G_2$ is positive, out-coupled diffraction order $M_4$ is positive, $\Theta^G_2$ is positive) shows that to get the same angular span for the out-coupled light, $d_4$ may be selected such that $d_4/M_4=-d_2/M_2$.

To out-couple the portion of the image diffracted by the first diffraction grating DG1 (specifically the negative diffracted order) which is coupled by the waveguide (portion of the image at blue color wavelength and high angles of incidence at green and red colors' wavelengths) avoiding diffraction by the DG2, a third diffraction grating may be used with a pitch size $d_3$. From FIG. 45, the angular range $[\Theta^C_1; \Theta^G_1]$ (high angles of incidence), diffracts inside of the waveguide into the angular range $[\phi^C_1; \phi^G_1]$ propagating toward the left. Finally, after multiple internal reflections it will reach the reflective diffraction grating DG3 with the pitch size that may be selected according to the system of diffraction equations:

$$-n_2 \sin \Phi^G_1 + n_2 \sin \psi^G_1 = \frac{M_3 \lambda}{d_3} \quad \text{(Eq. 17)}$$

$$-n_2 \sin \Phi^C_1 + n_2 \sin \psi^C_1 = \frac{M_3 \lambda}{d_3},$$

Here $\psi^G_1$ and $\psi^C_1$ are grazing and critical angles diffracted by reflective diffraction grating DG3, $M_3$ corresponds to the diffraction order of the diffraction grating DG3.

So, pitch of DG3 can be calculated as:

$$d_3 = \frac{M_3 \lambda}{-n_2 \sin \Phi^G_1 + n_2 \sin \psi^G_1} \quad \text{(Eq. 18)}$$

Assuming that after it the diffracted light should be directly transmitted by the DG4 (such that the angular range $[-\psi^G_1; -\psi^C_1]$ will correspond to the 0 diffraction order) into the host medium with refractive index $n_1=1$ and with the angular range $[\Theta^C_1; \Theta^G_1]$ we obtain that $n_2 \sin \psi^G_1 = -n_1 \sin \Theta^G_1$ and $n_2 \sin \psi^C_1 = -n_1 \sin \Theta^C_1$. Then, the pitch of DG3 can be calculated using the formula:

$$d_3 = \frac{M_3 \lambda}{-n_2 \sin \Phi^G_1 - n_2 \sin \psi^G_1}. \quad \text{(Eq. 19)}$$

The comparison of presented expression with Eq. (12) taking into account the signs of corresponding angles (for the transmissive grating DG1: angle of incidence $\Theta^G_1$ is negative, coupled diffraction order $M_1$ is negative, $\Phi^G_1$ is negative; for the grating DG3 (taking into account side of e/m wave incidence): angle of incidence $\Phi^G_1$ is negative, out-coupled diffraction order $M_3$ is positive, $\psi^G_1$ is positive, $\Theta^G_1$ is negative) shows that to get the same angular span for the out-coupled light, in some embodiments, $d_3$ may be selected such that $d_3/M_3=-d_1/M_1$.

Due to the symmetrical response of the diffraction grating, to out-couple the half of RGB image diffracted toward the right we use the same reflective DG3 and transmissive DG4 gratings.

In some embodiments, to determine an acceptable range for the pitch $d_1$ the following formulas are used:

$$d_1^{max} = \frac{M_1}{0.8\ n_2}\lambda_{blue},\ d_1^{min} = \frac{M_1}{n_2}\lambda_{blue}$$

$$d_2^{max} = \frac{M_2}{0.8\ n_2}\lambda_{red},\ d_2^{min} = \frac{M_2}{n_2}\lambda_{red}$$

Here $\lambda_{blue}$ is the wavelength for blue color, $\lambda_{red}$ is the wavelength for red color.

In some embodiments, a first grating pitch ($d_1$) of the first transmissive diffractive in-coupler is between 230 nm and 390 nm for $n_2$ and $n_3$ between 1.5 to 2.0 and for $M_1=1$ ($\lambda_{blue}=460$ nm).

In some embodiments, a first grating pitch ($d_1$) of the first transmissive diffractive in-coupler is between 460 nm and 780 nm for $n_2$ and $n_3$ between 1.5 to 2.0 and for $M_1=2$ ($\lambda_{blue}=460$ nm).

In some embodiments, a second grating pitch ($d_2$) of the second reflective diffractive in-coupler is between 310 nm and 520 nm for $n_2$ between 1.5 and 2.0 and for $M_2=1$ ($\lambda_{red}=620$ nm).

In some embodiments, a second grating pitch ($d_2$) of the second reflective diffractive in-coupler is between 620 nm and 1040 nm for $n_2$ between 1.5 and 2.0 and for $M_2=2$ ($\lambda_{red}=620$ nm).

Some embodiments use only a single waveguide to provide a high field of view for RGB images. Some such embodiments operate to combine the beams diffracted by the reflective and transmissive diffraction gratings placed from the both side of the glass plate. In some embodiments, the index of refraction of the waveguide selected to increase the field of view.

Some embodiments provide a high field of view RGB display using one waveguide. The in-coupler of the waveguide may include a single transmissive and a single reflective diffraction grating. The transmissive grating DG1 may be configured for blue light. The transmissive grating DG1 may have a pitch with a range described by the formulas given above. The reflective grating DG2 may be configured for red light. The reflective grating DG2 may have a pitch with a range described by the formulas given above.

The waveguide may have an out-coupler system, where the out-coupler transmissive grating has the same pitch to diffraction order ratio as the reflective in-coupler. The out-coupler reflective grating may have the same pitch to diffraction order ratio as the transmissive in-coupler grating.

In some embodiments, the diffraction gratings have unit cells enabling edge waves behavior to shape the far field.

In some embodiments, a metal layer is provided to cover the reflective gratings.

In some embodiments, all diffraction gratings use |M| greater than or equal to 1 with high diffraction efficiency for the incouplers.

Some embodiments use two diffraction modes at each position of the incoupling diffraction gratings with pupil angular tiling.

Some embodiments use pupil angular tiling to multiplex different angular space and wavelength between multiple diffraction gratings.

In some embodiments, the in-coupler diffraction gratings are compatible with various different light engine sources (such as DLP or LCOS) with low light loss.

In the present disclosure, modifiers such as "first," "second," "third," and the like are sometimes used to distinguish different features. These modifiers are not meant to imply any particular order of operation or arrangement of components. Moreover, the terms "first," "second," "third," and the like may have different meanings in different embodiments. For example, a component that is the "first" component in one embodiment may be the "second" component in a different embodiment.

Additional Embodiments

An optical system according to some embodiments includes a first waveguide having a first transmissive diffractive in-coupler (DG1) and a second waveguide having a second transmissive diffractive in-coupler (DG2) and a reflective diffractive in-coupler (DG3), wherein the second transmissive diffractive in-coupler (DG2) is arranged between the first transmissive diffractive in-coupler (DG1) and the reflective diffractive in-coupler (DG3) in an input region.

In some embodiments, the first waveguide further includes a first diffractive out-coupler (DG6); and the second waveguide further comprises a second diffractive out-coupler (DG4) and a third diffractive out-coupler (DG5).

In some embodiments, the optical system further includes an image generator operative to provide an image at the input region, wherein the optical system is configured to substantially replicate the image at an output pupil region, the output pupil region including the first diffractive out-coupler (DG6), the second diffractive out-coupler (DG4), and the third diffractive out-coupler (DG5).

In some embodiments, the system is configured to substantially replicate an image spanning a field of view of at least 100°. In some embodiments, the system is configured to substantially replicate an image spanning a field of view of at least 120°. In some embodiments, the system is configured to substantially replicate an image spanning a field of view of at least 140°. In some embodiments, the system is configured to substantially replicate an image spanning a field of view of at least 160°.

In some embodiments, the image generator is operative to produce light having a maximum wavelength, and the field of view of the system is equal to a maximum field of view for the maximum wavelength.

In some embodiments, the system is configured to replicate a full-color image.

In some embodiments, the first diffractive in-coupler has a first grating pitch, the second diffractive in-coupler has a second grating pitch greater than the first grating pitch, and the reflective diffractive in-coupler has a third grating pitch greater than the second grating pitch.

Some embodiments of the optical system are characterized by the equation $$d_1 = \frac{M_1 \lambda}{n_2 \sin \Phi_{WG1}^G + \sin \Theta_{WG1}^G}$$

where $d_1$ is a grating pitch the of first transmissive diffractive in-coupler (DG1), $M_1$ is a non-zero integer, $n_2$ is a refractive index of the first waveguide, $\lambda$ is a wavelength between 450 nm and 700 nm, $\Phi_{WG1}^G$ is an angle between 55 and 90 degrees, and $\Theta_{WG1}{}^G$ is substantially equal to an angle that diffracts into a critical angle of the second waveguide, where the critical angle of the second waveguide is arcsin($1/n_3$).

Some embodiments of the optical system are characterized by the equation $$d_2 = \frac{M_2 \lambda}{n_3 \sin \Phi_{WG2}^G + \sin \Theta_{WG2}^G}$$

where $d_2$ is a grating pitch of the second transmissive diffractive in-coupler (DG2), $M_2$ is a non-zero integer, $n_3$ is a refractive index of the second waveguide, $\lambda$ is a wavelength between 450 nm and 700 nm, $\Phi_{WG2}{}^G$ is an angle between 55 and 90 degrees, and $\Theta_{WG2}{}^G$ is an angle within ±5 degrees of normal incidence.

In some embodiments, the optical system is operative to couple light with an incident angle of greater than 50° into at least one of the first waveguide and the second waveguide. In some embodiments, the optical system is operative to couple light with an incident angle of greater than 60° into at least one of the first waveguide and the second waveguide. In some embodiments, the optical system is operative to couple light with an incident angle of greater than 70° into at least one of the first waveguide and the second waveguide. In some embodiments, the optical system is operative to couple light with an incident angle of greater than 80° into at least one of the first waveguide and the second waveguide.

In some embodiments, the optical system is configured (i) to couple at least some incident light having a first incident angle to travel in a first direction in at least one of the first and second waveguide, and (ii) to couple at least some incident light having a second incident angle substantially opposite the first incident angle to travel in a second direction substantially opposite the first direction in at least one of the first and second waveguide.

In some embodiments, the optical system is configured such that, for at least a first wavelength of light, light incident on the first transmissive diffractive in-coupler is (i) at relatively higher angles of incidence, preferentially coupled into the first waveguide and (ii) at relatively lower angles of incidence, preferentially coupled into the second waveguide.

In some embodiments, the optical system is configured such that, for at least a second wavelength of light, light incident on the second transmissive diffractive in-coupler is (i) at relatively higher angles of incidence, preferentially coupled into the second waveguide by the second transmissive diffractive in-coupler and (ii) at relatively lower angles of incidence, preferentially coupled into the second waveguide by the reflective diffractive in-coupler.

In some embodiments, the first wavelength is shorter than the second wavelength.

In some embodiments, the incident light is blue light with a first wavelength of light of about 460 nm.

In some embodiments, the incident light is green light with a first wavelength of about 530 nm.

In some embodiments, the incident light is red light with a second wavelength of about 625 nm.

In some embodiments, the optical system is configured such that, for at least one incident angle of light at the input region, (i) light with relatively shorter wavelengths is preferentially coupled into the first waveguide, and (ii) light with relatively longer wavelengths is preferentially coupled into the second waveguide.

In some embodiments, the optical system is configured such that, for at least a first wavelength of light and a second different wavelength of light incident on the input region, at least a portion of the first wavelength of light and at least a portion of the second wavelength of light are coupled into the first waveguide.

In some embodiments, the optical system is configured such that, for at least a first wavelength of light and a second different wavelength of light incident on the input region, at least a portion of the first wavelength of light and at least a portion of the second wavelength of light are coupled into the second waveguide.

In some embodiments, a first grating pitch ($d_1$) of the first transmissive diffractive in-coupler is between 420 nm and 520 nm.

In some embodiments, a second grating pitch ($d_2$) of the second transmissive diffractive in-coupler is between 600 nm and 700 nm.

In some embodiments, a third grating pitch ($d_3$) of the reflective diffractive in-coupler is between 720 nm and 820 nm.

In some embodiments, a first grating pitch ($d_1$) of the first transmissive diffractive in-coupler is between 460 nm and 480 nm.

In some embodiments, a second grating pitch ($d_2$) of the second transmissive diffractive in-coupler is between 640 nm and 660 nm.

In some embodiments, a third grating pitch ($d_3$) of the reflective diffractive in-coupler is between 760 nm and 780 nm.

In some embodiments, a second grating pitch is between 30% and 50% greater than the first grating pitch.

In some embodiments, a third grating pitch is between 10% and 30% greater than the second grating pitch.

In some embodiments, a third grating pitch is between 50% and 70% greater than the second grating pitch.

In some embodiments, the first transmissive diffractive in-coupler is operative to couple a second diffractive order of light into the first waveguide.

In some embodiments, the second transmissive diffractive in-coupler and the reflective diffractive in-coupler are operative to couple a second diffractive order of light into the second waveguide.

In some embodiments, the first waveguide includes at least one pupil expander along an optical path between the first transmissive diffractive in-coupler and the first diffractive out-coupler.

In some embodiments, the second waveguide includes at least one pupil expander along an optical path between (i) the second transmissive diffractive in-coupler and the reflective diffractive in-coupler and (ii) the second and third diffractive out-couplers.

In some embodiments, the second waveguide includes at least two pupil expanders along an optical path between (i) the second transmissive diffractive in-coupler and the reflective diffractive in-coupler and (ii) the second and third diffractive out-couplers.

In some embodiments, the first diffractive out-coupler (DG6) is a reflective diffractive out-coupler.

In some embodiments, the first diffractive out-coupler (DG6) is a transmissive diffractive out-coupler.

In some embodiments, the second diffractive out-coupler (DG4) is a reflective diffractive out-coupler.

In some embodiments, the second diffractive out-coupler (DG4) is a transmissive diffractive out-coupler.

In some embodiments, the third diffractive out-coupler (DG5) is a transmissive diffractive out-coupler.

In some embodiments, the third diffractive out-coupler (DG5) is a reflective diffractive out-coupler.

In some embodiments, the first diffractive out-coupler has a grating pitch ($d_6$) substantially equal to a grating pitch ($d_1$) of the first transmissive diffractive in-coupler.

In some embodiments, the second diffractive out-coupler has a grating pitch ($d_4$) substantially equal to a grating pitch ($d_2$) of the second transmissive diffractive in-coupler.

In some embodiments, the third diffractive out-coupler has a grating pitch ($d_5$) substantially equal to a grating pitch ($d_3$) of the reflective diffractive in-coupler.

In some embodiments, the first and second waveguides are substantially planar and substantially parallel to one another.

In some embodiments, the first and second waveguides are arranged in a waveguide stack that includes only two waveguides.

In some embodiments, the optical system is configured such that blue light is (i) at relatively higher angles of incidence, preferentially coupled into the first waveguide and (ii) at relatively lower angles of incidence, preferentially coupled into the second waveguide.

In some embodiments, the optical system is configured such that green light is (i) at relatively higher angles of incidence, preferentially coupled into the first waveguide and (ii) at relatively lower angles of incidence, preferentially coupled into the second waveguide.

In some embodiments, the optical system is configured such that red light is (i) at relatively higher angles of incidence, preferentially coupled into the second waveguide by the second transmissive diffractive in-coupler and (ii) at relatively lower angles of incidence, preferentially coupled into the second waveguide by the reflective diffractive in-coupler.

A method of operating an optical system according to some embodiments includes: directing input light representing an image onto a first transmissive diffractive in-coupler (DG1) of a first waveguide, the first waveguide having a first diffractive out-coupler (DG6); using the first transmissive diffractive in-coupler (DG1), coupling into the first waveguide a first portion of the input light; using a second transmissive diffractive in-coupler (DG2) of a second waveguide, coupling into the second waveguide a second portion of the input light; and using a reflective diffractive in-coupler (DG3) of the second waveguide, coupling into the second waveguide a third portion of the input light.

In some embodiments, the method further includes: using a first diffractive out-coupler (DG6) on the first waveguide, coupling at least part of the first portion of light out of the first waveguide; using a second diffractive out-coupler (DG4) on the second waveguide, coupling at least part of the second portion of light out of the second waveguide; and using a third diffractive out-coupler (DG5) on the second waveguide, coupling at least part of the third portion of light out of the second waveguide.

In some embodiments, where the input light comprises blue light, the blue light is (i) at relatively higher angles of incidence, preferentially coupled into the first waveguide and (ii) at relatively lower angles of incidence, preferentially coupled into the second waveguide.

In some embodiments, where the input light comprises green light, the green light is (i) at relatively higher angles of incidence, preferentially coupled into the first waveguide and (ii) at relatively lower angles of incidence, preferentially coupled into the second waveguide.

In some embodiments, the input light comprises red light, and the red light is (i) at relatively higher angles of incidence, preferentially coupled into the second waveguide by the second transmissive diffractive in-coupler and (ii) at relatively lower angles of incidence, preferentially coupled into the second waveguide by the reflective diffractive in-coupler.

An optical system according to some embodiments includes a waveguide having a transmissive diffractive in-coupler (DG1) on a first surface thereof and a reflective diffractive in-coupler (DG2) on a second surface substantially opposite the first surface, where the transmissive diffractive in-coupler (DG1) has a grating period selected to couple blue light into the waveguide, and where the and the reflective diffractive in-coupler (DG2) has a grating period selected to couple red light into the waveguide.

In some embodiments, the waveguide further comprises at least one reflective diffractive out-coupler and at least one transmissive diffractive out-coupler.

In some embodiments, the optical system further includes an image generator operative to provide an image at an input region including the transmissive diffractive in-coupler and the reflective diffractive in-coupler, wherein the optical system is configured to substantially replicate the image at at least one output pupil region, the output pupil region including the reflective diffractive out-coupler and the transmissive diffractive out-coupler.

Although features and elements are described above in particular combinations, one of ordinary skill in the art will appreciate that each feature or element can be used alone or in any combination with the other features and elements.

What is claimed:

1. An optical system comprising:
   a first waveguide, configured to receive, at an input region of the optical system, light from a light source;
   a second waveguide, configured to receive a first portion of the light, transmitted to the second waveguide by the first waveguide;
   an output region configured to receive a second portion of the light diffracted in the first waveguide and to receive the first portion of the light diffracted in the second waveguide;
   the first waveguide having a first transmissive diffractive in-coupler (DG1) at the input region of the optical system, for diffracting, from the light, blue light of a first incidence angle range and for diffracting, from the light, incoming green light of a third incidence angle range to a first diffractive out-coupler (DG6) in the output region of the optical system, and to pass-through, to the second waveguide of the optical system, from the light, blue light of a second incidence angle range, green light of a fourth incidence angle range and red light; and
   the second waveguide having a second transmissive diffractive in-coupler (DG2) for diffracting the blue light of the second incidence angle range received from the first waveguide, and the green light of the fourth incidence angle range received from the first waveguide, to a second diffractive out-coupler (DG4) in the output region, and a reflective diffractive in-coupler (DG3) for diffracting the red light received from the first waveguide to a third diffractive out-coupler (DG5) in the output region.

2. The optical system of claim 1, wherein the light source comprises an image generator operative to provide an image at the input region, wherein the optical system is configured to substantially replicate the image at an output pupil region, the output pupil region including the first diffractive out-coupler (DG6), the second diffractive out-coupler (DG4), and the third diffractive out-coupler (DG5).

3. The optical system of claim 2, wherein the optical system is configured to substantially replicate an image spanning a field of view of at least 100°.

4. The optical system of claim 2, wherein the optical system is configured to replicate a full-color image.

5. The optical system of claim 1, wherein the first transmissive diffractive in-coupler has a first grating pitch, the second transmissive diffractive in-coupler has a second grating pitch greater than the first grating pitch, and the reflective diffractive in-coupler has a third grating pitch greater than the second grating pitch.

6. The optical system of claim 1, wherein $$d_1 = \frac{M_1 \lambda}{n_2 \sin \Phi_{WG1}^G + \sin \Theta_{WG1}^G}$$

where $d_1$ is a grating pitch of the first transmissive diffractive in-coupler, $M_1$ is a non-zero integer, $n_2$ is a refractive index of the first waveguide, $\lambda$ is a wavelength between 450 nm and 700 nm, $\Phi_{WG1}^G$ is an angle between 55 and 90 degrees, and $\Theta_{WG1}^G$ is substantially equal to an angle that diffracts into a critical angle of the second waveguide, where the critical angle of the second waveguide is arcsin $(1/n_3)$, where $n_3$ is a refractive index of the second waveguide.

7. The optical system of claim 6, wherein $$d_2 = \frac{M_2 \lambda}{n_3 \sin \Phi_{WG2}^G + \sin \Theta_{WG2}^G}$$

where $d_2$ is a grating pitch of the second transmissive diffractive in-coupler, $M_2$ is a non-zero integer, $\Phi_{WG2}^G$ is an angle between 55 and 90 degrees, and $\Theta_{WG2}^G$ is an angle within ±5 degrees of normal incidence.

8. The optical system of claim 1, wherein:
a first grating pitch ($d_1$) of the first transmissive diffractive in-coupler is between 420 nm and 520 nm;
a second grating pitch ($d_2$) of the second transmissive diffractive in-coupler is between 600 nm and 700 nm; and
a third grating pitch ($d_3$) of the reflective diffractive in-coupler is between 720 nm and 820 nm.

9. The optical system of claim 1, wherein:
a first grating pitch ($d_1$) of the first transmissive diffractive in-coupler is between 460 nm and 480 nm;
a second grating pitch ($d_2$) of the second transmissive diffractive in-coupler is between 640 nm and 660 nm; and
a third grating pitch ($d_3$) of the reflective diffractive in-coupler is between 760 nm and 780 nm.

10. The optical system of claim 1, wherein:
a second grating pitch ($d_2$) of the second transmissive diffractive in-coupler is between 30% and 50% greater than a first grating pitch ($d_1$) of the first transmissive diffractive in-coupler; and a third grating pitch ($d_3$) of the reflective diffractive in-coupler is between 10% and 30% greater than the second grating pitch.

11. A method of operating an optical system, the method comprising:
directing light from a light source and input at an input region of the optical system, the light representing an image, onto a first transmissive diffractive in-coupler (DG1) of a first waveguide;
using the first transmissive diffractive in-coupler to couple into the first waveguide a first portion of the light corresponding to blue light, input at the input region at a first incidence angle range, and green light, input at the input region at a third incidence angle range, and using the first transmissive diffractive in-coupler to transfer, to a second waveguide, a second portion of the light, corresponding to blue light, input at the input region at a second incidence angle range, and green light, input at the input region at a fourth incidence angle range, and red light input at the input region;
using a second transmissive diffractive in-coupler (DG2) of a second waveguide to couple into the second waveguide a first part of the second portion of the light received from the first waveguide corresponding to the blue light received from the first waveguide, and the green light received from the first waveguide; and
using a reflective diffractive in-coupler (DG3) of the second waveguide to couple into the second waveguide a second part of the second portion of the light received from the first waveguide, corresponding to the red light received from the first waveguide.

12. The method of claim 11, wherein $$d_1 = \frac{M_1 \lambda}{n_2 \sin \Phi_{WG1}^G + \sin \Theta_{WG1}^G}$$

where $d_1$ is a grating pitch the of first transmissive diffractive in-coupler, $M_1$ is a non-zero integer, $n_2$ is a refractive index of the first waveguide, $\lambda$ is a wavelength between nd 700 nm, $\Phi_{WG1}^G$ is an angle between 55 and 90 degrees, and $\Theta_{WG1}^G$ is substantially equal to an angle that diffracts into a critical angle of the second waveguide, where the critical angle of the second waveguide is arcsin $(1/n_3)$, where $n_3$ is a refractive index of the second waveguide.

13. The method of claim 12, wherein $$d_2 = \frac{M_2 \lambda}{n_3 \sin \Phi_{WG2}^G + \sin \Theta_{WG2}^G}$$

where $d_2$ is a grating pitch of the second transmissive diffractive in-coupler (DG2), $M_2$ is a non-zero integer, $\Phi_{WG2}^G$ is an angle between 55 and 90 degrees, and $\Theta_{WG2}^G$ is an angle within ±5 degrees of normal incidence.

\* \* \* \* \*